US011870587B2

(12) United States Patent
Yang et al.

(10) Patent No.: US 11,870,587 B2
(45) Date of Patent: Jan. 9, 2024

(54) METHOD AND DEVICE FOR TRANSMITTING AND RECEIVING SIGNAL IN WIRELESS COMMUNICATION SYSTEM

(71) Applicant: LG ELECTRONICS INC., Seoul (KR)

(72) Inventors: Suckchel Yang, Seoul (KR); Seonwook Kim, Seoul (KR); Duckhyun Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/155,599

(22) Filed: Jan. 17, 2023

(65) Prior Publication Data

US 2023/0155739 A1 May 18, 2023

Related U.S. Application Data

(63) Continuation of application No. 17/787,569, filed as application No. PCT/KR2021/010254 on Aug. 4, 2021.

(60) Provisional application No. 63/062,394, filed on Aug. 6, 2020, provisional application No. 63/104,504, filed on Oct. 22, 2020, provisional application No.
(Continued)

(51) Int. Cl.
*H04W 72/00* (2023.01)
*H04L 1/1812* (2023.01)
*H04W 72/21* (2023.01)

(52) U.S. Cl.
CPC ........... *H04L 1/1812* (2013.01); *H04W 72/21* (2023.01)

(58) Field of Classification Search
CPC ............. H04W 72/10; H04W 72/1242; H04W 72/1247; H04W 72/0875; H04L 5/0053; H04L 5/0055; H04L 5/0057
See application file for complete search history.

(56) References Cited

U.S. PATENT DOCUMENTS

2003/0123470 A1 7/2003 Kim et al.
2019/0313444 A1 10/2019 Marinier et al.
(Continued)

FOREIGN PATENT DOCUMENTS

KR 1020170093107 8/2017
KR 1020200090145 7/2020
WO 2013062396 5/2013

OTHER PUBLICATIONS

PCT International Application No. PCT/KR2021/010254, Search Report dated Nov. 29, 2021, 3 pages.

*Primary Examiner* — Bo Hui A Zhu
(74) *Attorney, Agent, or Firm* — LEE HONG DEGERMAN KANG & WAIMEY

(57) ABSTRACT

A terminal according to an embodiment of the present invention can: encode a plurality of UCIs comprising a first UCI and a second UCI; perform resource mapping on the encoded bits of the plurality of UCIs on a single physical uplink channel; and perform uplink transmission on the basis of the resource mapping. Even when the first UCI and the second UCI have different priorities, the terminal can separately encode the first UCI and the second UCI on the basis that the first UCI and the second UCI are configured to be multiplexed on the single physical uplink channel, and perform the resource mapping on the second UCI having the lower priority on the basis of the resource mapping of the first UCI having the higher priority.

15 Claims, 16 Drawing Sheets

Related U.S. Application Data

63/138,506, filed on Jan. 17, 2021, provisional application No. 63/176,873, filed on Apr. 19, 2021, provisional application No. 63/190,218, filed on May 18, 2021, provisional application No. 63/192,073, filed on May 23, 2021.

(56) References Cited

U.S. PATENT DOCUMENTS

| | | |
|---|---|---|
| 2022/0279569 A1* | 9/2022 | Gou .................. H04L 5/0055 |
| 2023/0006776 A1 | 1/2023 | Yang et al. |
| 2023/0045832 A1* | 2/2023 | Zhang ............... H04L 1/1896 |

\* cited by examiner

METHOD AND DEVICE FOR TRANSMITTING AND RECEIVING SIGNAL IN WIRELESS COMMUNICATION SYSTEM

CROSS-REFERENCE TO RELATED APPLICATIONS

This application is a continuation of U.S. patent application Ser. No. 17/787,569, filed on Jun. 20, 2022, which is the National Stage filing under 35 U.S.C. 371 of International Application No. PCT/KR2021/010254, filed on Aug. 4, 2021, which claims the benefit of earlier filing date and right of priority to Korean Patent Application Nos. 10-2020-0137760, filed on Oct. 22, 2020, 10-2021-0044273, filed on Apr. 5, 2021, 10-2021-0059547, filed on May 7, 2021, 10-2021-0064252, filed on May 18, 2021, and also claims the benefit of U.S. Provisional Application No. 63/062,394, filed on Aug. 6, 2020, 63/104,504, filed on Oct. 22, 2020, 63/138,506, filed on Jan. 17, 2021, 63/176,873, filed on Apr. 19, 2021, 63/190,218, filed on May 18, 2021, and 63/192,073, filed on May 23, 2021, the contents of which are all incorporated by reference herein in their entireties.

TECHNICAL FIELD

The present disclosure relates to a wireless communication system, and more particularly, to a method and apparatus for transmitting/receiving an uplink/downlink wireless signal in a wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect of the present disclosure, a method of transmitting a signal by a user equipment (UE) in a wireless communication system may include encoding a plurality of UCIs including a first UCI and a second UCI, performing resource mapping for encoded bits of the plurality of UCIs on a single physical uplink channel, and performing an uplink transmission based on the resource mapping. Based on that the UE is configured to multiplex the first UCI and the second UCI on the single physical uplink channel even in a case where the first UCI and the second UCI have different priorities, the UE may separately encode the first UCI and the second UCI, and perform resource mapping of the second UCI having a lower priority based on resource mapping of the first UCI having a higher priority.

According to an aspect of the disclosure, a method of receiving a signal by a base station (BS) in a wireless communication system may include receiving encoded bits of a plurality of multiplexed UCIs on a single physical uplink channel from a UE, and obtaining a first UCI and a second UCI by decoding the encoded bits of the plurality of UCIs. Based on the UE being configured to multiplex the first UCI and the second UCI on the single physical uplink channel even in a case where the first UCI and the second UCI have different priorities, the BS may separately decode the first UCI and the second UCI, and determine resource mapping of the second UCI having a lower priority based on resource mapping of the first UCI having a higher priority.

According to an aspect of the present disclosure, processor-readable recording medium recording instructions for performing the above signal transmission method may be provided.

According to an aspect of the present disclosure, a UE for performing the above signal transmission method may be provided.

According to an aspect of the present disclosure, a device for controlling a UE performing the above signal transmission method may be provided.

According to an aspect of the present disclosure, a BS for performing the above signal reception method may be provided.

The single physical uplink channel may be a physical uplink control channel (PUCCH)

To separately encode the first UCI and the second UCI, the UE may perform a plurality of encoding processes for PUCCH format 2, even though the PUCCH is configured with PUCCH format 2.

The UE may perform the plurality of encoding processes for PUCCH format 2 for which only a single encoding process would be allowed if multiplexing of the first UCI and the second UCI having the different priorities were not configured.

The UE may use a second mapping scheme to perform the resource mapping for the single physical uplink channel for which a first mapping scheme would be used if multiplexing of the first UCI and the second UCI having the different priorities were not configured. The second mapping scheme may be a distributed mapping scheme.

The single physical uplink channel may be a PUCCH, and the UE may multiplex the first UCI and the second UCI in a first PUCCH resource related to the higher priority among a plurality of PUCCH resources related to the different priorities.

The UE may determine a coding rate of the second UCI or whether to drop at least part of the second UCI, based on the amount of UCI resources available on the single physical uplink channel and the amount of resources required for the resource mapping of the first UCI.

The performing of resource mapping for encoded bits of the plurality of UCIs may include determining 'NH' resource elements (REs) for the resource mapping of the first UCI by selecting one RE every 'd' REs among 'N' available REs of the single physical uplink channel, and determining REs for the resource mapping of the second UCI among remaining 'N−$N_H$' REs. The UE may determine a value of 'd' to space the '$N_H$' REs apart from each other by a maximum distance.

In a state in which the single physical uplink channel is a PUSCH carrying piggyback-UCI, and a UCI type 'n' has a higher priority than a UCI type 'n+1' among a plurality of UCI types related to the piggyback-UCI, the UE may determine UCI types of the first UCI and the second UCI as illustrated in Table 8 or Table 9 in Best Mode.

Advantageous Effects

According to the present disclosure, wireless signal transmission and reception may be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

MODE FOR INVENTION

Figure 1:
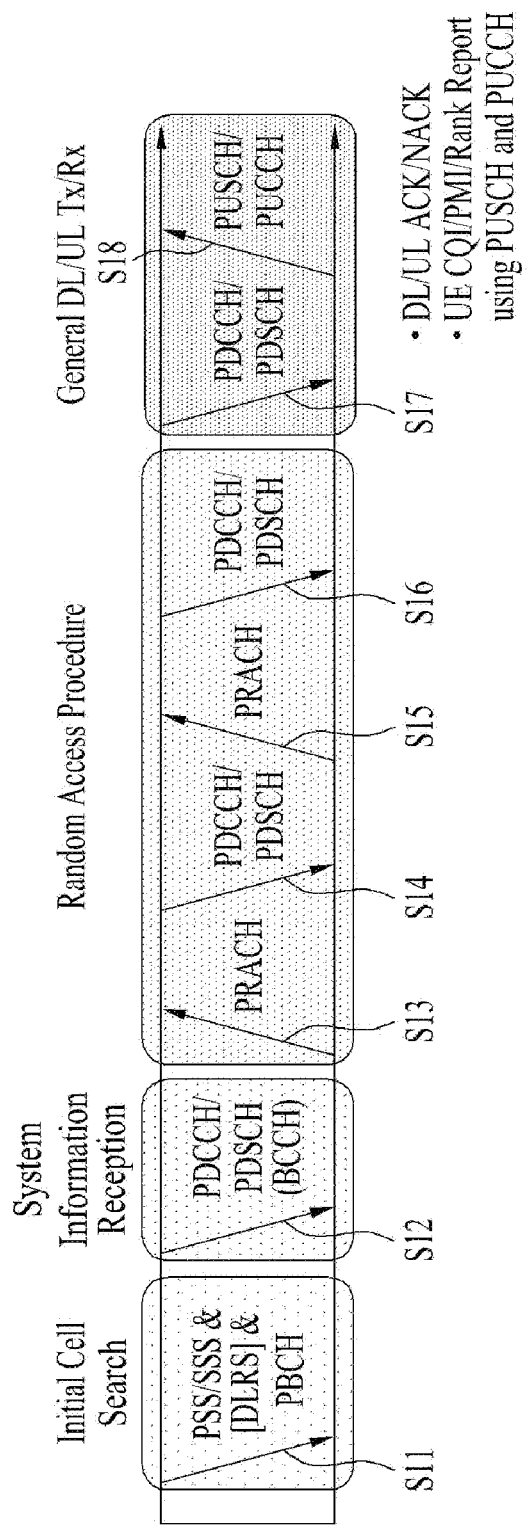
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In the present disclosure, the term "set/setting" may be replaced with "configure/configuration", and both may be used interchangeably. Further, a conditional expression (e.g., "if", "in a case", or "when") may be replaced by "based on that" or "in a state/status". In addition, an operation or software/hardware (SW/HW) configuration of a user equipment (UE)/base station (BS) may be derived/understood based on satisfaction of a corresponding condition. When a process on a receiving (or transmitting) side may be derived/understood from a process on the transmitting (or receiving) side in signal transmission/reception between wireless communication devices (e.g., a BS and a UE), its description may be omitted. Signal determination/generation/encoding/transmission of the transmitting side, for example, may be understood as signal monitoring reception/decoding/determination of the receiving side. Further, when it is said that a UE performs (or does not perform) a specific operation, this may also be interpreted as that a BS expects/assumes (or does not expect/assume) that the UE performs the specific operation. When it is said that a BS performs (or does not perform) a specific operation, this may also be interpreted as that a UE expects/assumes (or does not expect/assume) that the BS performs the specific operation. In the following description, sections, embodiments, examples, options, methods, schemes, and so on are distinguished from each other and indexed, for convenience of description, which does not mean that each of them necessarily constitutes an independent invention or that each of them should be implemented only individually. Unless explicitly contradicting each other, it may be derived/understood that at least some of the sections, embodiments, examples, options, methods, schemes, and so on may be implemented in combination or may be omitted.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
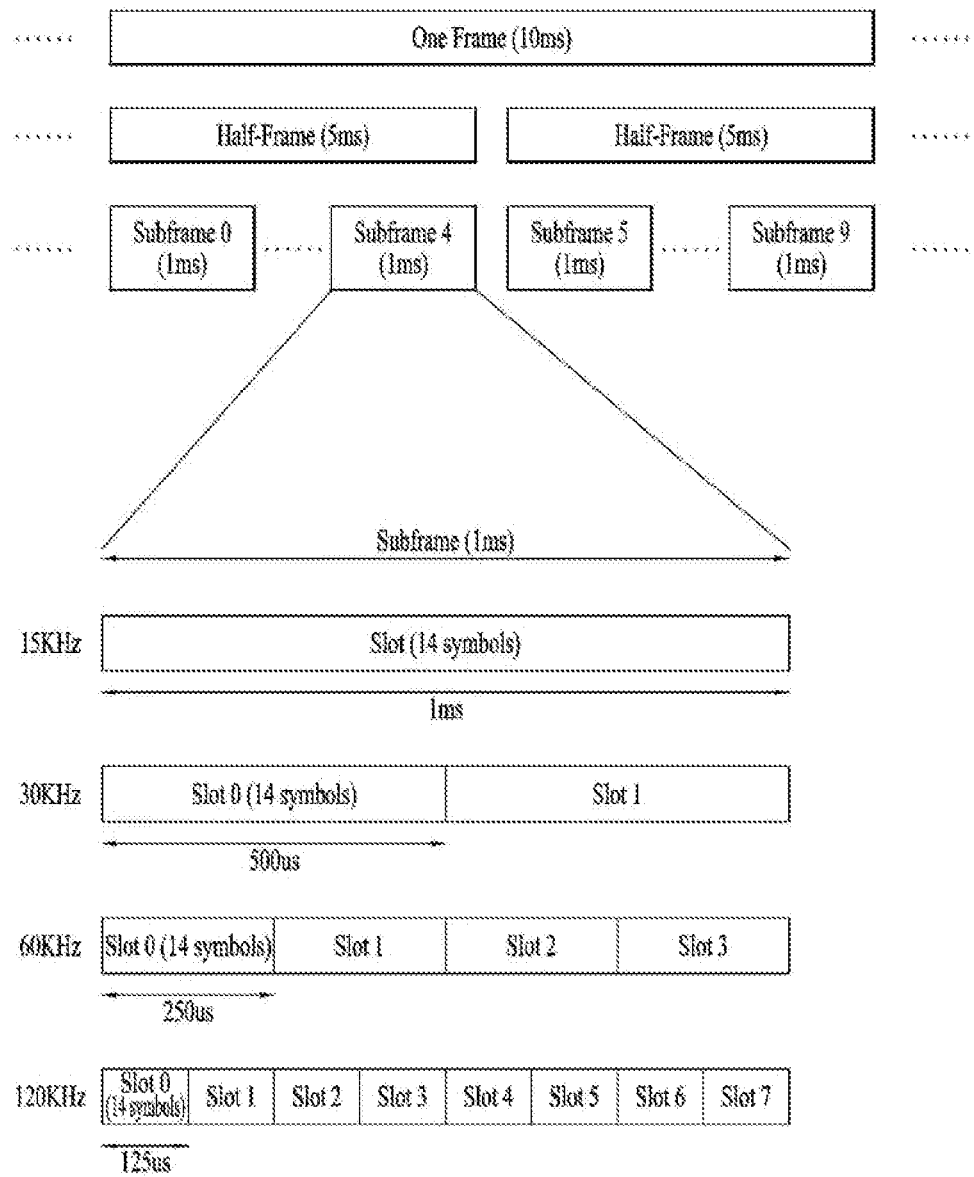
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame,u}_{slot}$: Number of slots in a frame
*$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
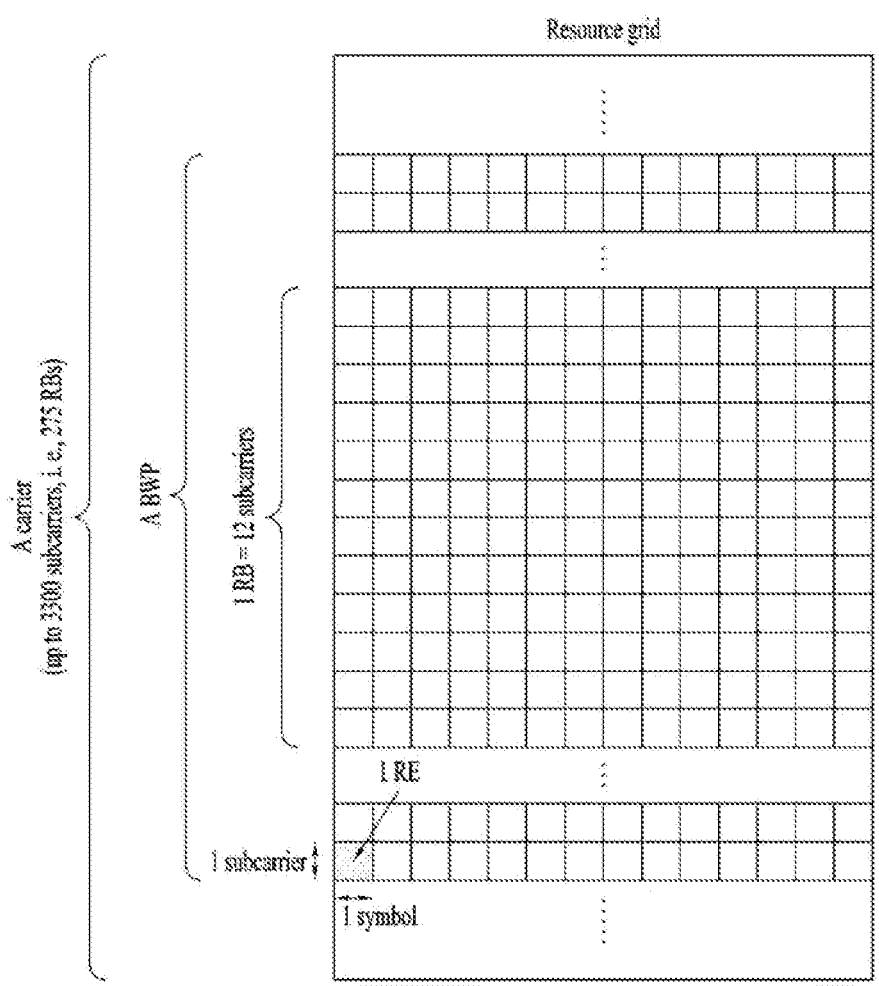
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
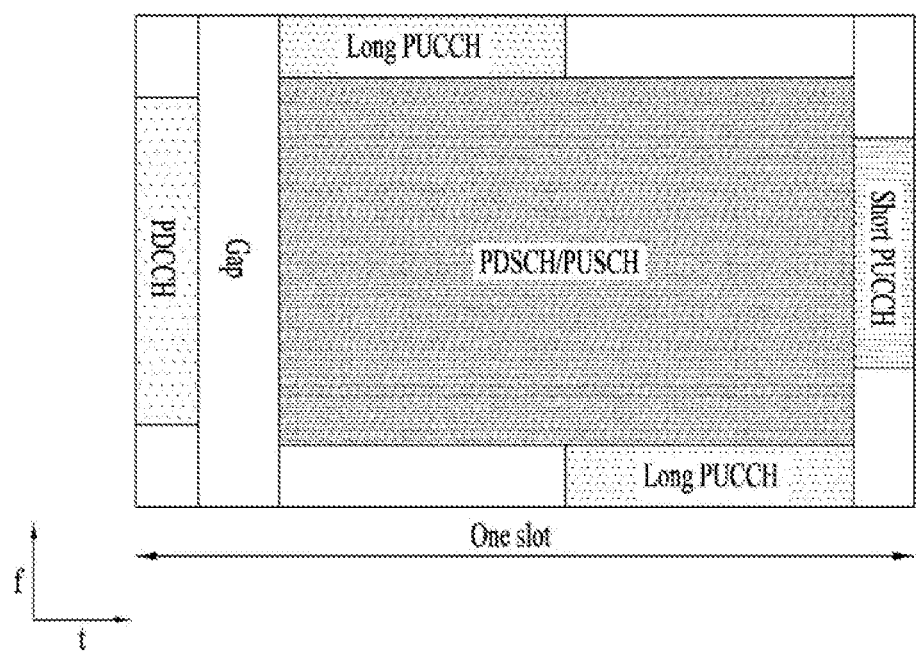
FIG. 4 illustrates exemplary mapping of physical channels in a slot.

FIG. 4 illustrates exemplary mapping of physical channels in a slot. A PDCCH may be transmitted in a DL control region, and a PDSCH may be transmitted in a DL data region. A PUCCH may be transmitted in a UL control region, and a PUSCH may be transmitted in a UL data region. A guard period (GP) provides a time gap for transmission mode-to-reception mode switching or reception mode-to-transmission mode switching at a BS and a UE. Some symbol at the time of DL-to-UL switching in a subframe may be configured as a GP.

Each physical channel will be described below in greater detail.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH includes 1, 2, 4, 8, or 16 control channel elements (CCEs) according to its aggregation level (AL). A CCE is a logical allocation unit used to provide a PDCCH with a specific code rate according to a radio channel state. A CCE includes 6 resource element groups (REGs), each REG being defined by one OFDM symbol by one (P)RB. The PDCCH is transmitted in a control resource set (CORESET). A CORESET is defined as a set of REGs with a given numerology (e.g., an SCS, a CP length, and so on). A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). Specifically, the number of RBs and the number of symbols (3 at maximum) in the CORESET may be configured by higher-layer signaling.

For PDCCH reception/detection, the UE monitors PDCCH candidates. A PDCCH candidate is CCE(s) that the UE should monitor to detect a PDCCH. Each PDCCH candidate is defined as 1, 2, 4, 8, or 16 CCEs according to an AL. The monitoring includes (blind) decoding PDCCH candidates. A set of PDCCH candidates decoded by the UE are defined as a PDCCH search space (SS). An SS may be a common search space (CSS) or a UE-specific search space (US S). The UE may obtain DCI by monitoring PDCCH candidates in one or more SSs configured by an MIB or higher-layer signaling. Each CORESET is associated with one or more SSs, and each SS is associated with one CORESET. An SS may be defined based on the following parameters.

controlResourceSetId: A CORESET related to an SS.
monitoringSlotPeriodicityAndOffset: A PDCCH monitoring periodicity (in slots) and a PDCCH monitoring offset (in slots).
monitoringSymbolsWithinSlot: PDCCH monitoring symbols in a slot (e.g., the first symbol(s) of a CORESET).

nrofCandidates: The number of PDCCH candidates (one of 0, 1, 2, 3, 4, 5, 6, and 8) for each AL={1, 2, 4, 8, 16}.

An occasion (e.g., time/frequency resources) in which the UE is to monitor PDCCH candidates is defined as a PDCCH (monitoring) occasion. One or more PDCCH (monitoring) occasions may be configured in a slot. Table 3 shows the characteristics of each SS.

TABLE 3

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping may be performed on a codeword basis, and modulation symbols generated from each codeword may be mapped to one or more layers. Each layer together with a demodulation reference signal (DMRS) is mapped to resources, and an OFDM symbol signal is generated from the mapped layer with the DMRS and transmitted through a corresponding antenna port.

The PUCCH delivers uplink control information (UCI). The UCI includes the following information.

SR(Scheduling Request): Information used to request UL-SCH resources.

HARQ (Hybrid Automatic Repeat reQuest)-ACK (Acknowledgement): A response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI (Channel State Information): Feedback information for a DL channel. Multiple input multiple output (MIMO)-related feedback information includes an RI and a PMI.

Table 5 illustrates exemplary PUCCH formats. PUCCH formats may be divided into short PUCCHs (Formats 0 and 2) and long PUCCHs (Formats 1, 3, and 4) based on PUCCH transmission durations.

TABLE 5

| PUCCH format | Length in OFDM symbols $N_{symb}^{PUCCH}$ | Number of bits | Usage | Etc |
| --- | --- | --- | --- | --- |
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of 1/3. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Figure 5:
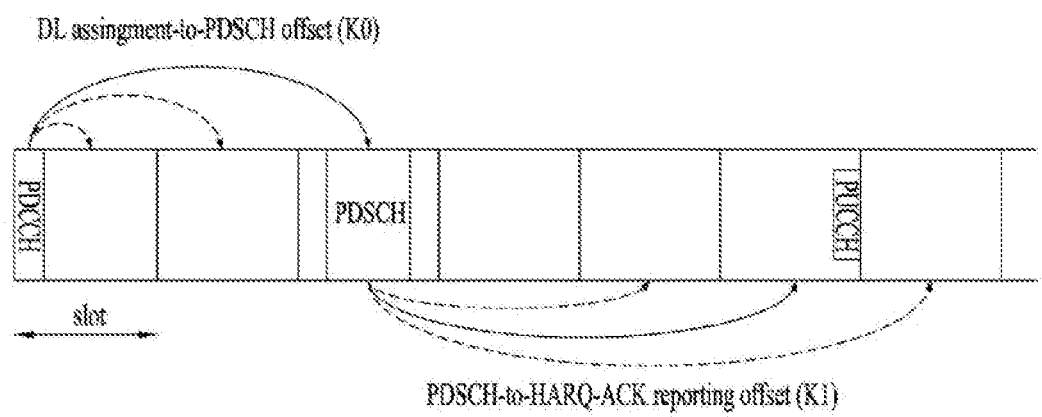
FIG. 5 illustrates an exemplary acknowledgment/negative acknowledgment (ACK/NACK) transmission process.

FIG. 5 illustrates an exemplary ACK/NACK transmission process. Referring to FIG. 5, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 and DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot PDSCH-to-HARQ_feedback timing indicator: Indicates K1.

HARQ process number (4 bits): Indicates the HARQ process ID of data (e.g., a PDSCH or TB).

PUCCH resource indicator (PRI): Indicates a PUCCH resource to be used for UCI transmission among a plurality of PUCCH resources in a PUCCH resource set.

After receiving a PDSCH in slot #(n+K0) according to the scheduling information of slot #n, the UE may transmit UCI on a PUCCH in slot #(n+K1). The UCI may include an HARQ-ACK response to the PDSCH. FIG. 5 is based on the assumption that the SCS of the PDSCH is equal to the SCS of the PUCCH, and slot #n1=slot #(n+K0), for convenience, which should not be construed as limiting the present disclosure. When the SCSs are different, K1 may be indicated/interpreted based on the SCS of the PUCCH.

In the case where the PDSCH is configured to carry one TB at maximum, the HARQ-ACK response may be configured in one bit. In the case where the PDSCH is configured to carry up to two TBs, the HARQ-ACK response may be configured in 2 bits if spatial bundling is not configured and in 1 bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Whether the UE should perform spatial bundling for an HARQ-ACK response may be configured for each cell group (e.g., by RRC/higher layer signaling). For example, spatial bundling may be configured for each individual HARQ-ACK response transmitted on the PUCCH and/or HARQ-ACK response transmitted on the PUSCH.

When up to two (or two or more) TBs (or codewords) may be received at one time (or schedulable by one DCI) in a corresponding serving cell (e.g., when a higher layer parameter maxNrofCodeWordsScheduledByDCI indicates 2 TBs), spatial bundling may be supported. More than four layers may be used for a 2-TB transmission, and up to four layers may be used for a 1-TB transmission. As a result, when spatial bundling is configured for a corresponding cell group, spatial bundling may be performed for a serving cell in which more than four layers may be scheduled among serving cells of the cell group. A UE which wants to transmit an HARQ-ACK response through spatial bundling may generate an HARQ-ACK response by performing a (bit-wise) logical AND operation on A/N bits for a plurality of TBs.

For example, on the assumption that the UE receives DCI scheduling two TBs and receives two TBs on a PDSCH based on the DCI, a UE that performs spatial bundling may generate a single A/N bit by a logical AND operation between a first A/N bit for a first TB and a second A/N bit for a second TB. As a result, when both the first TB and the second TB are ACKs, the UE reports an ACK bit value to a BS, and when at least one of the TBs is a NACK, the UE reports a NACK bit value to the BS.

For example, when only one TB is actually scheduled in a serving cell configured for reception of two TBs, the UE may generate a single A/N bit by performing a logical AND operation on an A/N bit for the one TB and a bit value of 1. As a result, the UE reports the A/N bit for the one TB to the BS.

There are plurality of parallel DL HARQ processes for DL transmissions at the BS/UE. The plurality of parallel HARQ processes enable continuous DL transmissions, while the BS is waiting for an HARQ feedback indicating successful or failed reception of a previous DL transmission. Each HARQ process is associated with an HARQ buffer in the medium access control (MAC) layer. Each DL HARQ process manages state variables such as the number of MAC physical data unit (PDU) transmissions, an HARQ feedback for a MAC PDU in a buffer, and a current redundancy version. Each HARQ process is identified by an HARQ process ID.

Figure 6:
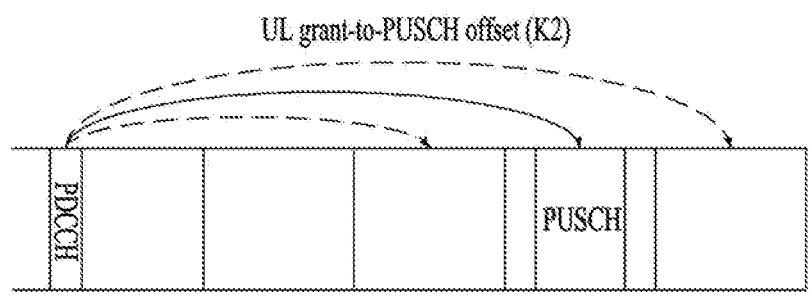
FIG. 6 illustrates an exemplary physical uplink shared channel (PUSCH) transmission process.

FIG. 6 illustrates an exemplary PUSCH transmission procedure. Referring to FIG. 6, the UE may detect a PDCCH in slot #n. The PDCCH includes DL scheduling information (e.g., DCI format 1_0 or 1_1). DCI format 1_0 or 1_1 may include the following information.

Frequency domain resource assignment: Indicates an RB set assigned to the PUSCH.

Time domain resource assignment: Indicates a slot offset K2 and the starting position (e.g. OFDM symbol index) and duration (e.g. the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

Figure 7:
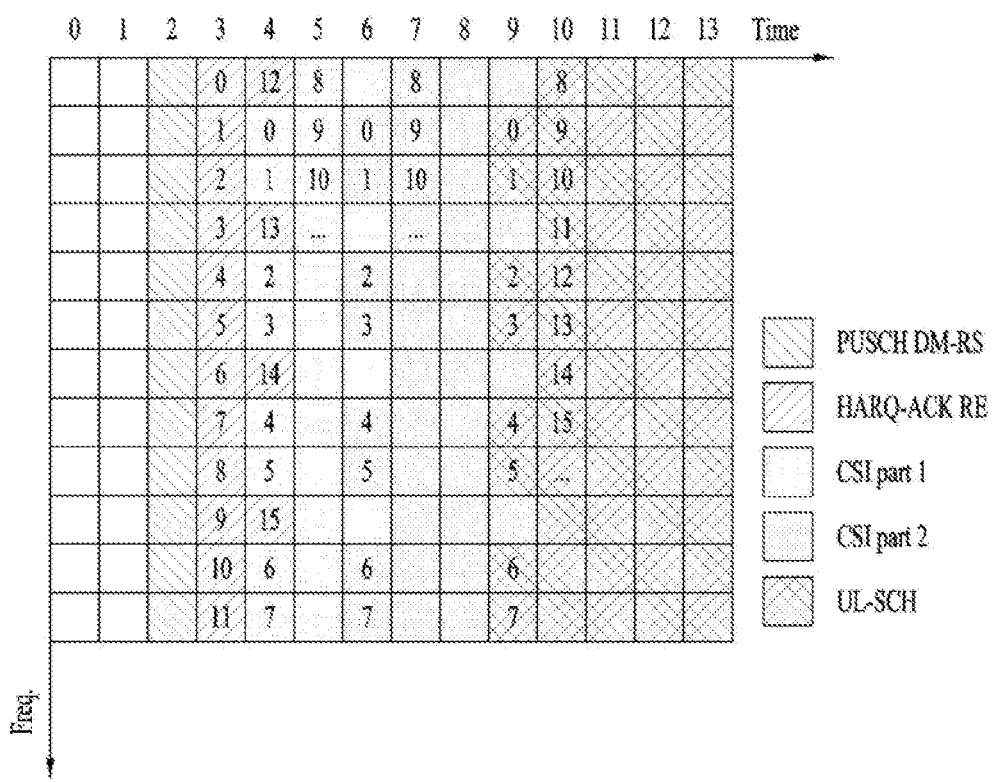
FIG. 7 illustrates an example of multiplexing control information in a PUSCH.

FIG. 7 illustrates exemplary multiplexing of UCI in a PUSCH. When a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 7, an HARQ-ACK and CSI are carried in a PUSCH resource.

For piggyback of an HARQ-ACK to a PUSCH in NR Rel. 16, when the payload of the HARQ-ACK is 2 or fewer bits, PUSCH data REs (and/or CSI part 2 REs) are punctured, and when the payload of the HARQ-ACK is more than 2 bits, rate-matching is performed. Table 6 describes HARQ-ACK rate matching of UCI in TS38.212.

TABLE 6

6.3.2.4 Rate matching
6.3.2.4.1 UCI encoded by Polar code
6.3.2.4.1.1 HARQ-ACK
For HARQ-ACK transmission on PUSCH with UL-SCH, the number of coded modulation symbols per layer for HARQ-ACK transmission, denoted as $Q'_{ACK}$, is determined as follows:

$$Q'_{ACK} = \min\left\{ \left\lceil \frac{(O_{ACK} + L_{ACK}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \left\lceil \alpha \cdot \sum_{l=l_0}^{N^{PUSCH}_{symb,all}-1} M^{UCI}_{sc}(l) \right\rceil \right\}$$

where
- $O_{ACK}$ is the number of HARQ-ACK bits;
- if $O_{ACK} \geq 360$, $L_{ACK} = 11$; otherwise $L_{ACK}$ is the number of CRC bits for HARQ-ACK determined according to Clause 6.3.1.2.1;
- $\beta^{PUSCH}_{offset} = \beta^{HARQ-ACK}_{offset}$;
- $C_{UL-SCH}$ is the number of code blocks for UL-SCH of the PUSCH transmission;
- if the DCI format scheduling the PUSCH transmission includes a CBGTI field indicating that the UE shall not transmit the r-th code block, $K_r = 0$ ;otherwise, $K_r$ is the r-, th code block size for UL-SCH of the PUSCH transmission;

TABLE 6-continued

- $M_{sc}^{PUSCH}$ is the scheduled bandwidth of the PUSCH transmission, expressed as a number of subcarriers;
- $M_{sc}^{PT-RS}(l)$ is the number of subcarriers in OFDM symbol l that carries PTRS, in the PUSCH transmission;
- $M_{sc}^{PUCI}(l)$ is the number of resource elements that can be used for transmission of UCI in OFDM symbol l, for $l = 0, 1, 2, \ldots, N_{symb,all}^{PUSCH}-1$, in the PUSCH transmission and $N_{symb,all}^{PUSCH}$ is the total number of OFDM symbols of the PUSCH, including all OFDM symbols used for DMRS;
- for any OFDM symbol that carries DMRS of the PUSCH, $M_{sc}^{UCI}(l) = 0$;
- for any OFDM symbol that does not carry DMRS of the PUSCH, $M_{sc}^{UCI}(l) = M_{sc}^{PUSCH} - M_{sc}^{PT-RS}(l)$;
- $\alpha$ is configured by higher layer parameter scaling;
- $l_0$ is the symbol index of the first OFDM symbol that does not carry DMRS of the PUSCH, after the first DMRS symbol(s), in the PUSCH transmission.

For HARQ-ACK transmission on an actual repetition of a PUSCH with repetition Type B with UL-SCH, the number of coded modulation symbols per layer for HARQ-ACK transmission, denoted as $Q'_{ACK}$, is determined as follows:

$$Q'_{ACK} = \min\left\{ \left\lceil \frac{(O_{ACK} + L_{ACK}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r} \right\rceil, \left\lceil \alpha \cdot \sum_{l=0}^{N_{symb,nominal}^{PUSCH}-1} M_{sc,nominal}^{UCI}(l) \right\rceil, \sum_{l=0}^{N_{symb,actual}^{PUSCH}-1} M_{sc,actual}^{UCI}(l) \right\}$$

where
- $M_{sc,nominal}^{UCI}(l)$ is the number of resource elements that can be used for transmission of UCI in OFDM symbol l, for $l = 0, 1, 2, \ldots, N_{symb, nominal}^{PUSCH}-1$, in the PUSCH transmission assuming a nominal repetition without segmentation, and $N_{symbol, nominal}^{PUSCH}$ is the total number of OFDM symbols in a nominal repetition of the PUSCH, including all OFDM symbols used for DMRS;
- for any OFDM symbol that carries DMRS of the PUSCH assuming a nominal repetition without segmentation, $M_{sc, nominal}^{UCI}(l) = 0$,
- for any OFDM symbol that does not carry DMRS of the PUSCH assuming a nominal repetition without segmentation, $M_{sc, nominal}^{UCI}(l) = M_{sc}^{PUSCH} - M_{sc, nominal}^{PT-RS}(l)$ where $M_{sc, nominal}^{PT-RS}(l)$ is the number of subcarriers in OFDM symbol l that carries PTRS, in the PUSCH transmission assuming a nominal repetition without segmentation;
- $M_{sc, actual}^{UCI}(l)$ is the number of resource elements that can be used for transmission of UCI in OFDM symbol l, for $l = 0, 1, 2, \ldots, N_{symb, actual}^{PUSCH}-1$, in the actual repetition of the PUSCH transmission, and $N_{symb,actual}^{PUSCH}$ is the total number of OFDM symbols in the actual repetition of the PUSCH transmission, including all OFDM symbols used for DMRS;
- for any OFDM symbol that carries DMRS of the actual repetition of the PUSCH transmission, $M_{sc, actual}^{UCI}(l) = 0$;
- for any OFDM symbol that does not carry DMRS of the actual repetition of the PUSCH transmission, $M_{sc, actual}^{UCI}(l) = M_{sc}^{PUSCH} - M_{sc, actual}^{PT-RS}(l)$ where $M_{sc, actual}^{PT-RS}(l)$ is the number of subcarriers in OFDM symbol l that carries PTRS, in the actual repetition of the PUSCH transmission;
- and all the other notations in the formula are defined the same as for PUSCH not using repetition type B.

For HARQ-ACK transmission on PUSCH without UL-SCH, the number of coded modulation symbols per layer for HARQ-ACK transmission, denoted as $Q'_{ACK}$, is determined as follows:

$$Q'_{ACK} = \min\left\{ \left\lceil \frac{(O_{ACK} + L_{ACK}) \cdot \beta_{offset}^{PUSCH}}{R \cdot Q_m} \right\rceil, \left\lceil \alpha \cdot \sum_{l=l_0}^{N_{symb,all}^{PUSCH}-1} M_{sc}^{UCI}(l) \right\rceil \right\}$$

where
- $O_{ACK}$ is the number of HARQ-ACK bits;
- if $O_{ACK} \geq 360$, $L_{ACK} = 11$; otherwise $L_{ACK}$ is the number of CRC bits for HARQ-ACK defined according to Clause 6.3.1.2.1;;
- $\beta_{offset}^{PUSCH} = \beta_{offset}^{HARQ-ACK}$;
- $M_{sc}^{PUSCH}$ is the scheduled bandwidthof the PUSCH transmission, expressed as a number of subcarries;
- $M_{sc}^{PT-RS}$ is the number of subcarriers in OFDM symbol l that carries PTRS, in the PUSCH transmission;
- $M_{sc}^{UCI}(l)$ is the number of resource elements that can be used for transmission of UCI in OFDM symbol l, for $l = 0, 1, 2, \ldots, N_{symb, all}^{PUSCH}-1$, in the PUSCH transmission and $N_{symb, all}^{PUSCH}$ is the total number of OFDM symbols of the PUSCH, including all OFDM symbols used for DMRS;
- for any OFDM symbol that carries DMRS of the PUSCH, $M_{sc}^{UCI}(l) = 0$;
- for any OFDM symbol that does not carry DMRS of the PUSCH, $M_{sc}^{UCI}(l) = M_{sc}^{PUSCH} - M_{sc}^{PT-RS}(l)$;

In Table 6, a beta offset '$\beta_{offset}^{PUSCH}$', which is a weight for rate-matching of UCI on a PUSCH, is related to the amount of resources to be used for an HARQ-ACK and a CSI report during PUSCH transmission. A $\beta_{offset}$ set s may be configured by higher-layer signaling. A specific set may be used semi-statically, or a $\beta_{offset}$ set may be indicated dynamically by DCI (e.g., DCI format 0_1/0_2). In the dynamic $\beta_{offset}$ indication scheme, a beta offset indication field of DCI includes two bits indicating one of four $\beta_{offset}$ sets configured for a UE. Each $\beta_{offset}$ set includes three $\beta_{offset}$ values applicable to an HARQ-ACK, two $\beta_{offset}$ values for CSI Part 1, and two $\beta_{offset}$ values for CSI Part 2, and a specific $\beta_{offset}$ is selected according to a corresponding payload size. For example, a first $\beta_{offset}^{HARQ-ACK}$ value may be used to transmit M HARQ-ACKs on the PUSCH, and a second $\beta_{offset}^{HARQ\text{-}ACK}$ value may be used to transmit N HARQ-ACKs on the PUSCH.

The meanings of terms as used herein are summarized as follows. To help the understanding of the terms, FIG. 5/6 and its description may be referred to.

K0 (DL assignment-to-PDSCH offset): A slot interval between a DCI transmission slot and a PDSCH transmission slot (scheduled by corresponding DCI).

SLIV (Start and Length Indicator Value): Information about the starting symbol and symbol duration (or ending symbol) of a PDSCH (PDSCH occasion).

Mapping type: Information indicating whether the position of a DMRS symbol of a PDSCH is determined based on a symbol index within a slot duration or within a PDSCH duration.

TDRA (Time Domain Resource Assignment) table: Includes a plurality of {K0, SLIV, mapping type} combinations (configured by RRC) (one combination is mapped to each of a plurality of rows in the table). A specific one row is indicated by DCI.

K1 (PDSCH-to-HARQ feedback timing indicator): A slot interval between a PDSCH transmission slot and an HARQ-ACK transmission slot (for a corresponding PDSCH reception).

Multiplexing Between Different Priorities for URLLC Support

To recently support data transmission/services to which reliability/latency performance is important, such as URLLC, a service/protection priority (e.g., low priority (LP) or high priority (HP)) may be configured semi-statically for the UE (by RRC signaling or the like) or indicated dynamically to the UE (by DCI/MAC signaling).

Specifically, a priority indicator has been introduced to some DCI formats (e.g., DCI format 1_1/1_2 for DL, and DCI format 0_1/0_2 for UL) in NR Rel. 16. When it is configured by higher-layer signaling that the priority indicator will be provided for a corresponding DCI format, the UE performs blind-decoding for the DCI format, assuming the existence of the priority indicator. Without explicit signaling indicating that the priority indicator will be used for the DCI format by higher-layer signaling, the UE performs blind-decoding, assuming that a priority indicator field is not included in the DCI format. When no priority information is provided for a corresponding DL/UL signal, the UE may assume that the DL/UL signal has the LP (e.g., priority index=0). Those skilled in the art will understand that the priority indicator of DCI is a merely one of various means for indicating/configuring a priority, not the sole method.

In an example of the above prioritization, a lower priority index may be configured/indicated for the LP, and a higher priority index may be configured/indicated for the HP, or a lower bit value (e.g., bit '0') may be configured/indicated for the LP, and a higher bit value (e.g., bit '1') may be configured/indicated for the HP.

For example, a priority (e.g., LP or HP) may be configured/indicated for each PUCCH/PUSCH resource configured/indicated for each UCI type (e.g., HARQ-ACK, SR, and/or CSI) or for a corresponding UCI transmission. For example, the LP/HP may be indicated for an HARQ-ACK for a PDSCH by DL grant DCI that schedules the PDSCH. For example, the LP/HP may be indicated for (aperiodic) CSI by DCI (e.g., UL grant DCI scheduling a PUSCH).

In another example, (i) a PUCCH resource set may be configured independently for each priority, and/or (ii) a maximum UCI coding rate for PUCCH transmission may be configured independently for each priority. In another example, (iii) a beta offset $\beta_{offset}$ for encoding UCI (e.g., for an HARQ-ACK and CSI Part 1/2, see Table 6) on a PUSCH may be configured independently for each priority and/or (iv) an HARQ-ACK codebook type may be configured independently for each priority. At least one or a combination of (i) to (iv) may be used.

Depending on HARQ-ACK bit (payload) configuration methods, three HARQ-ACK codebook types are defined: Type-1, Type-2, and Type-3. In the case of a Type-1 codebook, HARQ-ACK payload is configured according to a combination of a candidate HARQ-ACK timing (K1) set and a candidate PDSCH occasion (SLIV) set (for a corresponding cell, which are configured on a cell basis) (e.g., a codebook of a fixed size semi-statically configured by RRC signaling). In the case of a Type-2 codebook, a codebook size may be dynamically changed according to the number of actually scheduled PDSCHs or the number of corresponding resource allocations. In the case of a Type-3 codebook, HARQ-ACK payload is configured by mapping an HARQ-ACK bit corresponding to a corresponding HARQ process number (HPN) on an HPN basis according to a maximum number of HARQ processes (configured for the corresponding cell on a cell basis) (e.g., one-shot A/N reporting).

Specifically in the Type-1 codebook, with a set of a plurality of (e.g., N) candidate K1 values (for the corresponding cell on a cell basis), all SLIV combinations available for (or schedulable for transmission in) a DL slot earlier than an A/N transmission slot by K1 slots may be calculated, A/N sub-payload corresponding to the DL slot may be configured (including determination of an A/N bit position/order corresponding to each SLIV available for the slot) (this is defined as "SLIV pruning"), and an entire A/N codebook may be configured by concatenating the A/N sub-payload for the N K1 values. The set of (N) DL slots corresponding to each K1 value may be defined as a bundling window corresponding to an A/N transmission slot.

Specifically regarding the Type-3 codebook, the BS may configure the UE with one of Mode 1 in which an HARQ-ACK and a corresponding new data indicator (NDI) are fed back together and Mode 2 in which only an HARQ-ACK is fed back without an NDI. When the UE is configured with Mode 1, the UE feeds back an HARQ-ACK for a PDSCH reception of a corresponding HPN, together with an NDI (indicated by DCI) on an HPN basis. When the UE is configured with Mode 2, the UE feeds back only an HARQ-ACK for a PDSCH reception of a corresponding HPN, on an HPN basis.

To map/transmit a combination(s) of a plurality of UCIs configured/indicated as having different priorities (e.g., LP and HP) in the same one UL signal/channel (e.g., a PUCCH or PUSCH resource), a new rule/operation for a UCI encoding scheme, an RE mapping order, and/or a PUCCH resource determination needs to be defined. For this purpose, the following methods are proposed.

[Proposal 1]

1) P1_Opt 1

A. The UE may encode LP UCI and HP UCI separately/individually and map/transmit the encoded LP UCI and HP UCI in the same one PUCCH resource (e.g., in the same PUCCH signal/transmission).

i. For convenience of description, it is assumed that the payload sizes of the LP UCI and the HP UCI are UL and UH, respectively, and the total number of REs (available for UCI mapping) in the PUCCH resource is N.

Figure 8:
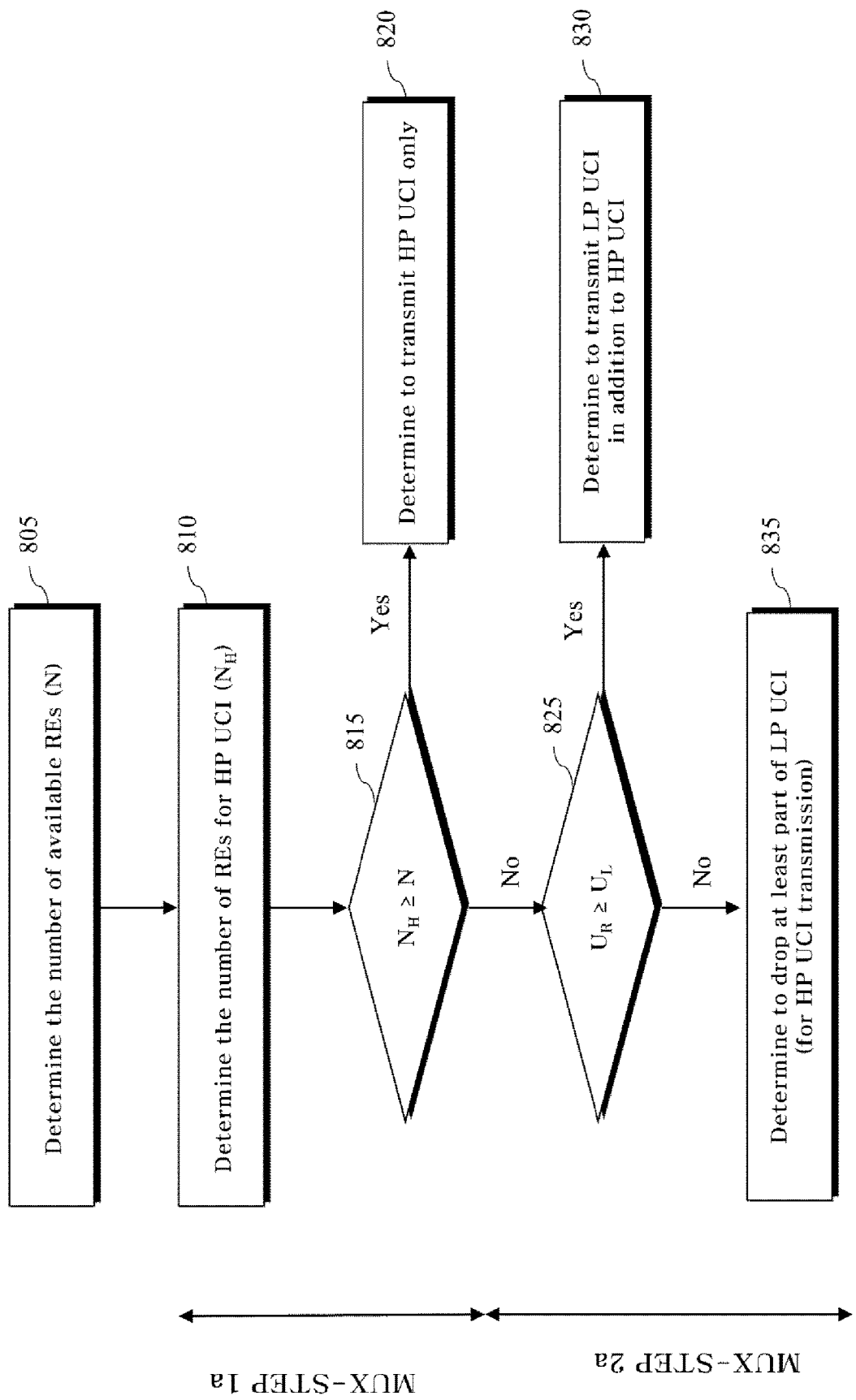
FIG. 8 is a diagram illustrating uplink control information (UCI) encoding according to an embodiment of the present disclosure.

1. In a specific example, the (content) types of both the LP UCI and the HP UCI may be or include HARQ-ACK. In another example, the type of the LP UCI may be or include (periodic) CSI, whereas the type of the HP UCI may be or include HARQ-ACK.

ii. For example, referring to FIG. 8, the UE may first determine the number $N_H$ of REs required for mapping the coded bits of the HP UCI based on the payload size of the HP UCI and a maximum UCI coding rate configured for an HP PUCCH (or the HP UCI) (810). If $N_H<N$, the UE may map/transmit the entire HP UCI to/in specific $N_H$ REs among N RE(s) (830 and 835). (This is defined as "MUX-STEP 1a", for convenience).

1. When $N_H \geq N$, the UE may map/transmit only (all or a part of) the HP UCI to/in the N REs, while dropping the entire LP UCI not to be mapped/transmitted (820).

iii. Then, the UE may determine a maximum payload size $U_R$ of the LP UCI, that can be mapped to $\{N-N_H\}$ REs based on the remaining $\{N-N_H\}$ REs and a maximum UCI coding rate configured for an LP PUCCH (or the LP UCI).

iv. The UE may then compare $U_R$ with UL. When $U_R \geq U_L$, the UE may map/transmit the whole LP UCI to/in (all or some of) the $\{N-N_H\}$ REs (830). When $U_R<U_L$, the UE may drop the whole LP UCI not to be mapped/transmitted, or may drop a part of the LP UCI and map/transmit only the remaining part in the $\{N-N_H\}$ REs (835). (This is defined as "MUX-STEP 2a", for convenience).

1. When the type of the LP UCI is HARQ-ACK, the UE may configure payload in a size equal to or less than $U_R$ by bundling ACKs/NACKs, and then map/transmit the bundled HARQ-ACK to/in (all or some of) the $\{N-N_H\}$ REs.

2. "MUX-STEP 1a" may be understood as an HP UCI mapping/transmission process, and "MUX-STEP 2a" may be understood as an LP UCI mapping/transmission process. For example, an exemplary UE operation may be performed as follows, without a description of a process of determining a total number N of REs available for a PUCCH resource, the payload size $U_H$ of HP UCI, and the payload size $U_L$ of LP UCI (on the assumption that N, $U_H$, and $U_L$ are already given).

The UE may perform "MUX-STEP 1a": the HP UCI mapping/transmission process. The UE may determine the number $N_H$ of REs required for mapping the HP UCI coded bits.

The UE may perform "MUX-STEP 2a": the LP UCI mapping/transmission process. The UE may determine the number (=N−NH) of the remaining REs. The UE may determine the maximum payload size UR of the LP UCI, can be mapped to the remaining Res based on the number of remaining REs. The UE may perform LP UCI mapping/transmission based on UL and UR.

v. For example, UCI-to-RE mapping may be performed based on a UCI priority and a symbol index. In the above example, the UCI (coded bits) may be mapped to REs in the following order. (i) First, the coded bits of the HP UCI may start to be mapped to REs (or subcarriers) in a first OFDM symbol (a lowest indexed symbol) of a PUCCH and then sequentially to REs (or subcarriers) in an OFDM symbol with the next lower index (a second lowest indexed symbol). (ii) After the HP UCI is completely mapped, the coded bits of the LP UCI may be mapped to RE(s) in an OFDM symbol with an index (higher than those of the HP UCI symbols). This mapping structure may be used (configured/assumed/defined/indicated) between the BS and the UE. The UCI coded bits/modulation symbols may be mapped to REs within the same symbol in ascending or descending order of subcarrier indexes.

1. Characteristically, when frequency hopping is configured/indicated for a PUCCH transmission, a structure in which the coded bits of the HP UCI are mapped first to (REs in an earlier symbol of) an earlier frequency hop (in time) may be used (configured/assumed/defined/indicated) between the BS and the UE.

vi. For example, the drop order of the LP UCI (e.g., HARQ-ACK) may be determined (differently) based on an HARQ-ACK codebook type configured for the LP, as follows.

vii. Type-1 codebook: (When a plurality of cells are configured), a cell index may be considered for dropping. A structure in which an HARQ-ACK (A/N bits) for a PDSCH occasion configured/schedulable for a higher (serving) cell index is first dropped may be used (configured/assumed/defined/indicated) between the BS and the UE. For example, in the same cell or when only a single cell is configured, a structure in which an HARQ-ACK (A/N bits) for a PDSCH occasion having a later starting/ending symbol timing is first dropped may be used (configured/assumed/defined/indicated) between the BS and the UE. In another method, a structure in which an HARQ-ACK corresponding to a higher bit index is first dropped from HARQ-ACK payload of the Type-1 codebook may be used (configured/assumed/defined/indicated) between the BS and the UE.

1. For example, HARQ-ACKs of a plurality of PDSCH occasions configured for a highest cell index may be sequentially dropped, such that an HARQ-ACK of a PDSCH occasion with a last starting/ending timing configured in the highest cell index may first be dropped, and then an HRAQ-ACK of a PDSCH occasion with a second last starting/ending timing configured for the highest cell index may be dropped. HARQ-ACKs for the highest cell index are all dropped, and (when an additional drop is needed,) an HARQ-ACK of a PDSCH occasion configured for a second highest cell index may be first dropped (HARQ-ACKs may be sequentially dropped, starting from an HARQ-ACK of a PDSCH occasion having a later starting/ending time). This structure may be used (configured/assumed/defined/indicated) between the BS and the UE.

2. In the above example, an HARQ-ACK (bit number) unit to be dropped may be an HARQ-ACK (A/N bits) corresponding to one bit, one TB, one PDSCH, or one CBG. In the same PDSCH, A/N bit(s) associated with a higher bit/TB/CBG index may first be dropped, whereas in the same TB, A/N bit(s) associated with a higher bit index/CBG index may first be dropped.

3. In another example, a structure in which HARQ-ACKs are dropped, starting from an HARQ-ACK corresponding to a higher bit index in HARQ-ACK payload of the Type-1 codebook may be used (configured/assumed/defined/indicated) between the BS and the UE. In this case, an HARQ-ACK (bit number) unit (e.g., a minimum unit) to be dropped may be an HARQ-ACK (A/N bits) corresponding to one bit, one TB, one PDSCH, or one CBG.

4. Although the UE may sequentially drop HARQ-ACKs according to the above-described rule, the UE may drop only up to a minimum number of HARQ-ACKs satisfying $U_R \geq U_L$.

viii. Type-2 codebook: HARQ-ACK (bits) may be dropped based on a DAI value. For example, a structure may be used (configured/assumed/defined/indicated) between the BS and the UE, in which a HARQ-ACK (A/N bits) corresponding to a PDSCH occasion having a higher scheduling order (higher-counter DAI) value determined based on a DAI value indicated by DCI is first dropped. Alternatively, a structure in which an HARQ-ACK corresponding to a higher bit index in HARQ-ACK payload of the Type-2 codebook may be used (configured/assumed/defined/indicated) between the BS and the UE.

1. For example, a structure may be used between the BS and the UE, in which an HARQ-ACK corresponding to a higher counter-DAI value is first dropped (this is referred to as "DAI-based drop", for convenience). An HARQ-ACK (bit number) unit (e.g., a minimum unit) to be dropped based on the DAI-based drop scheme may be an HARQ-ACK (A/N bits) corresponding to one A/N bit, one TB, one PDSCH, or one CBG. In the same PDSCH, A/N bit(s) associated with a higher bit/TB/CBG index may first be dropped, whereas in the same TB, A/N bit(s) associated with a higher bit/CBG index may first be dropped.

2. When the Type-2 codebook includes at least two of three sub-codebooks {TB sub-codebook for TB-wise/based PDSCH transmission, CBG sub-codebook for CBG-wise/based PDSCH transmission, SPS sub-codebook for SPS PDSCH transmission}, a structure of dropping HARQ-ACKs in the following order may be used. The DAI-based drop or bit-based drop scheme may be applied to the TB sub-codebook and the CBG sub-codebook, and the bit-based drop scheme may be applied to the SPS sub-codebook.

P1_Opt 1_1) The UE may drop TB sub-codebook-based A/N(s), CBG sub-codebook-based A/N(s), and SPS sub-codebook-based A/N(s) in this order.

P1_Opt 1_2) The UE may drop TB sub-codebook-based A/N(s), SPS sub-codebook-based A/N(s), and CBG sub-codebook-based A/N(s) in this order.

P1_Opt 1_3) The UE may drop CBG sub-codebook-based A/N(s), TB sub-codebook-based A/N(s), and SPS sub-codebook-based A/N(s) in this order.

P1_Opt 1_4) The UE may drop CBG sub-codebook-based A/N(s), SPS sub-codebook-based A/N(s), and TB sub-codebook-based A/N(s) in this order.

P1_Opt 1_5) The UE may drop SPS sub-codebook-based A/N(s), TB sub-codebook-based A/N(s), and CBG sub-codebook-based A/N(s) in this order.

P1_Opt 1_6) The UE may drop SPS sub-codebook-based A/N(s), CBG sub-codebook-based A/N(s), and TB sub-codebook-based A/N(s) in this order.

3. For example, a structure may be used, in which an HARQ-ACK corresponding to a higher bit index in HARQ-ACK payload (of the Type-2 codebook) is first dropped (this is referred to as "bit-based drop", for convenience). An HARQ-ACK (bit number) unit to be dropped based on the bit-based drop scheme may be an HARQ-ACK (A/N bits) corresponding to one bit, one TB, one PDSCH, or one CBG.

4. Although the UE may sequentially drop HARQ-ACKs according to the above-described rule, the UE may drop only up to a minimum number of HARQ-ACKs satisfying $U_R \geq U_L$.

ix. In MUX-STEP 2a, a structure may be used (configured/assumed/defined/indicated) between the BS and the UE, in which HARQ-ACK bundling is performed (for the LP UCI) before an LP HARQ-ACK is dropped. This is because transmission of an LP UCI HARQ-ACK of a size reduced through bundling may be preferred to dropping the (whole) LP UCI HARQ-ACK.

1. When at least one of two PDSCH transmission types {PDSCH transmission carrying up to two TBs, CBG-wise-based PDSCH transmission} is configured/scheduled, a structure may be used (configured/assumed/defined/indicated) between the BS and the UE, in which an HARQ-ACK bundling operation and an HARQ-ACK drop operation are performed in the following order.

P1_Opt 1(a): In the state in which HARQ-ACK payload is configured by bundling all HARQ-ACKs for (a plurality of) TB(s)/CBG(s) on one PDSCH, such that a 1-bit HARQ-ACK is generated for each PDSCH, when the size of the HARQ-ACK payload size satisfies $U_R \geq U_L$, the UE maps/transmits the HARQ-ACK payload without HARQ-ACK drop. When the size of the configured HARQ-ACK payload does not satisfy $U_R \geq U_L$, the UE may apply the above-described HARQ-ACK drop method (at least partially) (to the bundled HARQ-ACK (bits)).

P1_Opt 1(b): In the state in which HARQ-ACK payload is configured by bundling all HARQ-ACKs for (a plurality of) CBG(s) forming one TB, such that a 1-bit HARQ-ACK is generated for each TB, when the size of the HARQ-ACK payload satisfies $U_R \geq U_L$, the UE may map/transmit the HARQ-ACK payload without HARQ-ACK drop. When the size of the configured HARQ-ACK payload does not satisfy $U_R \geq U_L$, the UE may apply P1_Opt 1(a) (in which all HARQ-ACKs for (a plurality of) TB(s)/CBG(s) on one PDSCH are bundled).

2) P1_Opt 2

A. The UE may encode (e.g., jointly encode) the LP UCI and the HP UCI and map/transmit the encoded LP UCI and HP UCI in the same one PUCCH resource (set).

i. It is assumed that the payload sizes of the LP UCI and the HP UCI are $U_L$ and $U_H$, respectively, and the total number of REs (available for UCI mapping) in the PUCCH resource is N.

1. For example, the types of both the LP UCI and the HP UCI may be HARQ-ACK. In another example, the type of the LP UCI may be (periodic) CSI, whereas the type of the HP UCI may be HARQ-ACK.

ii. First, the UE may determine a maximum UCI payload size UM mappable to N REs based on the N REs and a maximum UCI coding rate configured for an HP PUCCH (or the HP UCI).

iii. The UE may then compare $U_M$ with $U_H$. When $U_M > U_H$, the UE may map/transmit the whole HP UCI (by encoding the HP UCI) in the PUCCH resource (This is defined as "MUX-STEP 1b", for convenience).

1. Otherwise, when $U_M \leq U_H$, the UE may map/transmit only (all or part of) the HP UCI to/in the N REs (in the PUCCH resource), while dropping the whole LP UCI not to be mapped/transmitted.

iv. The UE may then compare $\{U_M - U_H\}$ with $U_L$. When $\{U_M - U_H\} \geq U_L$, the UE may map/transmit the whole LP UCI (by jointly encoding the LP UCI with the HP UCI) in the PUCCH resource. When $\{U_M - U_H\} < U_L$, the UE may drop the whole LP UCI not to be mapped/transmitted or may drop part of the LP UCI, while mapping/transmitting only the remaining part in the PUCCH resource (by jointly encoding the remaining part with the HP UCI) (This is defined as "MUX-STEP 2b", for convenience).

v. When the type of the LP UCI is HARQ-ACK, the UE may configure payload of the LP UCI in a size equal to or less than $\{U_M - U_H\}$ by bundling ACKs/NACKs, and then map/transmit the bundled HARQ-ACK in the PUCCH resource (by jointly encoding the bundled HARQ-ACK with the HP UCI).

For example, (i) when $U_M \geq U_H + U_L$, the UE may map/transmit the HP UCI and the LP UCI in the N RE(s) (through joint encoding), and (ii) when $U_M - U_H < U_L$, the UE may map only part of the LP UCI (by jointly encoding the part of the LP UCI with the HP UCI), or map/transmit the LP UCI (by jointly encoding the LP UCI with the HP UCI) in the N RE(s) after A/N spatial bundling of the LP UCI or drop the LP UCI.

vi. In the above example, UCI bits of the joint-encoded UCI payload may be mapped to REs in the following order. First, the HP UCI (e.g., an HARQ-ACK and/or an SR) may first be mapped to a lower bit index, starting from the most significant bit (MSB), and then the LP PCI may be mapped to the following (higher) bit index. This structure may be used (configured/assumed/defined/indicated) between the BS and the UE.

vii. For example, the drop order of the LP UCI (e.g., HARQ-ACK) may be determined (differently) based on an HARQ-ACK codebook type configured for the LP, as follows.

viii. Type-1 codebook: A structure in which an HARQ-ACK (A/N bits) corresponding to a PDSCH occasion configured/schedulable for a higher (serving) cell index is first dropped may be used (configured/assumed/defined/indicated) between the BS and the UE. For example, for one cell, a structure in which an HARQ-ACK (A/N bits) corresponding to a PDSCH occasion having a later starting/ending symbol timing is first dropped may be used (configured/assumed/defined/indicated) between the BS and the UE. In another method, a structure in which an HARQ-ACK corresponding to a higher bit index in HARQ-ACK payload of the Type-1 codebook is first dropped may be used (configured/assumed/defined/indicated) between the BS and the UE.

1. For example, HARQ-ACKs corresponding to a plurality of PDSCH occasions configured for a highest cell index may be sequentially dropped, such that an HARQ-ACK corresponding to a PDSCH occasion with a last starting/ending timing configured for the highest cell index is first dropped, and then an HRAQ-ACK corresponding to a PDSCH occasion with a second last starting/ending timing configured for the highest cell index is dropped. HARQ-ACKs for the highest cell index are all dropped, and (when an additional drop is needed,) an HARQ-ACK corresponding to a PDSCH occasion configured for a second highest cell index is first dropped (HARQ-ACKs are sequentially dropped, starting from an HARQ-ACK corresponding to a PDSCH occasion having a later starting/ending time). This structure may be used (configured/assumed/defined/indicated) between the BS and the UE.

2. In the above example, an HARQ-ACK (bit number) unit to be dropped may be an HARQ-ACK (A/N bits) corresponding to one bit, one TB, one PDSCH, or one CBG. In one PDSCH, A/N bit(s) associated with a higher bit/TB/CBG index may first be dropped, whereas in one TB, A/N bit(s) associated with a higher bit index/CBG index may first be dropped.

3. In another example, a structure in which an HARQ-ACK corresponding to a higher bit index in the HARQ-ACK payload of the Type-1 codebook is first dropped may be used. In this case, an HARQ-ACK (bit number) unit to be dropped may be an HARQ-ACK (A/N bits) corresponding to one bit, one TB, one PDSCH, or one CBG.

4. Although the UE may sequentially drop HARQ-ACKs according to the above-described rule, the UE may drop only up to a minimum number of HARQ-ACKs satisfying $\{U_M - U_H\} \geq U_L$.

ix. Type-2 codebook: An HARQ-ACK (bits) may be dropped based on a DAI value. For example, a structure may be used (configured/assumed/defined/indicated) between the BS and the UE, in which a HARQ-ACK (A/N bits) corresponding to a PDSCH occasion having a higher scheduling order (higher counter-DAI) value determined based on a DAI value indicated by DCI is first dropped. Alternatively, a structure may be used (configured/assumed/defined/indicated) between the BS and the UE, in which an HARQ-ACK corresponding to a higher bit index in HARQ-ACK payload of the Type-2 codebook is first dropped.

1. For example, a structure (e.g., DAI-based drop) in which an HARQ-ACK corresponding to a higher counter-DAI value is first dropped may be used between the BS and the UE. An HARQ-ACK (bit number) unit to be dropped based on the DAI-based drop scheme may be an HARQ-ACK (A/N bits) corresponding to one A/N bit, one TB, one PDSCH, or one CBG. In one PDSCH, A/N bit(s) associated with a higher bit/TB/CBG index may first be dropped, whereas in one TB, A/N bit(s) associated with a higher bit/CBG index may first be dropped.

2. When the Type-2 codebook includes at least two of three sub-codebooks {TB sub-codebook for TB-wise/based PDSCH transmission, CBG sub-codebook for CBG-wise/based PDSCH transmission, SPS sub-codebook for SPS PDSCH transmission}, a structure of dropping HARQ-ACKs in the following order may be used. The DAI-based drop or bit-based drop scheme may be applied to the TB sub-codebook and the CBG sub-codebook, and the bit-based drop scheme may be applied to the SPS sub-codebook.

P1_Opt 2_1) The UE may drop TB sub-codebook-based A/N(s), CBG sub-codebook-based A/N(s), and SPS sub-codebook-based A/N(s) in this order.

P1_Opt 2_2) The UE may drop TB sub-codebook-based A/N(s), SPS sub-codebook-based A/N(s), and CBG sub-codebook-based A/N(s) in this order.

P1_Opt 2_3) The UE may drop CBG sub-codebook-based A/N(s), TB sub-codebook-based A/N(s), and SPS sub-codebook-based A/N(s) in this order.

P1_Opt 2_4) The UE may drop CBG sub-codebook-based A/N(s), SPS sub-codebook-based A/N(s), and TB sub-codebook-based A/N(s) in this order.

P1_Opt 2_5) The UE may drop SPS sub-codebook-based A/N(s), TB sub-codebook-based A/N(s), and CBG sub-codebook-based A/N(s) in this order.

P1_Opt 2_6) The UE may drop SPS sub-codebook-based A/N(s), CBG sub-codebook-based A/N(s), and TB sub-codebook-based A/N(s) in this order.

3. For example, a structure in which an HARQ-ACK corresponding to a higher bit index in the HARQ-ACK payload of the Type-2 codebook is first dropped may be used (e.g., bit-based drop). In this case, an HARQ-ACK (bit number) unit to be dropped may an HARQ-ACK (A/N bits) corresponding to be one bit, one TB, one PDSCH, or one CBG.

4. Although the UE may sequentially drop HARQ-ACKs according to the above-described rule, the UE may drop only up to a minimum number of HARQ-ACKs satisfying $\{U_M - U_H\} \geq U_L$.

x. In MUX-STEP 2b, a structure may be used (configured/assumed/defined/indicated) between the BS and the UE, in which HARQ-ACK bundling is performed (for the LP UCI) before the LP HARQ-ACK is dropped.

1. When at least one of twp. PDSCH transmission types {PDSCH transmission carrying up to two TBs, CBG-wise-based PDSCH transmission}, a structure in which an HARQ-ACK bundling operation and HARQ-ACK drop operation are performed in the following order may be used (configured/assumed/defined/indicated) between the BS and the UE.

P1_Opt i): In the state in which HARQ-ACK payload is configured by bundling all HARQ-ACKs for (a plurality of) TB(s)/CBG(s) on one PDSCH, such that a 1-bit HARQ-ACK is generated for each PDSCH, when the size of the HARQ-ACK payload satisfies $\{U_M - U_H\} \geq U_L$, the UE may map/transmit the HARQ-ACK payload without HARQ-ACK drop. When the size of the configured HARQ-ACK payload does not satisfy $U_R \geq U_L$, the UE may apply the above-described HARQ-ACK drop method (at least partially) (to the bundled HARQ-ACK (bits)).

P1_Opt ii): In the state in which HARQ-ACK payload is configured by bundling all HARQ-ACKs for (a plurality of) CBG(s) forming one TB, such that a 1-bit HARQ-ACK is generated for each TB, when the size of the HARQ-ACK payload satisfies $\{U_M - U_H\} \geq U_L$, the UE may map/transmit the HARQ-ACK payload without HARQ-ACK drop. When the size of the configured HARQ-ACK payload does not satisfy $\{U_M - U_H\} \geq U_L$, the UE may apply P1_Opt i) (in which all HARQ-ACKs for (a plurality of) TB(s)/CBG(s) on one PDSCH are bundled).

3) P1_Opt 3

A. A method of applying a different encoding scheme according to the payload size of the LP UCI, the payload size of the HP UCI, and/or a combination of them may be used. For example, the UE may determine a UCI encoding scheme based on at least one of the payload size of the LP UCI or the payload size of the HP UCI.

i. For example, when both of the payload size of the LP UCI and the payload size of the HP UCI are equal to or less than X bits, a first encoding scheme (e.g., joint encoding) may be applied, and when at least one of the payload size of the LP UCI or the payload size of the HP UCI is greater than X bits, a second encoding scheme (e.g., separate encoding) may be applied. (This is defined as "METHOD 1". In this case, X may be, for example, 2 or 11.)

ii. In another example, when the sum of the payload size of the LP UCI and the payload size of the HP UCI is equal to or less than Y bits, the first encoding scheme (e.g., joint encoding) may be applied, and when the sum of the payload size of the LP UCI and the payload size of the HP UCI is greater than Y bits, the second encoding scheme (e.g., separate encoding) may be applied. (This is defined as "METHOD 2". In this case, Y may be, for example, 2 or 11.)

iii. In another example, when at least one of the payload size of the LP UCI or the payload size of the HP UCI is equal to or less than Z bits, the first encoding scheme (e.g., joint encoding) may be applied, and when both of the payload size of the LP UCI and the payload size of the HP UCI are greater than Z bits, the second encoding scheme (e.g., separate encoding) may be applied. (This is defined as "METHOD 3". In this case, Z may be, for example, 2 or 11.)

iv. In another example, when the payload size of UCI configured/indicated as having a specific priority (e.g., LP) is equal to or less than Z bits, the first encoding scheme (e.g., joint encoding) may be applied, and when the payload size of the UCI is greater than Z bits, the second encoding scheme (e.g., separate encoding) may be applied. (This is defined as "METHOD 4". In this case, Z may be, for example, 2 or 11.)

v. In another method, the following operation methods may be considered by combining METHOD 2 and METHOD 3.

1. For example, when the sum of the payload size of the LP UCI and the payload size of the HP UCI are equal to or less than Y bits or at least one of the payload size of the LP UCI or the payload size of the HP UCI is equal to or less than Z bits, the first encoding scheme (e.g., joint encoding) may be applied. (In this case, Y>Z. For example, Y=11 and Z=2.)

2. Otherwise, when the sum of the payload size of the LP UCI and the payload size of the HP UCI is greater than Y bits, and both of the payload size of the LP UCI and the payload size of the HP UCI are greater than Z bits, the second encoding scheme (e.g., separate encoding) may be applied.

vi. In another method, the following operation methods may be considered by combining METHOD 2 and METHOD 4.

1. For example, when the sum of the payload size of the LP UCI and the payload size of the HP UCI is equal to or less than Y bits or the payload size of UCI configured/indicated as having a specific priority (e.g., LP) is equal to or less than Z bits, the first encoding scheme (e.g., joint encoding) may be applied. (In this case, Y>Z. For example, Y=11 and Z=2.)

2. Otherwise, when the sum of the payload size of the LP UCI and the payload size of the HP UCI is greater than Y bits, and the payload size of the UCI configured/indicated as having the specific priority is greater than Z bits, the second encoding scheme (e.g., separate encoding) may be applied.

vii. For example, in the case of the second encoding scheme, the UE may encode the LP UCI (bits) and the HP UCI (bits) independently of each other and multiplex the encoding result (LP UCI coded bits+HP UCI coded bits), to generate/map/transmit a UL signal.

viii. For example, in the case of the first encoding scheme (e.g., joint encoding), the UE may perform one-shot encoding for (joint UCI) payload obtained by concatenating the LP UCI (bits) and the HP UCI (bits), and generate/map/transmit a UL signal based on the encoding result.

ix. This method may be generally applied, when each of the LP UCI and the HP UCI is any UCI type, or may be applied restrictively only when the LP UCI and the HP UCI are the same UCI type (e.g., the type of the LP UCI is HARQ-ACK (and/or SR), and the type of the HP UCI is HARQ-ACK (and/or SR)).

x. Further, this method may be applied at least to multiplexing between the LP UCI and the HP UCI on a PUCCH. This method may be applied equally to multiplexing between the LP UCI and the HP UCI on a PUSCH, or separate encoding (or joint encoding) may always be applied in the case of the PUSCH, regardless of the payload size of the LP/HP UCI.

B. When a 1-bit LP HARQ-ACK and a 1-bit HP HARQ-ACK are multiplexed in the same one PUCCH format 0 or PUCCH format 1, the UE may operate as follows:

i. The UE may select/transmit a sequence cyclic shift value in PUCCH format 0 or map/transmit QPSK modulation symbols in a sequence of PUCCH format 1 by mapping the HP HARQ-ACK to an MSB and an LP HARQ-ACK to an LSB (or mapping the LP HARQ-ACK to the MSB and the HP HARQ-ACK to the LSB).

ii. For example, at least one of the 1-bit LP HARQ-ACK or the 1-bit HP HARQ-ACK may be generated based on, but not limited to, spatial bundling.

4) Additional Operation Method 1

A. Method 1 i. When the sum of the payload size of the LP UCI and the payload size of the HP UCI is equal to or less than Y bits (e.g., Y=11) under a situation/condition in which the first encoding scheme (e.g., joint encoding) is applied between the LP UCI and the HP UCI, the UE may configure UCI payload of Y+1 bits in total by performing zero-padding on the whole UCI payload (e.g., adding '0' bits) and then apply the first encoding scheme (e.g., a specific (e.g., polar code) encoding scheme based on CRC addition).

ii. When the payload size of UCI with a specific priority (e.g., LP or HP) is equal to or less than Y bits (e.g., Y=11) under a situation/condition in which the second encoding scheme is applied between the LP UCI and the HP UCI, the UE may configure UCI payload of Y+1 bits in total by performing zero-padding on the payload of the UCI with the priority (e.g., adding '0' bits) and then encode the UCI payload (e.g., in a specific (e.g., polar code) encoding scheme based on CRC addition).

iii. When the sum of the payload size of the LP UCI and the payload size of the HP UCI is equal to or less than Z bits (e.g., Z=2) under a situation/condition in which the first encoding scheme is applied between the LP UCI and the HP UCI, the UE may configure UCI payload of Z+1 bits in total by performing zero-padding on the whole UCI payload (e.g., adding '0' bits) and then apply joint encoding (e.g., a Reed-Muller code).

iv. When the payload size (e.g., X bits) of UCI payload with a specific priority (e.g., LP or HP) is equal to or less than Z bits (e.g., Z=2 and X=1 or 2) under a situation/condition in which the second encoding scheme is applied between the LP UCI and the HP UCI, the UE may configure UCI payload of Z+1 bits in total by performing zero-padding on the UCI payload with the priority (e.g., adding '0' bits) and then encode the UCI payload (e.g., a Reed-Muller code). In this case, the UE may select a PUCCH resource set or determine the number of PRBs (to be used for UCI mapping/transmission) in a PUCCH resource, based on the UCI payload size of Z+1 bits after the zero-padding. Alternatively, the UE may select a PUCCH resource set or determine the number of PRBs (to be used for UCI mapping/transmission) in the PUCCH resource, based on the UCI payload size of X bits before the zero-padding. Further in this case, the UE may determine a parameter (e.g., n_HARQ) value for PUCCH power control, based on the UCI payload size of Z+1 bits after the zero-padding. Alternatively, the UE may determine a parameter (e.g., n_HARQ) value for PUCCH power control, based on the UCI payload size of X bits before the zero-padding.

v. When the sum of the payload size of the LP UCI and the payload size of the HP UCI is equal to or less than Z bits (e.g., Z=2) under a situation/condition in which the first encoding scheme is applied between the LP UCI and the HP UCI, the UE may jointly encode the whole UCI payload equal to or less than Z bits using a Reed-Muller code.

vi. When the payload size of UCI payload with a specific priority (e.g., LP or HP) is equal to or less than Z bits (e.g., Z=2) under a situation/condition in which the second encoding scheme is applied between the LP UCI and the HP UCI, the UE may encode the UCI payload with the priority equal to or less than Z bits using a Reed-Muller code.

vii. When the payload size of UCI payload with a specific priority (e.g., LP or HP) is equal to or less than Z bits (e.g., Z=2) under a situation/condition in which the second encoding scheme is applied between the LP UCI and the HP UCI, the UE may encode the UCI payload with the priority equal to or less than Z bits by using an encoding scheme (e.g., repetition coding or simplex coding) applied to UCI equal to or less than Z bits on a PUSCH. In this case, the UCI encoding scheme used on the PUSCH may have a coding performance (e.g., a coding gain) different from those of an existing RM code and polar code used for UCI encoding on a PUCCH. In this regard, accordingly, a maximum UCI coding rate applied only to UCI equal to less than Z bits may be additionally configured for the UE (on a PUCCH format basis and on a priority basis). Therefore, the maximum UCI coding rate applied to UCI greater than Z bits and the maximum UCI coding rate applied to UCI equal to or less than Z bits may be configured for the UE (on a PUCCH format basis and on a priority basis).

viii. This method may be applied at least to multiplexing between the LP UCI and the HP UCI on a PUCCH. This method may also be applied equally to multiplexing between the LP UCI and the HP UCI on a PUSCH, or in the case of the PUSCH, separate encoding (or joint encoding) may be applied without the above-described zero-padding process.

B. Method 2 i. When a combination of LP UCI and HP UCI is given as {A/N(s) equal to or less than 2 bits, SR} (e.g., PUCCH resources configured/indicated for the LP UCI and the HP UCI, respectively overlap with each other on the time axis), the UE may select/transmit a resource of a specific PUCCH format, PUCCH format 2, 3, or 4, considering/assuming that the LP/HP UCI combination has a payload size of 3 bits (or equal to or greater than 3 bits) (and thus multiplex and transmit the LP/HP UCI combination in the resource of the selected PUCCH format 2/3/4).

ii. This method may be applied at least to an {LP A/N(s) equal to or less than 2 bits, HP SR} combination and/or an {HP A/N(s) equal to or less than 2 bits, HP SR} combination and/or a {1-bit LP A/N, 1-bit HP A/N, HP SR} combination. Further, this method may be applied to both a case of a positive SR and a case of a negative SR, or only to a case of a positive SR.

C. Method 3 i. When one PUCCH, PUCCH #1 in which UCI (e.g., an A/N) with a specific priority, Priority 1 is configured/indicated to be transmitted overlaps with a plurality of PUCCHs, PUCCHs #2 in which UCI (e.g., an A/N) with a different priority, Priority 2 is configured/indicated to be transmitted, and single UCI payload with Priority 1 is multiplexed with a plurality of UCI payloads with Priority 2 on one PUCCH, PUCCH #3 (or a PUSCH), the following operation may be performed.

1. For the UCIs with Priority 2, the whole UCI payload may be configured by concatenating the UCI payloads configured/indicated for PUCCHs #2, respectively in time order of time points at which corresponding resources/symbols of PUCCHs #2 are located (e.g., in the manner that maps UCI payload configured/indicated for an earlier/later PUCCH #2 to a lower indexed bit).

D. Method 4 i. In a situation in which an LP A/N and an HP A/N are multiplexed in a PUSCH configured/indicated as having a specific priority, Priority 1, the following operations may be performed.

1. When an A/N with a different priority, Priority 2 is based on a Type-2 codebook, the payload size of the A/N may be determined based on a total-DAI value indicated by DL DCI (indicating Priority 2).

ii. DCI (indicating Priority 1) that triggers a Type-3 codebook-based A/N feedback transmission may indicate the following.

1. The DCI may indicate whether to configure A/N payload only for an HARQ process ID configured/schedulable with a specific one priority (e.g., Priority 1) and feed back/transmit the A/N payload or configure A/N payload for all HARQ process IDs (regardless of priorities) and feed back/transmit the A/N payload.

iii. In the above example, when Priority 1 is the LP, Priority 2 may be the HP, and when Priority 1 is the HP, Priority 2 may be the LP.

5) Additional Operation Method 2

A method of jointly encoding Type-1 codebook-based HARQ-ACKs configured/indicated as having different priorities (e.g., LP and HP) and multiplexing the encoded HARQ-ACKs in the same one PUCCH/PUSCH will be proposed below. Before the description, it is assumed specifically that the presence/absence of a priority (e.g., LP or HP) indication (or priority indication enable/disable) may be configured differently/independently for each cell by DL DCI (e.g., DCI format 1_1 or 1_2) (as follows). It is also assumed that even for a cell which is configured with a corresponding priority indication/for which the priority indication is enabled, only some of total HPNs (configured for the cell) are schedulable.

[Assumptions]

A. For cell(s) for which the priority indication is not configured by DL DCI (defined as "CELL 1", for convenience), the following operations may be performed.

i. A priority indicator field is not configured for any DCI format.

ii. For CELL 1, a K1 set and a TDRA table are configured only for the LP.

iii. All HPNs configured for CELL 1 may be scheduled only with the LP.

B. For cell(s) for which the priority indication is configured by DL DCI (defined as "CELL 2", for convenience), the following operations may be performed.

i. The priority indicator field is configured for at least one DCI format.

ii. For CELL 2, a K1 set and a TDRA table are configured for each of the LP and the HP.

1. A TDRA table is configured on a DCI format basis, not on a priority basis. Because a specific DCI format may be indicated to have the HP and other DCI formats may be indicated to have the LP (a candidate SLIV union is different for each priority), a structure in which a TDRA table is configured for each of the LP and the HP may be eventually used.

iii. While some of all HPNs configured for CELL 2 are schedulable to have the HP, the remaining HPNs may be schedulable to have only the LP.

1. For example, this may correspond to a case in which the priority indicator field is configured only for DCI format 1_2, and the size of an HARQ process ID field in the DCI is set less than the size of the HARQ process ID field of DCI format 1_1.

[Operations Based on the Above Assumptions]

A. For CELL 1/2, the UE may configure A/N payload (by performing the afore-described SLIV pruning process) based on a {K1, TDRA} combination configured for CELL 1 (not configured with the priority indication), and configure A/N payload (by performing SLIV pruning) based on the union of all K1's configured for each of the LP and the HP and the union of all TDRAs (SLIVs) configured for each of the LP and the HP for CELL 2 (configured with the priority indication).

B. In this case, the UE may configure whole A/N payload by concatenating A/N payload corresponding to each of CELL and CELL 2, and jointly encode the whole A/N payload (by applying a maximum coding rate or a beta offset '$\beta_{offset}$' configured for the HP) (and map the resulting coded bits on a PUCCH/PUSCH).

[Proposal 2]

1) P2_Opt 1

A. When the UE selects a PUCCH resource in which LP UCI and HP UCI are to be multiplexed and transmitted, the UE may operate as follows.

i. The UE may select one of PUCCH resource #1 corresponding to a PUCCH resource indicator (PM) indicated by last DCI (scheduling an LP PDSCH transmission) in a PUCCH resource set (configured for the LP) configured for an LP UCI payload size prior to multiplexing and ii. PUCCH resource #2 corresponding to a PRI indicated by last DCI (scheduling an HP PDSCH transmission) in a PUCCH resource set (configured for the HP) configured for an HP UCI payload size prior to the multiplexing, multiplex the LP UCI and the HP UCI, and transmit the multiplexed UCI in the selected PUCCH resource.

B. The selected one PUCCH resource in the above example may be determined to be an HP PUCCH resource, a PUCCH resource having more REs available for UCI mapping, or a PUCCH resource having an earlier/more previous ending symbol (e.g., a PUCCH resource in which a PUCCH transmission may end earlier).

i. When the PUCCH resource in which the LP UCI and the HP UCI are to be multiplexed and transmitted is determined/defined as an HP PUCCH resource, PUCCH resource #2 may be determined directly without a separate resource selection process. (This is referred to as "P2_Opt 1h", for convenience).

C. For example, both of the LP UCI and the HP UCI may be HARQ-ACK.

D. For example, the UE may select/combine and apply P2_Opt 1 (or P2_Opt 1h) described above and P2_Opt 2 (or P2_Opt 2h) described below according to the payload size of the HP UCI.

i. Specifically, when the payload size of the HP UCI is greater than a specific size (e.g., 2 bits), the UE may apply P2_Opt 1 (or P2_Opt 1h), and when the payload size of the HP UCI is equal to or less than the specific size (e.g., 2 bits), the UE may apply P2_Opt 2 (or P2_Opt 2h).

2) P2_Opt 2

A. When the UE selects a PUCCH resource in which the LP UCI and the HP UCI are to be multiplexed and transmitted, the UE may operate as follows.

i. the UE may select one of PUCCH resource #1 corresponding to a PRI indicated by last DCI (scheduling an LP PDSCH transmission) in an LP PUCCH resource set configured for a size corresponding to total UCI payload including the LP UCI and the HP UCI and ii. PUCCH resource #2 corresponding to a PRI indicated by last DCI (scheduling an HP PDSCH transmission) in an HP PUCCH resource set configured for the size corresponding to total UCI payload including the LP UCI and the HP UCI, multiplex the LP UCI and the HP UCI, and transmit the multiplexed UCI in the selected PUCCH resource.

i. In this case, 1) a payload size before the afore-described HARQ-ACK bundling method and dropping method are applied, 2) a payload size before the HARQ-ACK drop method is applied after the afore-described HARQ-ACK bundling method is applied, or a payload size after the afore-described HARQ-ACK bundling method and dropping method are applied may be considered as an LP UCI (e.g., HARQ-ACK) size used to determine the above LP PUCCH resource set.

B. The selected one PUCCH resource in the above example may be determined to be an HP PUCCH resource, a PUCCH resource having more REs available for UCI mapping, or a PUCCH resource having an earlier/more previous ending symbol.

i. When the PUCCH resource in which the LP UCI and the HP UCI are to be multiplexed and transmitted is determined/defined as an HP PUCCH resource, PUCCH resource #2 may be determined directly without a separate resource selection process. (This is referred to as "P2_Opt 2h", for convenience).

C. For example, both of the LP UCI and the HP UCI may be HARQ-ACK.

3) Issue 1

A. In a situation in which P2_Opt 2h is applied, in the absence of an HP PUCCH resource set corresponding to (i.e., configured for) the total size (e.g., N bits) of the UCI payload including the LP UCI and the HP UCI, the UE may apply the following methods.

P2_Opt A: The UE may select an HP PUCCH resource set configured for a maximum payload size (e.g., X bits where X<N) from among HP PUCCH resource sets, and transmit the N-bit total UCI in a specific resource of the selected HP PUCCH resource set. In this case, when a maximum UCI coding rate is not exceeded during mapping of the UCI to the PUCCH resource, the UE may transmit all of the N bits, whereas when the maximum UCI coding rate is exceeded, the UE may transmit only some of the N bits.

P2_Opt B: when the largest of payload sizes configured for HP PUCCH resource sets is X bits (X<N), the UE may first drop specific (LP) UCI of N-X bits out of the total N-bit UCI, select an HP PUCCH resource set corresponding to/configured for a payload size of X bits, and transmit the remaining X-bit UCI (using a specific PUCCH resource in the set).

P2_Opt C: The UE may drop the whole LP UCI part out of the total N-bit UCI, select an HP PUCCH resource set corresponding to/configured for the size of payload including only the remaining HP UCI, and transmit only the HP UCI (using a specific PUCCH resource in the set).

4) Issue 2

A. In a situation in which the UE applies P2_Opt 1h or P2_Opt 2h, when the UE (has received DCI scheduling an LP PDSCH transmission and) has failed in receiving any DCI scheduling an HP PDSCH transmission (e.g., including a case in which all of received PDSCHs are SPS PDSCHs transmitted without scheduling DCI), the UE may apply the following methods.

For convenience of description, a PUCCH resource set configured for an HARQ-ACK feedback corresponding to a dynamic PDSCH transmission based on DCI scheduling is referred to as a dynamic PUCCH resource set (or a PUCCH resource set), and a PUCCH resource set configured for an HARQ-ACK feedback corresponding to an SPS PDSCH transmission is referred to as an SPS PUCCH resource set.

P2_Opt A: The UE may select an HP dynamic PUCCH resource set by applying P2_Opt 1h/2h and determine a PUCCH resource configured for/associated with a specific (e.g., lowest) PRI value/state/index among the resources of the selected PUCCH resource set to be a resource for transmission of multiplexed LP UCI and HP UCI.

P2_Opt B: The UE may select an HP dynamic PUCCH resource set by applying P2_Opt 1h/2h and determine a PUCCH resource having most UCI REs or a largest supportable payload size (according to the number of UCI REs and a maximum UCI coding rate) among the resources of the selected PUCCH resource set (a PUCCH resource configured for/associated with a specific (e.g., lowest) PRI value/state/index among them) to be a resource for transmission of multiplexed LP UCI and HP UCI.

P2_Opt C: The UE may select an HP dynamic PUCCH resource set by applying P2_Opt 1h/2h, and exceptionally only in this case, determine a PUCCH resource corresponding to a PRI indicated by last DCI (scheduling an LP PDSCH transmission) among the resources of the selected PUCCH resource set to be a resource for transmission of multiplexed LP UCI and HP UCI.

P2_Opt D: Exceptionally only in this case, the UE may select an LP dynamic PUCCH resource set corresponding to/configured for the size of total UCI including the LP UCI and the HP UCI or the size of LP UCI payload, and determine a PUCCH resource corresponding to a PRI indicated by last DCI (scheduling an LP PDSCH transmission) among the resources of the selected PUCCH resource set to be a resource for transmission of multiplexed LP UCI and HP UCI.

P2_Opt E: In this case, the UE may select an HP SPS PUCCH resource set, and determine a PUCCH resource corresponding to/configured for the size of the total UCI including LP UCI and HP UCI or the size of HP UCI payload in the selected PUCCH resource set to be a resource for transmission of multiplexed LP UCI and HP UCI.

When at least one DCI that schedules an LP PDSCH transmission is received, one of P2_Opt A, P2_Opt B, P2_Opt C, P2_Opt D, and P2_Opt E may be applied. When all of received LP PDSCHs are SPS PDSCHs transmitted without scheduling DCI, P2_Opt E may be applied.

5) Issue 3

A. In the case where one resource in a specific HP PUCCH resource set is determined to be a resource for transmission of multiplexed LP UCI and HP UCI based on a PRI value/state/index M indicated by DCI that schedules an LP PDSCH in a situation in which P2_Opt 1/1h/2/2h or any other method is applied, when the resource corresponding to the PRI value/state/index M is not configured in the HP PUCCH resource set, the UE may apply the following methods.

i. For convenience of description, it is assumed that PRI values/states/indexes are set to consecutive integers starting from 0 (e.g., {0, 1, 2, . . . }).

P2_Opt A: When the total number of PUCCH resources configured in the HP PUCCH resource set is N (N<M+1) and/or the PUCCH resources of the PUCCH resource set correspond to PM value/state/index 0 to PRI value/state/index L (L=N−1), the UE may determine a PUCCH resource corresponding to a PRI value/state/index corresponding to {M modulo N} or {M modulo (L+1)} to be a resource for transmission of multiplexed LP UCI and HP UCI. (A modulo B represents the remainder of dividing A by B).

P2_Opt B: When an operation of multiplexing and transmitting the LP UCI and the HP UCI in the same one PUCCH resource is enabled, the number of PUCCH resources included in the LP PUCCH resource set and the number of PUCCH resources included in the HP PUCCH resource set may be set to be equal (or the HP PUCCH resource set may be configured to include PUCCH resources corresponding to all PRI values/states/indexes available for indication by DCI that schedules an LP PDSCH).

6) Issue 4

A. When the UE separately encodes, multiplexes, and transmits the HP UCI and the LP UCI in a specific HP PUCCH resource based on a specific PUCCH format (referred to as "PF-X", for convenience) (determined by applying P2_Opt 1h/2h or any other method), the following operations may be performed.

i. The UE may encode the HP UCI by applying a maximum UCI coding rate configured for PF-X of an HP PUCCH, and encode the LP UCI by applying a maximum UCI coding rate configured for PF-X of an LP PUCCH.

7) Issue 5

A. According to the Rel. 16 NR standards, a maximum number of individual encodings (e.g., the number of encoding schemes/processes) that may be performed for a plurality of UCIs in one PUCCH resource is limited to 2 for PUCCH format 3/4 (e.g., the UE jointly encodes an HARQ-ACK and CSI part 1, and separately encodes CSI part 2) and to 1 for PUCCH format 2 (e.g., the UE encodes an HARQ-ACK and CSI part 1 together (e.g., joint encoding), and drops transmission of CSI part 2).

In relation to the limited maximum number of individual encodings allowed in the same PUCCH resource, when the HP UCI and the LP UCI are multiplexed and transmitted (or are configured to be multiplexed and transmittable) in one PUCCH resource according to an embodiment of the present disclosure, the UE may operate as follows.

i. When the PUCCH resource is PUCCH format 3/4, the UE may separately encode the HP UCI (e.g., HARQ-ACK) and the LP UCI.

1. For example, when the LP UCI includes all of an HARQ-ACK, CSI part 1, and CSI part 2 (and/or an SR), the UE may jointly encode the HARQ-ACK and CSI part 1 (and/or the SR) (while dropping the transmission of CSI part 2). When the LP UCI includes only CSI part 1 and CSI part 2 (and/or an SR) (without an HARQ-ACK), the UE may encode only CSI part 1 (and/or the SR) (while dropping the transmission of CSI part 2).

ⓐ For example, the above-described UE operation may be applied restrictively to a case in which an HARQ-ACK for a PDSCH (or SPS PDSCH release) scheduled/indicated by DCI is included in the HP UCI.

ⓑ For example, when only CSI part 1 and CSI part 2 are included in the LP UCI (without an HARQ-ACK (and/or an SR)) in a situation in which an HARQ-ACK for a PDSCH (or SPS PDSCH release) scheduled/indicated by DCI is not included in the HP UCI (e.g., an HP HARQ-ACK includes only an HARQ-ACK for an SPS PDSCH or the HP UCI includes only an SR without an HARQ-ACK), the UE may skip LP UCI encoding (while dropping the transmissions of CSI part 1 and CSI part 2). When all of the HARQ-ACK, CSI part 1, and CSI part 2 (and/or the SR) are included in the LP UCI in the same HP UCI situation, the UE may (jointly) encode only the HARQ-ACK (and/or the SR) (while dropping the transmissions of CSI part 1 and CSI part 2), for the LP UCI.

Figure 9:
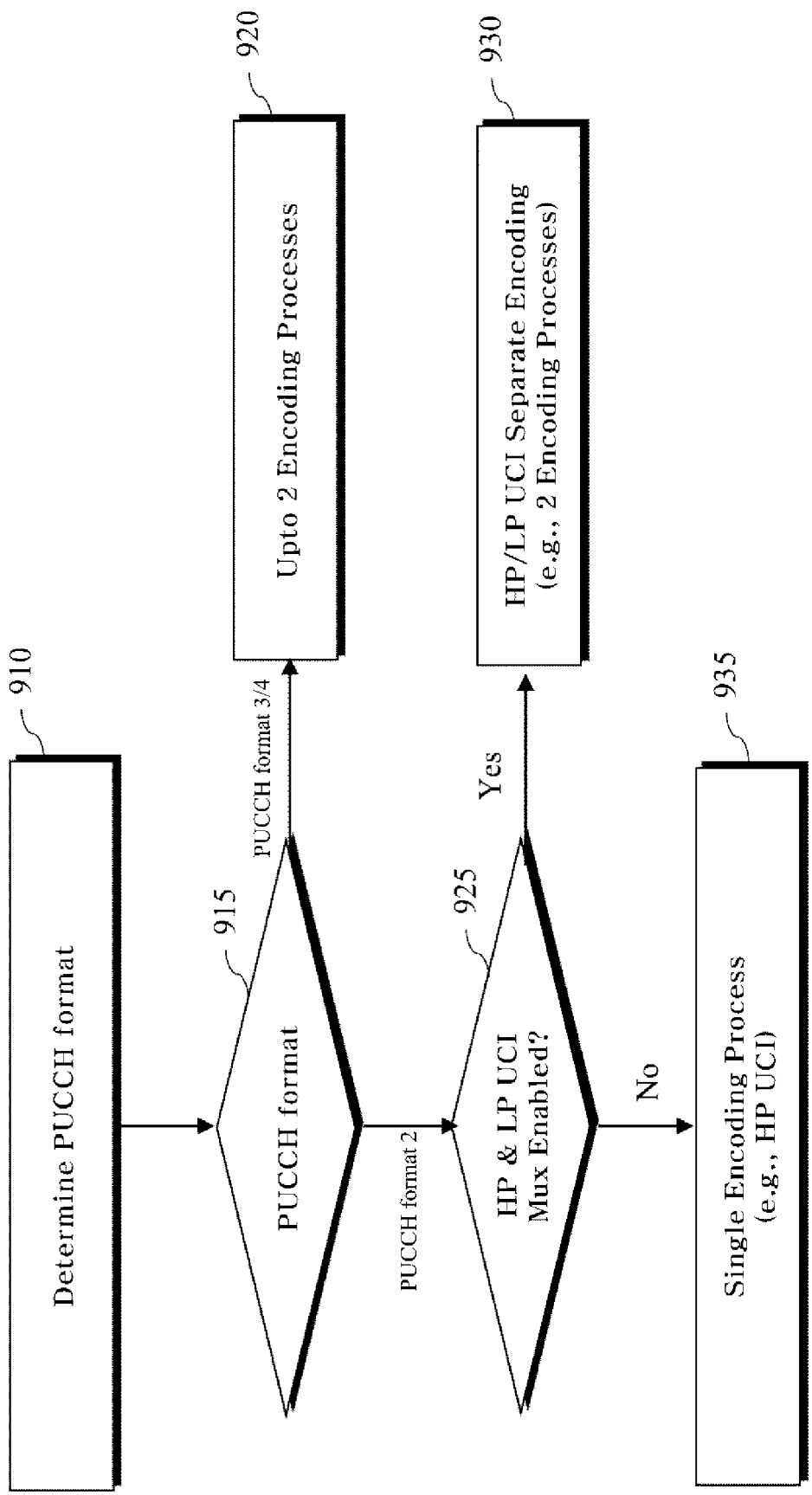
FIG. 9 is a diagram illustrating a UCI processing procedure according to an embodiment of the present disclosure.

2. In the case of HP UCI, for example, when the HP UCI includes all of an HARQ-ACK, CSI part 1, and CSI part 2 (and/or an SR), the UE may also (jointly) encode the HARQ-ACK and CSI part 1 (and/or the SR) (while dropping the transmission of CSI part 2). When the HP UCI includes only CSI part 1 and CSI part 2 (and/or an SR) (without an HARQ-ACK), the UE may encode only CSI part 1 (and/or the SR) (while dropping the transmission of CSI part 2).

ii. When the PUCCH resource is in PUCCH format 2, P2_Alt 0) the UE may separately encode the HP UCI (e.g., an HARQ-ACK) and the LP UCI (e.g., in the same manner as PUCCH format 3/4) by exceptionally increasing the maximum number of individual encodings (encoding operations) to 2, P2_Alt 1) the UE may jointly encode the HP UCI and the LP UCI, or P2_Alt 2) the UE may encode only the HP UCI and transmit the encoded HP UCI in the PUCCH resource, while dropping the LP UCI transmission. FIG. 9 illustrates an exemplary UE operation based on P2_Alt 0). Referring to FIG. 9, the UE determines a PUCCH format (910). When the determined PUCCH format is PUCCH format 3/4, the UE encodes a PUCCH using up to two encoding schemes and transmits the encoded PUCCH (920).

When the determined PUCCH format is PUCCH format 2, the UE may operate differently depending on whether the UE is configured to multiplex HP UCI and LP UCI (925). Based on that the UE is configured to multiplex the HP UCI and the LP UCI, the UE may separately encode the HP UCI and the LP UCI in spite of the use of PUCCH format 2 (930). The separately encoded HP UCI and LP UCI may be multiplexed/transmitted in one PUCCH format 2. When the UE is not configured to multiplex the HP UCI and the LP UCI, the UE may use only one encoding scheme for PUCCH format 2 (935), and when needed, drop at least part of the LP UCI.

1. In an example of P2_Alt 1), when the LP UCI includes all of an HARQ-ACK, CSI part 1, and CSI part 2 (and/or an SR), the UE may jointly encode only the LP UCI HARQ-ACK (and/or the SR) with the HP UCI (while dropping the transmissions of LP UCI CSI part 1 and CSI part 2). When the LP UCI includes only CSI part 1 and CSI part 2 (and/or an SR) (without an HARQ-ACK), the UE may jointly encode only CSI part 1 (and/or the SR) with the HP UCI (while dropping the transmission of CSI part 2).

2. In an example of the HP UCI in P2_Alt 1), when the HP UCI includes all of an HARQ-ACK, CSI part 1, and CSI part 2 (and/or an SR), the UE may jointly encode only the HARQ-ACK (and/or the SR) with the LP UCI (while dropping the transmissions of CSI part 1 and CSI part 2). When the HP UCI includes only CSI part 1 and CSI part 2 (and/or an SR) (without an HARQ-ACK), the UE may jointly encode only CSI part 1 (and/or the SR) with the LP UCI (while dropping the transmission of CSI part 2).

3. In P2_Alt 0), for example, when the LP UCI includes all of an HARQ-ACK, CSI part 1, and CSI part 2 (and/or an SR), the UE may encode only the LP HARQ-ACK (and/or the SR) (while dropping the transmissions of LP CSI part 1 and LP CSI part 2) (e.g., AN & SR joint encoding within LP UCI) (in a different manner from in PUCCH format 3/4). When the LP UCI includes only CSI part 1 and CSI part 2 (without an HARQ-ACK (and/or an SR)), the UE may skip LP UCI encoding (while dropping the transmissions of CSI part 1 and CSI part 2).

Figure 10:
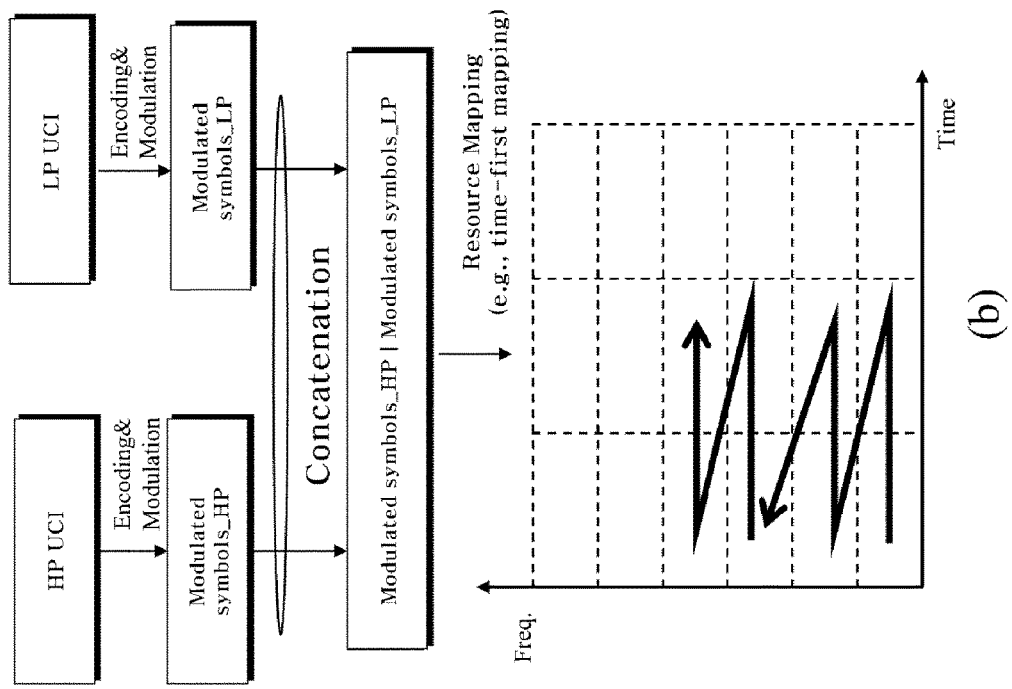
FIGS. 10 to 13 are diagrams illustrating multiplexing and resource mapping of a plurality of UCIs according to embodiment(s)
Figure 10:
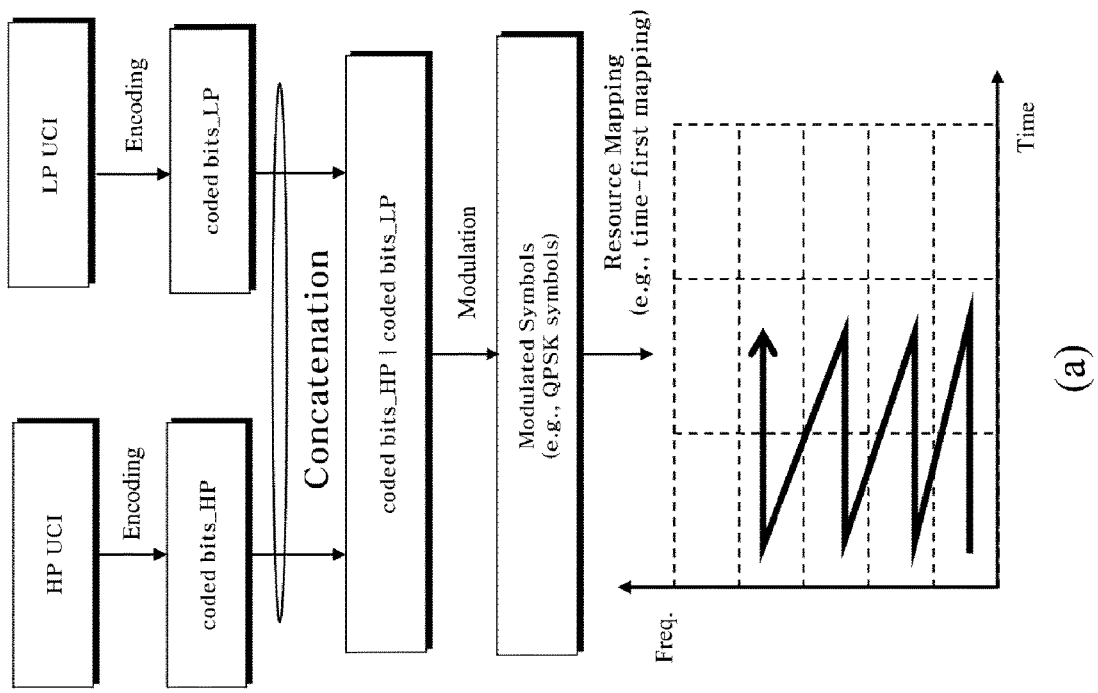

4. In P2_Alt 0, when the UE maps separately coded HP UCI bits and LP UCI bits in one PUCCH format 2 resource, the UE may apply the following mapping schemes in consideration of frequency diversity.

ⓐ ceil(x) represents a smallest integer equal to or greater than x, and floor(y) represents a largest integer equal to or less than y.

ⓑ P2_Opt 1: The coded HP UCI bits ((QPSK) modulated symbols of the coded HP UCI bits) and the coded LP UCI bits (modulated symbols of the coded HP UCI bits) may be concatenated (e.g., the LP UCI may be concatenated after the HP UCI) and then mapped (in a time first-frequency second manner). FIG. 10 is a diagram illustrating P2_Op 1. Although FIGS. 10(a) and 10(b) are common in that HP UCI and LP UCI are subjected to separate encoding, concatenation, and time-first mapping, they are different in that coded bits (channel-coded bits) are concatenated in FIG. 10(a), and modulated symbols are concatenated in FIG. 10(b).

Figure 11:
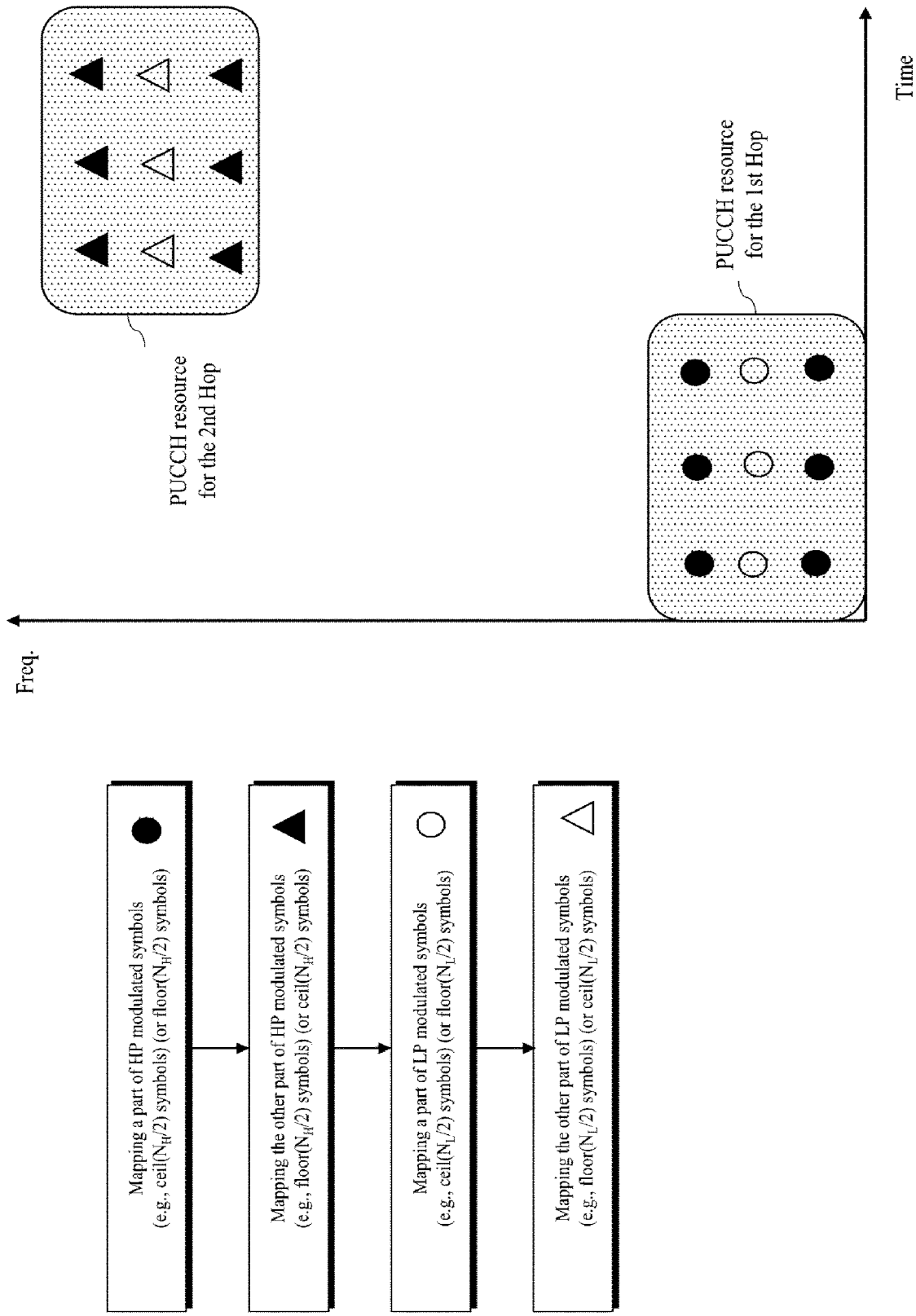

(i) Referring to FIG. 10, for example, in a time first-frequency second scheme, the UE may map to {the lowest RE in frequency in the first OFDM symbol}, {the lowest RE in frequency in the second OFDM symbol}, {the second lowest RE in frequency in the first OFDM symbol}, {the second lowest RE in frequency in the second OFDM symbol}, . . . in this order.

ⓒ P2_Opt 2: FIG. 11 illustrates an exemplary mapping according to P2_Opt 2, when frequency hopping is configured for a PUCCH transmission/resource. When frequency hopping is configured for a PUCCH transmission/resource, the UE may split coded HP UCI bits ($N_H$ modulated symbols of the coded HP UCI bits) into ceil($N_H/2$) (or floor($N_H/2$)) HP UCI bits and floor($N_H/2$) (or ceil($N_H/2$)) HP UCI bits, and map the ceil($N_H/2$) (or floor($N_H/2$)) HP UCI bits to the first frequency hop and the floor($N_H/2$) (or ceil($N_H/2$)) HP UCI bits to the second frequency hop. Subsequently, the UE may split coded LP UCI bits ($N_L$ modulated symbols of the coded HP UCI bits) into floor($N_L/2$) (or ceil($N_L/2$)) LP UCI bits and ceil($N_L/2$) (or floor($N_L/2$)) LP UCI bits, and map the floor($N_L/2$) (or ceil($N_L/2$)) LP UCI bits to the first frequency hop and the ceil($N_L/2$) (or floor($N_L/2$)) LP UCI bits to the second frequency hop. (When frequency hopping is not configured for the PUCCH transmission/resource, UCI bits may be mapped without splitting.)

(i) In this case, UCI RE mapping may be performed for each frequency hop in the following methods.

(ii) P2_Opt A: The UE may concatenate coded HP UCI symbol(s) and coded LP UCI symbol(s) such that the LP UCI is concatenated after the HP UCI, and then map the concatenated UCI symbols in a frequency first manner.

① For example, the UE may map the HP UCI before the LP UCI, wherein the HP UCI may be mapped to consecutive REs starting from the lowest RE in frequency, and then the LP UCI may be mapped to the remaining RE(s).

② In this case, the starting frequency position of the HP UCI RE mapping on the first hop and the starting frequency position of the HP UCI RE mapping on the second hop may be determined to be different (spaced apart) from each other by a specific offset.

③ When frequency hopping is not configured, the UE may perform mapping in a frequency first-time second manner.

(iii) P2_Opt B: The UE may first map the coded HP UCI symbols to equi-distant REs spaced apart from each other by a maximum value in frequency (in an RE set available for UCI mapping) and then map the coded LP UCI symbols to the remaining RE(s).

① For example, when the number of REs available for UCI mapping (among the remaining REs except for DMRS REs) is NR, and the number of (coded) HP UCI symbols is $N_U$, the HP UCI is first mapped at an interval of d (d=floor($N_R/N_U$) RE(s)) (in the set of $N_R$ REs available for UCI mapping), and then coded LP UCI (symbols) is mapped to the remaining RE(s). (This is referred to as "Max Distance" mapping, for convenience).

② In this case, the starting frequency position of the HP UCI RE mapping on the first hop may be determined to be different (spaced apart) from the starting frequency position of the HP UCI RE mapping on the second hop by a specific offset ((e.g., floor(d/2) or ceil(d/2)).

③ In the case where frequency hopping is not configured, 1) when the number of REs available for UCI mapping in the first ODSM symbol is less than the number of coded HP UCI symbols, the UE may map the coded HP UCI symbols at an interval of d REs (d=1) (in a set of REs available for UCI mapping) in the OFDM symbol, and perform Max Distance mapping for the remaining HP UCI symbol(s) and LP UCI symbols in the second OFDM symbol. 2) When the number of REs available for UCI mapping in the first ODSM symbol is equal to or greater than the number of coded HP UCI symbols, the UE may perform Max Distance mapping in the OFDM symbol, and map the remaining LP UCI symbols in the second OFDM symbol.

(d) P2_Opt 3: (Regardless of whether frequency hopping is configured for a PUCCH transmission/resource,) the UE may split coded HP UCI bits ($N_H$ modulated symbols of the coded HP UCI bits) into ceil($N_H/2$) (or floor($N_H/2$)) bits and floor($N_H/2$) (or ceil($N_H/2$)) bits, and map the ceil($N_H/2$) (or floor($N_H/2$)) bits in the first OFDM symbol, and the floor ($N_H/2$) (or ceil($N_H/2$)) bits in the second OFDM symbol. The UE may split coded LP UCI bits ($N_L$ modulated symbols of the coded LP UCI bits) into floor($N_L/2$) (or ceil($N_L/2$)) bits and ceil($N_L/2$) (or floor($N_L/2$)) bits, and map the floor($N_L/2$) (or ceil($N_L/2$)) bits in the first OFDM symbol, and the ceil (or floor($N_L/2$)) bits in the second OFDM symbol.

(i) In this case, UCI RE mapping may be performed on an OFDM symbol basis in the following methods.

(ii) P2_Opt A: After concatenating the coded LP UCI symbols after the coded HP UCI symbols in the form of the LP UCI concatenated after the HP UCI, the UE may perform mapping in the frequency first manner.

① For example, the UE may map the HP UCI in consecutive REs, starting from the lowest RE in frequency, and then map the LP UCI to the remaining RE(s).

② In this case, the starting frequency position of the HP UCI RE mapping in the first symbol may be determined to be different (spaced apart) from the starting frequency position of the HP UCI RE mapping in the second symbol by a specific offset.

(iii) P2_Opt B: The UE may first map the coded HP UCI symbols to equi-distant REs at a maximum interval in frequency (in a set of REs available for UCI mapping), and then map the coded LP UCI symbols to the remaining RE(s).

① For example, when the number of REs available for UCI mapping (except for DMRS REs) is NR and the number of coded HP UCI symbols is $N_U$, the UE may first map the HP UCI at an interval of d REs (d=floor($N_R/N_U$)RE(s)) (in the set of NR REs available for UCI mapping), and then map coded LP UCI (symbols) to the remaining RE(s).

② In this case, the starting frequency position of the HP UCI RE mapping in the first symbol may be determined to be different (spaced apart) from the starting frequency position of the HP UCI RE mapping in the second symbol by a specific offset ((e.g., floor(d/2) or ceil(d/2)).

(e) P2_Opt 4: (Regardless of whether frequency hopping is configured in for PUCCH transmission/resource and without the above process of splitting coded UCI bits) the UE may first map the coded HP UCI symbols to equi-distant REs at a maximum interval in frequency in a total RE set of a plurality of (e.g., 2) OFDM symbols and then map the coded LP UCI symbols to the remaining RE(s).

(i) For example, when the total number of REs available for UCI mapping (except for DMRS REs) in a plurality of (e.g., 2) OFDM symbols is NR and the number of coded HP UCI symbols is $N_U$, the UE may first map the HP UCI at an interval of d REs (d=floor($N_R/N_U$)) (in a set of in $N_R$ REs available for UCI mapping) a frequency first-time second manner, and then map the LP UCI (symbols) to the remaining RE(s).

(ii) In a characteristic example, in a state in which all UCI RE(s) are arranged in two symbols in the order of {the lowest-frequency RE in the first symbol, the second lowest-frequency RE in the first symbol, . . . , the highest-frequency RE in the first symbol, the lowest-frequency RE in the second symbol, the second lowest-frequency RE in the second symbol, . . . , the highest-frequency RE in the second symbol}, the UE may map the HP UCI at an interval of d REs (d=floor($N_R/N_U$)).

Figure 12:
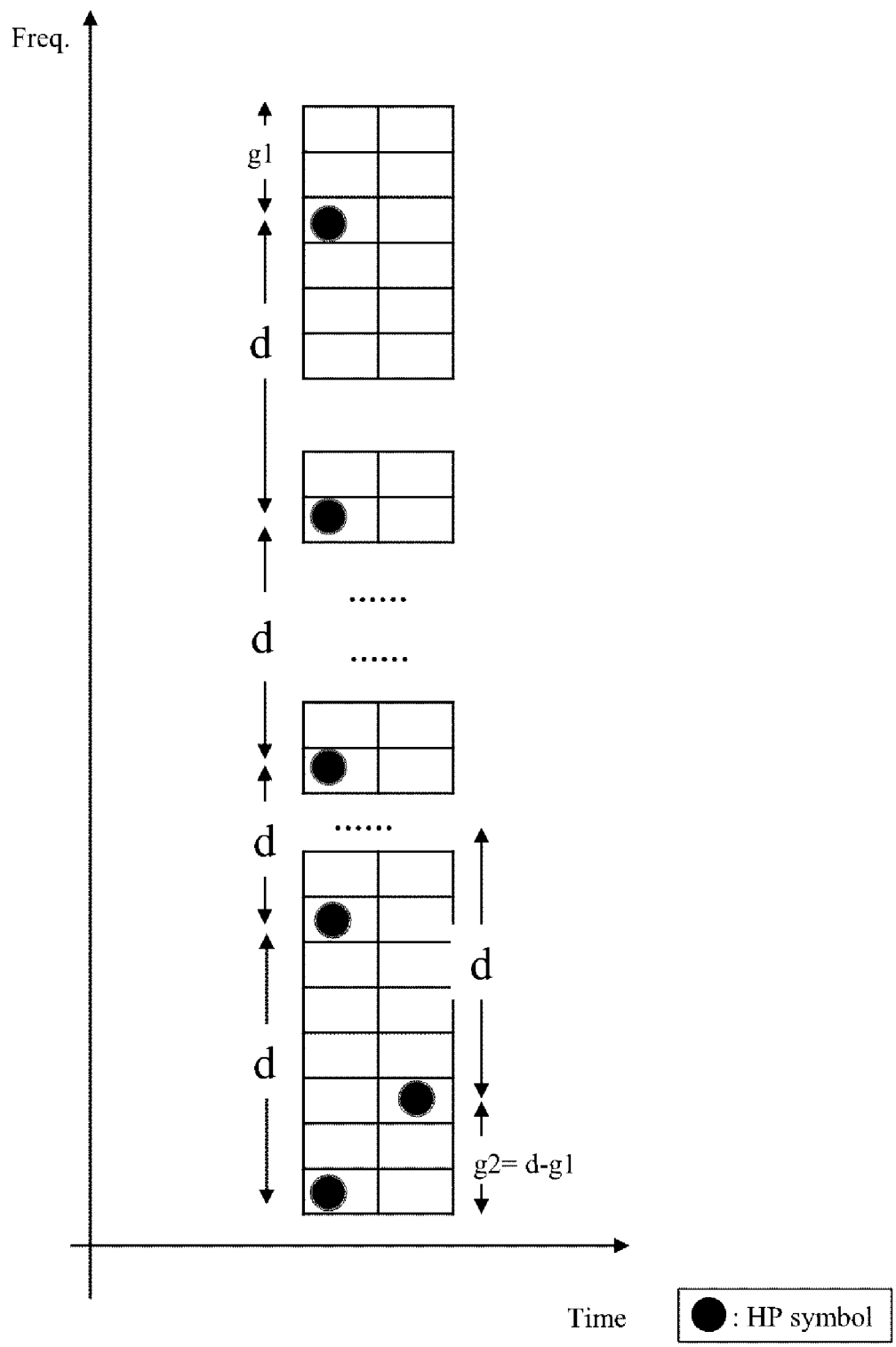

(iii) Accordingly, the UE may perform mapping in such a manner that the sum (g1+g2) of the gap g1 between the last mapped HP UCI RE (e.g., in the highest frequency) in the first symbol and the last RE of the first symbol and the gap g2 between the first RE of the second symbol and the first mapped HP UCI RE (e.g., in the lowest frequency) in the second symbol becomes d. FIG. 12 illustrates an example of HP UCI mapping. While LP UCI mapping is not shown in FIG. 12 for clarity of description, those skilled in the art will understand that LP UCI mapping may be performed based on the afore-described examples.

B. Note i. For convenience, a CSI report (e.g., a wideband CSI feedback) (to which single encoding is applied) including only one part of a fixed payload size in legacy Rel-15/16 is referred to as single-part CSI, and a CSI report (e.g., a sub-band CSI feedback) including part 1 of a fixed payload size and part 2 of a variable payload size (the parts are separately encoded) is referred to as two-part CSI.

ii. For convenience, HP UCI including an HP HARQ-ACK for a PDSCH (or SPS PDSCH release) scheduled/indicated by DCI (indicating a PRI) is referred to as HP-PRI UCI, and HP UCI including only an HP HARQ-ACK for an SPS PDSCH (and/or an HP SR) without an HP HARQ-ACK for a PDSCH (or SPS PDSCH release) scheduled/indicated by DCI is referred to as HP-SPS UCI. An LP HARQ-ACK and/or an LP SR is referred to as LP UCI.

iii. P2_Case 1: When a combination of UCIs required to be multiplexed and transmitted on the same PUCCH is {HP-PRI UCI, LP UCI, LP CSI}, the UE may operate as follows.

1. Regardless of whether the LP CSI is two-part CSI or single-part CSI, the UE may multiplex and transmit the HP-PM UCI and the LP UCI on the same PUCCH, while dropping the whole LP CSI transmission.

iv. P2_Case 2: When a combination of UCIs required to be multiplexed and transmitted on the same PUCCH is {HP-PRI UCI, LP CSI}, the UE may operate as follows.

1. P2_Case 2-1: When the LP CSI is two-part CSI, the UE may multiplex and transmit the HP-PRI UCI and LP CSI part 1 UCI on the same PUCCH, while dropping transmission of LP CSI part 2.

ⓐ Alternatively, the UE may transmit only the HP-PRI UCI on the PUCCH, while dropping the whole LP CSI transmission.

2. P2_Case 2-2: When the LP CSI is single-part CSI, the UE may multiplex and transmit the HP-PM UCI and the LP CSI on the same PUCCH, without dropping a specific UCI transmission.

ⓐ Alternatively, the UE may transmit only the HP-PRI UCI on the PUCCH, while dropping the whole LP CSI transmission.

v. P2_Case 3: When a combination of UCIs required to be multiplexed and transmitted on the same PUCCH is {HP-PRI UCI, LP UCI}, the UE may operate as follows.

1. In this case, the UE may multiplex and transmit both the HP-PRI UCI and the LP UCI on the same PUCCH.

vi. P2_Case 4: When a combination of UCIs required to be multiplexed and transmitted on the same PUCCH is {HP-SPS UCI, LP UCI, LP CSI}, the UE may operate as follows.

1. P2_Case 4-1: When the sum of the size of an HP HARQ-ACK and the size of an LP HARQ-ACK is greater than a specific size (e.g., 2 bits), the UE may transmit only the HP-SPS UCI on the PUCCH, while dropping both the LP UCI transmission and the LP CSI transmission.

ⓐ Alternatively, the UE may transmit the HP-SPS UCI and the LP UCI on the same PUCCH, while dropping the LP CSI transmission.

2. P2_Case 4-2: When the sum of the size of the HP HARQ-ACK and the size of the LP HARQ-ACK is the specific size (e.g., 2 bits), the UE may transmit the HP-SPS UCI and the LP UCI on the same PUCCH (e.g., in an HP SPS PUCCH resource configured for an HP SPS HARQ-ACK transmission), while dropping the LP CSI transmission.

ⓐ Alternatively, the UE may transmit only the HP-SPS UCI on the PUCCH, while dropping both the LP UCI transmission and the LP CSI transmission.

vii. P2_Case 5: When a combination of UCIs required to be multiplexed and transmitted on the same PUCCH is {HP-SPS UCI, LP CSI}, the UE may operate as follows.

1. In this case, the UE may transmit only the HP-SPS UCI on the PUCCH, while dropping the whole LP CSI transmission.

viii. P2_Case 6: When a combination of UCIs required to be multiplexed and transmitted on the same PUCCH is {HP-SPS UCI, LP UCI}, the UE may operate as follows.

1. P2_Case 6-1: When the sum of the size of an HP HARQ-ACK and the size of an LP HARQ-ACK is greater than a specific size (e.g., 2 bits), the UE may transmit only the HP-SPS UCI on the PUCCH, while dropping the LP UCI transmission.

ⓐ Alternatively, the UE may transmit the HP-SPS UCI and the LP UCI on the same PUCCH.

2. P2_Case 6-2: When the sum of the size of the HP HARQ-ACK and the size of the LP HARQ-ACK is the specific size (e.g., 2 bits), the UE may transmit both the HP-SPS UCI and the LP UCI on the same PUCCH (e.g., in an HP SPS PUCCH resource configured for an HP SPS HARQ-ACK transmission), without dropping a specific UCI transmission.

ⓐ Alternatively, the UE may transmit only the HP-SPS UCI on the PUCCH, while dropping the LP UCI transmission.

ix. P2_Case 7: When a combination of UCIs required to be multiplexed and transmitted on the same PUCCH is {HP SR, LP UCI, LP CSI}, the UE may operate as follows.

1. P2_Case 7-1: When an LP HARQ-ACK is greater than a specific size (e.g., 2 bits), the UE may transmit only the HP SR on the PUCCH, while dropping both the LP UCI transmission and the LP CSI transmission.

ⓐ Alternatively, the UE may transmit the HP SR and the LP UCI on the same PUCCH, while dropping the LP CSI transmission.

2. P2_Case 7-2: When the LP HARQ-ACK is equal to or less than the specific size (e.g., 2 bits), the UE may multiplex and transmit both the HP SR and the LP UCI on the same PUCCH (e.g., in an HP SR PUCCH resource configured for an HP SR transmission), while dropping the LP CSI transmission.

ⓐ Alternatively, the UE may transmit only the HP SR on the PUCCH, while dropping both the LP UCI transmission and the LP CSI transmission.

x. P2_Case 8: When a combination of UCIs required to be multiplexed and transmitted on the same PUCCH is {HP SR, LP CSI}, the UE may operate as follows.

1. In this case, the UE may transmit only the HP SR on the PUCCH, while dropping the whole LP CSI transmission.

xi. P2_Case 9: When a combination of UCIs required to be multiplexed and transmitted on the same PUCCH is {HP SR, LP UCI}, the UE may operate as follows.

1. P2_Case 9-1: When an LP HARQ-ACK is greater than a specific size (e.g., 2 bits), the UE may transmit only the HP SR on the PUCCH, while dropping the LP UCI transmission.

ⓐ Alternatively, the UE may multiplex and transmit the HP SR and the LP UCI on the same PUCCH.

2. P2_Case 9-2: When the LP HARQ-ACK is equal to or less than the specific size (e.g., 2 bits), the UE may multiplex and transmit both the HP SR and the LP UCI on the same PUCCH (e.g., in an HP SR PUCCH resource configured for an HP SR transmission), without dropping a specific UCI transmission.

ⓐ Alternatively, the UE may transmit only the HP SR on the PUCCH, while dropping the LP UCI transmission.

8) Issue 6

A. In a situation in which only a combination of UCIs having the same priority is conventionally multiplexed and transmitted in the same one (configured) PUCCH resource (or such multiplexing/transmission is configured), the UE may operate as follows.

i. The UE may transmit the combination of UCIs by using a minimum number of RBs to which coded bits determined based on a maximum UCI coding rate configured for the priority and a total payload size of the combination of the UCIs (in the corresponding PUCCH resource). (This is referred to as "RB ADAPTATION", for convenience).

B. In a situation in which a combination of UCIs having different priorities (e.g., LP/HP) are multiplexed and transmitted in the same one (configured) PUCCH resource (or such multiplexing/transmission is configured), the UE may operate as follows.

i. Unlike the conventional method, the UE may perform a multiplexed transmission for the combination of the UCIs by using all RBs within the PUCCH resource without applying the above RB ADAPTATION operation.

1. This may be done to prevent performance degradation and complexity (particularly, of an HP UCI transmission) caused by mismatch between the number of REs to be actually used by the UE and the number of REs expected (to be used by the UE) by the BS due to RB ADAPTATION at the UE, when ambiguity about the payload size of specific UCI between the UE and the BS occurs due to a cause such as the UE's failure in detecting DCI transmitted by the BS.

9) Issue 7

A. In a situation in which an HP HARQ-ACK and an LP HARQ-ACK are multiplexed/configured to be multiplexed in the same PUCCH/PUSCH, information about the payload size of the LP HARQ-ACK may be signaled/indicated by DCI scheduling a PDSCH corresponding to the HP HARQ-ACK (i.e., HP DL DCI) and/or DCI scheduling an HP PUSCH (i.e., HP UL DCI) in consideration of possible mismatch of the payload size of the LP HARQ-ACK between the UE and the BS (which may be caused by failure of DL DCI detection).

i. In a state in which a plurality of candidate (LP HARQ-ACK) payload sizes are preconfigured by RRC signaling, one of the candidate payload sizes may be indicated by DCI. Values/the number of the plurality of candidate payload sizes may vary according to an HARQ-ACK codebook type configured for the LP HARQ-ACK.

ii. For example, when a Type-2 codebook is configured for the LP HARQ-ACK, the candidate payload sizes may be set to four values {X-bit, Y-bit, Z-bit, W-bit} (where X<Y<Z<W) and X=0, or four values: {X-bit, Y-bit, Z-bit, W-bit} (where 0<X<Y<Z<W). In the latter case where X is a non-zero, when a payload size is indicated as the largest size, W bits by HP DCI, and there is no LP DL DCI (and/or no PDSCH corresponding to the LP HARQ-ACK) actually received by the UE, the UE may assume/determine exceptionally that the payload size of the LP HARQ-ACK is 0.

1. When a payload size (e.g., $P_d$ bits) indicated by DCI is larger than an actual (LP HARQ-ACK) payload size (e.g., $P_u$ bits) calculated by the UE (based on an actual PDSCH reception), the UE may configure payload of the indicated size, $P_d$ bits (on a PUCCH/PUSCH), wherein the actual payload may be mapped to the first $P_u$ bits of the payload, and NACK may be mapped to the last $\{P_d - P_u\}$ bits.

2. When the payload size (e.g., $P_d$ bits) indicated by the DCI is less than the actual (LP HARQ-ACK) payload size (e.g., $P_u$ bits) calculated by the UE (based on the actual PDSCH reception), the UE may configure the payload (on the PUCCH/PUSCH) of the indicated size $P_d$ bits, wherein the first $P_u$ bits of the actual payload may be mapped to the payload, and transmission of the last $\{P_d - P_u\}$ bits (of the actual payload) may be dropped.

3. In the above example, the (candidate) payload size(s) indicated (configured) by the DCI (RRC) and the actual payload size calculated by the UE (based on the PDSCH reception) (and payload configured on the PUCCH/PUSCH) may be set/indicated/determined/configured only for an HARQ-ACK corresponding to a DAI-based PDSCH (scheduled by DCI indicating a DAI) (except for an HARQ-ACK corresponding to an SPS PDSCH) (CASE A), or may be set/indicated/determined/configured for both of the HARQ-ACK corresponding to the DAI-based PDSCH and the HARQ-ACK corresponding to the SPS PDSCH (CASE B).

4. Accordingly, in the former (CASE A), HARQ-ACK payload corresponding to the DAI-based PDSCH may be configured based on the payload size indicated by DCI, and HARQ-ACK payload corresponding to the SPS PDSCH may be configured based on the PDSCH reception of the UE. In the latter (CASE B), the entire HARQ-ACK payload for both the DAI-based PDSCH and the SPS PDSCH may be configured based on the payload size indicated by the DCI.

iii. In another example, when a Type-1 codebook is configured for the LP HARQ-ACK, the candidate payload sizes may be set to include three values {nothing case, fallback case, full case} or two values, {nothing or fallback case, full case}, where each of the nothing/fallback/full cases may correspond to the following cases.

1. Fallback Case

In the case where an A/N feedback transmission in a specific slot is required, when a PDSCH or DCI for which a slot is indicated/configured as an A/N feedback transmission timing is given as follows, (i) there is only one PDSCH on a Pcell scheduled in fallback DCI format 1_0 indicating DAI=1, or (ii) there is only one fallback DCI format 1_0-based PDCCH that commands SPS PDSCH release while indicating DAI=1, or (iii) there is only SPS PDSCH(s), the UE may configure/transmit an A/N feedback only for one PDSCH (i.e., Pcell PDSCH) or an SPS PDSCH release PDCCH (i.e., SPS release) or SPS PDSCH(s) on the Pcell received (not full payload) in the specific slot.

2. Nothing Case

When there is no PDSCH or DCI for which a specific slot is indicated/configured as an A/N feedback transmission timing, the UE may not configure/transmit an A/N feedback in the slot.

3. Full Case

This is a case which does not correspond to either of the fallback case and the nothing case. In this case, the UE may configure/transmit full payload based on all {K1, TDRA} combinations as an A/N feedback.

4. According to the above description, for example, in a situation where the candidate payload sizes are set to three values, {nothing case, fallback case, full case}, when the nothing case is indicated by DCI, an LP A/N may not be configured/transmitted by determining an LP A/N feedback to be 0 bit. When the fallback case is indicated by DCI, the LP A/N feedback may be configured/transmitted only with SPS HARQ-ACK bit(s). When the fallback case is indicated by DCI, an LP A/N feedback may be configured/transmitted in full payload based on all {K1, TDRA} combinations.

5. In another example, in a situation where the candidate payload sizes are set to two values, {nothing or fallback case, full case}, when the nothing or fallback case is indicated by DCI, the LP A/N feedback may be configured/transmitted only with 1 bit or SPS HARQ-ACK bit(s), and when the full case is indicated by DCI, the LP A/N feedback may be configured/transmitted in full payload based on all {K1, TDRA} combinations.

iv. Accordingly, based on the combination of an LP HARQ-ACK payload size and an HP HARQ-ACK payload size determined based on a payload size indicated by DCI (e.g., the total payload size obtained by adding the two sizes), 1) a PUCCH resource (set) to be used for a transmission in which a corresponding HP HARQ-ACK and LP HARQ-ACK are multiplexed may be selected/determined, and 2) a minimum number of RBs to be used for actual UCI transmission in the selected PUCCH resource may be determined (i.e., RB ADAPTATION is performed).

10) Issue 8

A. In a situation where an HP HARQ-ACK and an LP HARQ-ACK are multiplexed in the same PUCCH, a PUCCH resource set corresponding to a scaled total payload size (e.g., Y bits) calculated by adding a scaled LP HARQ-ACK payload size obtained by multiplying an LP HARQ-ACK payload size by a scaling factor (which is a prime number less than 1) and an HP HARQ-ACK payload size may be selected (a UCI transmission may be performed in a specific PUCCH resource of the PUCCH resource set), in consideration of PUCCH resource waste which may be caused by selecting a PUCCH resource set corresponding to a total payload size (e.g., X bits) obtained by adding the payload sizes of the two HARQ-ACKs. In this case, the UE may determine a parameter (e.g. n_HARQ) value for PUCCH power control based on the scaled total payload size, Y bits. Alternatively, the UE may determine the parameter (e.g. n_HARQ) value for PUCCH power control based on the original total payload size X bits before the scaling.

i. Characteristically, when the HP HARQ-ACK is 1 bit and the LP HARQ-ACK is X bits (where X>1), and the scaled total payload size is less than or equal to 2 bits, the UE may operate as follows.

ii. P2_Alt 1: In this case, the UE may exceptionally select a set configured for the smallest payload size among PUCCH resource sets corresponding to a payload size exceeding 2 bits (multiplex/transmit the whole UCI in a specific PUCCH resource of the set).

1. When even a PUCCH resource set corresponding to a payload size equal to or less than 2 bits is included, the UE may select a set configured for the second smallest payload size among all sets.

iii. P2_Alt 2: In this case, the UE may select a PUCCH resource set configured for the payload size equal to or less than 2 bits (perform a UCI transmission in a specific PUCCH resource of the PUCCH resource set).

1. In this case, the UE may multiplex only one MSB of the X-bit LP HARQ-ACK with a 1-bit HP HARQ-ACK, for transmission, while dropping the transmission of the remaining X−1 bit(s) of the LP HARQ-ACK.

2. Alternatively in this case, the UE may exceptionally drop the transmission of the whole X-bit LP HARQ-ACK and transmit only the 1-bit HP HARQ-ACK.

3. Alternatively, in this case, the UE may multiplex and a 1-bit bundled LP HARQ-ACK generated by bundling LP HARQ-ACKs of X bits with the 1-bit HP HARQ-ACK, for transmission.

11) Issue 9

A. Conventionally, the maximum number of individual encodings available for a plurality of UCIs multiplexed on one PUSCH is limited to 3 (e.g., an HARQ-ACK, CSI part 1, and CSI part 2 are separately encoded). When multiplexing and transmitting the HP UCI and the LP UCI on one PUSCH, the UE may operate as follows.

i. Based on the following priorities, the UE may select only top three UCIs (having the highest priority), separately encode the UCIs, and then multiplex and transmit the encoded UCIs on a PUSCH.

1. P2_Alt (1): HP HARQ-ACK>LP HARQ-ACK>HP CSI part 1>HP CSI part 2>LP CSI part 1>LP CSI part 2

2. P2_Alt (2): HP HARQ-ACK>LP HARQ-ACK>HP CSI part 1>LP CSI part 1>HP CSI part 2>LP CSI part 2

12) P2_Opt 3

A. When selecting a PUCCH resource in which the LP UCI and the HP UCI are multiplexed and transmitted, the UE may operate as follows.

i. As described above, a (MUX) PUCCH resource set may be separately configured for UCI multiplexing between different priorities.

ii. In this case, the two UCIs may be multiplexed and transmitted by selecting one PUCCH resource corresponding to a PRI indicated by last DCI from a MUX PUCCH resource set configured for the total size of UCI payload in which the LP UCI and the HP UCI are combined.

i. In this case, 1) the payload size before the HARQ-ACK bundling and the drop method are applied, 2) the payload size when the HARQ-ACK bundling is applied before the HARQ-ACK drop method is applied, or 3) the payload size after both the HARQ-ACK bundling and the drop method are applied may be considered as the payload size of the LP UCI (e.g., HARQ-ACK) for determining the above MUX PUCCH resource set.

For example, the types of both the LP UCI and the HP UCI may be HARQ-ACK.

[Proposal 3]

1) P3_Opt 1

A. The UE may separately encode LP UCI and HP UCI and map/transmit the encoded LP UCI and HP UCI in the same single PUSCH resource.

i. It is assumed that the payload sizes of the LP UCI and the HP UCI are $U_L$ and $U_H$, respectively, and the maximum number of REs (available for UCI mapping) in the PUSCH resource is N.

1. For example, both types of the LP UCI and the HP UCI may be HARQ-ACK.

Figure 13:
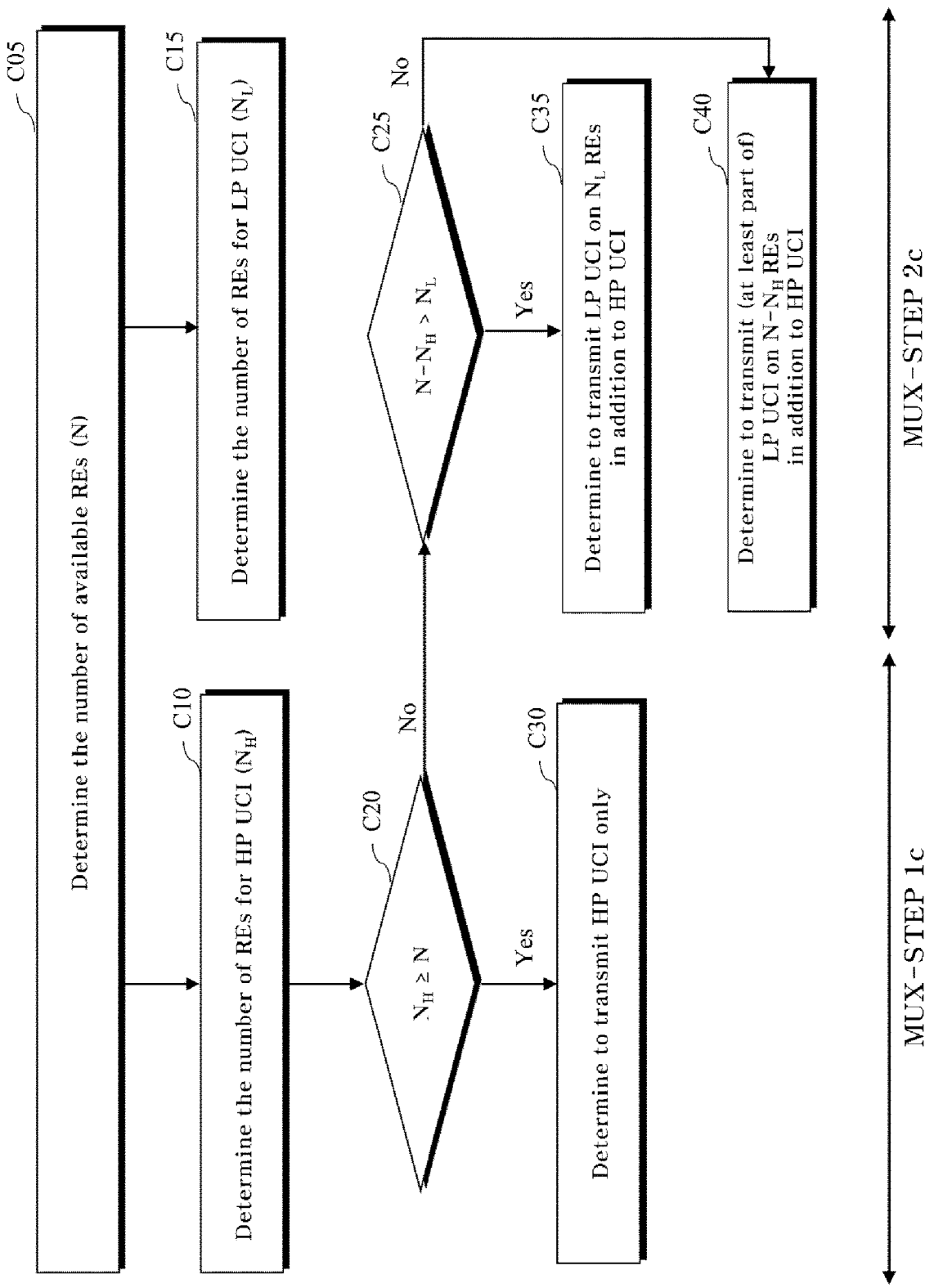

In another example, the type of the LP UCI may be (aperiodic or periodic) CSI, whereas the type of the HP UCI may be HARQ-ACK.

ii. Referring to FIG. 13, the UE may determine the number $N_H$ of REs required for mapping coded bits of the HP UCI based on the payload size of the HP UCI and a beta offset '$\beta_{offset}$' configured for the HP (C05). When $N_H$<N, the UE may map/transmit the HP UCI to/in specific $N_H$ REs among the N REs (this is defined as "MUX-STEP 1c", for convenience).

1. When $N_H \geq N$, the UE may map/transmit only the HP UCI to/in all the N REs, without mapping/transmitting the whole LP UCI by dropping the LP UCI (C30).

iii. The UE may then determine the number $N_L$ of RE(s) required for mapping coded bits of the LP UCI based on the payload size of the LP UCI and a beta offset R offset configured for the LP (C15). When $N_L < \{N-N_H\}$, the UE may map/transmit the LP UCI to/in specific $N_L$ REs among the remaining $\{N-N_H\}$ RE(s) (C35). When $N_L \geq \{N-N_H\}$, the UE may map/transmit at least part of the LP UCI to/in the remaining $\{N-N_H\}$ REs (C40), or drop it in some cases. (This is defined as "MUX-STEP 2c", for convenience).

1. For example, when $N_L \geq \{N-N_H\}$, the UE may map/transmit the (whole) LP UCI to/in the remaining $\{N-N_H\}$ REs.

2. For example, in a situation where $N_L > \{N-N_H\}$, when a UCI coding rate obtained by combining $\{N-N_H\}$ REs and the payload size of the LP UCI is greater than a (separately set) specific threshold (e.g., $R_{th}$) (or when the ratio between $\{N-N_H\}$ REs and the total N REs (e.g., $\{N-N_H\}/N$) is less than a (separately set) specific threshold (e.g., $F_{th}$), the UE may operate as follows.

The UE may not map/transmit the whole LP UCI by dropping the LP UCI, map drop part of the LP UCI and map/transmit only the remaining part to/in $\{N-N_H\}$ REs, or when the type of the LP UCI is HARQ-ACK, may map/transmit LP UCI payload configured by bundling ACKs/NACKs to/in $\{N-N_H\}$ REs.

For example, (i) when $N \geq N_H + N_L$, the UE may map/transmit the HP UCI and the LP UCI to/in (at least) $N_H + N_L$ REs. (ii) When $N-N_H < N_L$, the UE may map only part of the LP UCI to the remaining RE(s), transmit/drop the LP UCI based on the number (or ratio) of the remaining RE(s), spatially bundle LP UCI A/N's and transmit the bundle in the remaining RE(s), map only part of the LP UCI based on the coding rate of the LP UCI calculated based on the remaining RE(s), or drop the whole LP UCI.

iv. When the type of the LP UCI is HARQ-ACK and the type of the HP UCI is (aperiodic) CSI, a structure may be used (configured/assume/defined/indicated) between the BS and the UE, in which HP CSI is exceptionally mapped to the remaining REs after the LP HARQ-ACK is first mapped to REs.

v. Regarding UCI RE mapping positions/order on a PUSCH, the following may be performed.

1. A structure may be used, in which the HP UCI is first mapped immediately after the first DMRS symbol of the PUSCH (in the same manner as the conventional HARQ-ACK RE mapping), and the LP UCI is mapped, starting from the first symbol in the PUSCH (except for RE(s) to which the HP UCI is mapped) (in the same manner as the conventional CSI RE mapping).

(a) Even in this case, when the type of the LP UCI is HARQ-ACK and the type of the HP UCI is (aperiodic) CSI, exceptionally, the LP HARQ-ACK may be mapped immediately after the first DMRS symbol of the PUSCH, and the HP CSI may be mapped, starting from the first symbol of the PUSCH (except for the RE(s) to which the LP HARQ-ACK is mapped).

2. Alternatively, a structure may be used (configured/assumed/defined/indicated) between the BS and the UE, in which with the conventional RE mapping positions/order for each existing UCI type still maintained, the HP UCI is first mapped and then the LP UCI is mapped (e.g., after the first DMRS symbol of the PUSCH, the HP HARQ-ACK is first mapped and then LP HARQ-ACK is mapped), for the same UCI type.

vi. When the LP UCI (e.g., HARQ-ACK) is dropped in MUX-STEP 2c, the drop order may be determined (differently) according to an HARQ-ACK codebook type configured for the LP, as follows.

1. Assuming that the payload size of the LP UCI is $U_L$, the UE may determine the maximum payload size UR of the LP UCI mappable to $\{N-N_H\}$ REs based on the remaining $\{N-N_H\}$ REs and $R_{th}$.

vii. Type-1 codebook: A structure may be used (configured/assumed/defined/indicated) between the BS and the UE, in which an HARQ-ACK (A/N bits) corresponding to a PDSCH occasion configured/schedulable for a higher (serving) cell index is first dropped. For example, a structure may be used (configured/assumed/defined/indicated) between the BS and the UE, in which for one cell, an HARQ-ACK (A/N bits) corresponding to a PDSCH occasion having a later starting/ending symbol timing is first dropped. In another method, a structure may be used (configured/assumed/defined/indicated) between the BS and the UE, in which an HARQ-ACK corresponding to a higher bit index in HARQ-ACK payload of the Type-1 codebook is first dropped.

1. For example, a structure may be used (configured/assumed/defined/indicated) between the BS and the UE, in which an HARQ-ACK for a PDSCH occasion having the last starting/ending timing configured for the highest cell index is first dropped, and then an HARQ-ACK for a PDSCH occasion having the second last starting/ending timing is dropped, and when HARQ ACKs for a plurality of PDSCH occasions configured for the highest cell index are all dropped, an HARQ-ACK for a PDSCH occasion configured for the second highest cell index is dropped (sequentially, starting from an HARQ-ACK for a PDSCH occasion having a later starting/ending timing).

2. In the above example, an HARQ-ACK (bit number) unit to be dropped may be an HARQ-ACK (A/N bits) corresponding to one bit, one TB, one PDSCH, or one CBG. In one PDSCH, A/N bit(s) associated with a higher bit/TB/CBG index may first be dropped, whereas in one TB, A/N bit(s) associated with a higher bit index/CBG index may first be dropped.

3. In another example, a structure in which HARQ-ACKs are dropped, starting from an HARQ-ACK corresponding to a higher bit index in HARQ-ACK payload of the Type-1 codebook may be used (configured/assumed/defined/indicated) between the BS and the UE. In this case, an HARQ-ACK (bit number) unit to be dropped may be an HARQ-ACK (A/N bits) corresponding to one bit, one TB, one PDSCH, or one CBG.

4. Although the UE may sequentially drop HARQ-ACKs according to the above-described rule, the UE may drop only up to a minimum number of HARQ-ACKs satisfying $U_R \geq U_L$.

viii. Type-2 codebook: An HARQ-ACK (bits) may be dropped based on a DAI value. For example, a structure may be used (configured/assumed/defined/indicated) between the BS and the UE, in which an HARQ-ACK (A/N bits) corresponding to a PDSCH occasion having a higher scheduling order (higher-counter DAI) value determined based on a DAI value indicated by DCI is first dropped. In another method, a structure may be used (configured/assumed/defined/indicated) between the BS and the UE, in which HARQ-ACK corresponding to a higher bit index in HARQ-ACK payload of the Type-2 codebook is first dropped.

1. For example, a structure in which an HARQ-ACK corresponding to a higher counter-DAI value is first dropped may be used (configured/assumed/defined/indicated) between the BS and the UE (e.g., DAI-based drop). An HARQ-ACK (bit number) unit to be dropped based on the DAI-based drop scheme may be an HARQ-ACK (A/N bits) corresponding to one A/N bit, one TB, one PDSCH, or one CBG. In one PDSCH, A/N bit(s) associated with a higher bit/TB/CBG index may first be dropped, whereas in the same TB, A/N bit(s) associated with a higher bit/CBG index may first be dropped.

2. When the Type-2 codebook includes at least two of three sub-codebooks {TB sub-codebook for TB-wise/based PDSCH transmission, CBG sub-codebook for CBG-wise/based PDSCH transmission, SPS sub-codebook for SPS PDSCH transmission}, a structure of dropping HARQ-ACKs in the following order may be used. The DAI-based drop or bit-based drop scheme may be applied to the TB sub-codebook and the CBG sub-codebook, and the bit-based drop scheme may be applied to the SPS sub-codebook.

P3_Opt 1_1) The UE may drop TB sub-codebook-based A/N(s), CBG sub-codebook-based A/N(s), and SPS sub-codebook-based A/N(s) in this order.
 P3_Opt 1_2) The UE may drop TB sub-codebook-based A/N(s), SPS sub-codebook-based A/N(s), and CBG sub-codebook-based A/N(s) in this order.
 P3_Opt 1_3) The UE may drop CBG sub-codebook-based A/N(s), TB sub-codebook-based A/N(s), and SPS sub-codebook-based A/N(s) in this order.
 P3_Opt 1_4) The UE may drop CBG sub-codebook-based A/N(s), SPS sub-codebook-based A/N(s), and TB sub-codebook-based A/N(s) in this order.
 P3_Opt 1_5) The UE may drop SPS sub-codebook-based A/N(s), TB sub-codebook-based A/N(s), and CBG sub-codebook-based A/N(s) in this order.
 P3_Opt 1_6) The UE may drop SPS sub-codebook-based A/N(s), CBG sub-codebook-based A/N(s), and TB sub-codebook-based A/N(s) in this order.

3. In another example, a structure in which an HARQ-ACK corresponding to a higher bit index in HARQ-ACK payload of the Type-2 codebook is first dropped may be used (bit-based drop). In this case, an HARQ-ACK (bit number) unit to be dropped may be an HARQ-ACK (A/N bits) corresponding to one bit, one TB, one PDSCH, or one CBG.

4. Although the UE may sequentially drop HARQ-ACKs according to the above-described rule, the UE may drop only up to a minimum number of HARQ-ACKs satisfying $U_R \geq U_L$.

ix. In MUX-STEP 2c, a structure may be used (configured/assumed/defined/indicated) between the BS and the UE, in which HARQ-ACK bundling is performed (for the LP UCI) before the LP HARQ-ACK is first dropped.

1. When at least one of two PDSCH transmission types {PDSCH transmission carrying up to two TBs, CBG-wise-based PDSCH transmission} is configured/scheduled, a structure in which an HARQ-ACK bundling operation and HARQ-ACK drop operation are performed in the following order may be used (configured/assumed/defined/indicated) between the BS and the UE.

P3_Opt a1: In a state in which HARQ-ACK payload is configured by bundling all HARQ-ACKs for (a plurality of) TB(s)/CBG(s) on one PDSCH, such that a 1-bit HARQ-ACK is generated for each PDSCH, when the size of the HARQ-ACK payload satisfies $U_R \geq U_L$, the UE may map/transmit the HARQ-ACK payload without HARQ-ACK drop. When the size of the HARQ-ACK payload does not satisfy $U_R \geq U_L$, the UE may apply the above-described HARQ-ACK drop method (at least partially) (to the bundled HARQ-ACK (bits)).

P3_Opt a2: In a state in which HARQ-ACK payload is configured by bundling all HARQ-ACKs for (a plurality of) CBG(s) forming one TB, such that a 1-bit HARQ-ACK is generated for each TB, when the size of the HARQ-ACK payload satisfies $U_R \geq U_L$, the UE may map/transmit the HARQ-ACK payload without HARQ-ACK drop. When the size of the HARQ-ACK payload does not satisfy $U_R \geq U_L$, the UE may apply P3_Opt a1) (in which all HARQ-ACKs for (a plurality of) TB(s)/CBG(s) on one PDSCH are bundled).

x. 1) The payload size before the HARQ-ACK bundling and the drop method are applied, 2) the payload size when the HARQ-ACK bundling is applied before the HARQ-ACK drop method is applied, or 3) the payload size after both the HARQ-ACK bundling and the drop method are applied may be considered as the payload size of the LP UCI for determining a beta offset R offset applied to determine the number of REs of a PUSCH required for mapping coded bits of the LP UCI (e.g., HARQ-ACK) in this embodiment.

B. The UE may separately encode the LP UCI (e.g., HARQ-ACK), or the LP UCI and the HP UCI (e.g., HARQ-ACK and/or CSI), and map/transmit the encoded UCI on the same single HP PUSCH.

i. P3_Case a1: When the LP HARQ-ACK is equal to or less 2 bit, and the HP HARQ-ACK is 0 bits (or equal to or less than 2 bits), the UE may operate as follows.

1. First, the UE may (sequentially) reserve RE(s) in the earliest non-DMRS symbol after the first DMRS symbol on the HP PUSCH as a reserved RE set corresponding to a 2-bit HP HARQ-ACK. The reason for reserving the reserved RE set in spite of an actual HP HARQ-ACK being 0 bit from the perspective of the UE is to prevent HARQ-ACK payload mismatch between the UE and the BS, in case where the BS transmits DL DCI indicating HP and the UE fails in detecting the DCI.

2. Subsequently, HP CSI part 1 (and/or part 2) and a UL-SCH may be mapped (sequentially), starting from RE(s) in the first non-DMRS symbol of the HP PUSCH (the HP CSI may be mapped and then the UL-SCH may be mapped). In this case, HP CSI part 1 may not be mapped to the (pre-scheduled) reserved HP HARQ-ACK RE(s) (i.e., mapped except for the reserved REs), while the UL-SCH (and/or HP CSI part 2) may also be mapped to the reserved HP HARQ-ACK RE(s).

ⓐ In another method, HP CSI part 1 (and/or part 2) and the UL-SCH may be mapped (sequentially), starting from RE(s) in the first non-DMRS symbol of the HP PUSCH (the HP CSI may be first mapped and then the UL-SCH may be mapped). In this case, the UL-SCH and HP CSI part 1 (and/or HP CSI part 2) may also be mapped to the reserved HP HARQ-ACK RE(s).

3. For the LP HARQ-ACK, the UE may operate as follows.

P3_Optb1) The UE may map the LP HARQ-ACK by puncturing the remaining REs (already mapped to the UL-SCH (and/or HP CSI part 2)) except for the reserved REs in the last OFDM symbol, symbol #n including the reserved HP HARQ-ACK RE(s), and (sequentially) puncturing RE(s) (already mapped to the UL-SCH (and/or HP CSI part 2)) in the earliest OFDM symbol after OFDM symbol #n. In this case, the LP HARQ-ACK may not be mapped to RE(s) mapped to HP CSI part 1 (without puncturing the RE(s)). (i.e., the LP HARQ-ACK may be mapped except for the HP CSI part 1 RE(s)).

(a) In another method, the UE may map the LP HARQ-ACK by puncturing the remaining REs (already mapped to the UL-SCH and HP CSI part 1 (and/or HP CSI part 2)) except for the reserved REs in the last OFDM symbol, symbol #n including the reserved HP HARQ-ACK RE(s), and (sequentially) puncturing RE(s) (already mapped to the UL-SCH and HP CSI part 1 (and/or HP CSI part 2)) in the earliest OFDM symbol after OFDM symbol #n.

P3_Opt b2) The UE may map the LP HARQ-ACK by (sequentially) puncturing REs already mapped to the UL-SCH (and/or HP CSI part 2) among RE(s) in the earliest OFDM symbol including the first non-DMRS symbol of the HP PUSCH. In this case, the LP HARQ-ACK may not be mapped to the reserved HP HARQ-ACK RE(s) and RE(s) mapped to HP CSI part 1 (without puncturing the RE(s)). (i.e., the LP HARQ-ACK may be mapped except for the reserved RE(s) and the HP CSI part 1 RE(s)).

(a) In another method, the UE may map the LP HARQ-ACK by (sequentially) puncturing REs (already mapped to the UL-SCH and HP CSI part (and/or HP CSI part 2) among RE(s) in the earliest OFDM symbol including the first non-DMRS symbol of the HP PUSCH. In this case, the LP HARQ-ACK may not be mapped to the reserved HP HARQ-ACK RE(s) (without puncturing the RE(s)). (i.e., the LP HARQ-ACK may be mapped except for the reserved RE(s)).

4. Then, when an actual HP HARQ-ACK (0 bits) does not exist, an additional UCI RE mapping operation may not be performed. On the contrary, when the actual HP HARQ-ACK (2 or fewer bits) exists, the HP HARQ-ACK may be mapped to the reserved HP HARQ-ACK RE(s) (by puncturing the UL-SCH (and/or HP CSI part 2) or the UL-SCH and HP CSI part 1 (and/or HP CSI part 2) already mapped to the reserved HP HARQ-ACK RE(s)).

5. When the LP UCI (e.g., HARQ-ACK) is piggybacked to the HP PUSCH, the following operations may be performed.

P3_Opt c1) The transmission of HP CSI part 2 may always be dropped. Or

P3_Opt c2) In the absence of the HP HARQ-ACK, HP CSI part 2 may be included and piggybacked. In the presence of the HP HARQ-ACK, the transmission of HP CSI part 2 may be dropped. Or P3_Opt c3) When the size of the HP HARQ-ACK or the size of the LP HARQ-ACK is equal to or less than 2 bits, HP CSI part 2 may be included and piggybacked. When the sizes of both the HP HARQ-ACK and the LP HARQ-ACK are greater than 2 bits, the transmission of HP CSI part 2 may be dropped.

P3_Opt c1/c2/c3 may be applied to both a PUSCH including a UL-SCH transmission and a PUSCH without a UL-SCH (including only a UCI transmission), or P3_Opt c1/c2/c3 may be applied only to the PUSCH including a UL-SCH transmission, and HP CSI part 2 may be always included and piggybacked, for the PUSCH without a UL-SCH.

i. P3_Case a2: When the size of the LP HARQ-ACK is greater than 2 bits and the size of the HP HARQ-ACK is 0 bits (or equal to or less than 2 bits), the UE may operate as follows.

1. First, RE(s) in the earliest non-DMRS symbol after the first DMRS symbol of the HP PUSCH may be (sequentially) reserved as a reserved RE set corresponding to a 2-bit HP HARQ-ACK. The reason for reserving the reserved RE set in spite of an actual HP HARQ-ACK being 0 bits from the perspective of the UE is to prevent HARQ-ACK payload mismatch between the UE and the BS, in case where the BS transmits DL DCI indicating HP and the UE fails in detecting the DCI.

2. For the LP HARQ-ACK, the UE may operate as follows.

P3_Opt d1) The LP HARQ-ACK, HP CSI part 1 (and/or part 2), and a UL-SCH may be mapped (sequentially), starting from RE(s) in the first non-DMRS symbol of the HP PUSCH. (In this case, the LP HARQ-ACK may first be mapped, followed by mapping of the HP CSI and then the UL-SCH). In this case, the LP HARQ-ACK and HP CSI part 1 may not be mapped to the (pre-scheduled) reserved HP HARQ-ACK RE(s) (i.e., mapped except for the reserved RES), whereas the UL-SCH (and/or HP CSI part 2) may also be mapped to the reserved HP HARQ-ACK RE(s).

(a) In another method, the LP HARQ-ACK, HP CSI part 1 (and/or part 2), and the UL-SCH may be mapped (sequentially), starting from RE(s) in the first non-DMRS symbol of the HP PUSCH. (In this case, the LP HARQ-ACK may be first mapped, followed by mapping of the HP CSI and then the UL-SCH). In this case, the LP HARQ-ACK may not be mapped to the (pre-scheduled) reserved HP HARQ-ACK RE(s) (i.e., mapped except for the reserved RES), whereas the UL-SCH and HP CSI part 1 (and/or HP CSI part 2) may also be mapped to the reserved HP HARQ-ACK RE(s).

P3_Opt d2) The UE may map the LP HARQ-ACK (sequentially) to the remaining REs except for the reserved REs in the last symbol including the reserved HP HARQ-ACK RE(s) and RE(s) in the earliest OFDM symbol after the last symbol. Then, HP CSI part 1 (and/or part 2) and the UL_SCH may be mapped (sequentially), starting from RE(s) in the first non-DMRS symbol of the HP PUSCH (the HP CSI may first be mapped and then the UL-SCH is mapped). In this case, HP CSI part 1 may not be mapped to the reserved HP HARQ-ACK RE(s) and LP HARQ-ACK RE(s) (i.e., mapped except for the reserved RES and the LP HARQ-ACK RE(s)), whereas the UL-SCH (and/or HP CSI part 2) may be mapped to the reserved HP HARQ-ACK RE(s), not to the LP HARQ-ACK RE(s).

(a) In another method, the UE may map the LP HARQ-ACK (sequentially) to the remaining REs except for the reserved REs in the last symbol including the reserved HP HARQ-ACK RE(s), and RE(s) in the earliest OFDM symbol after the last symbol. Then, HP CSI part 1 (and/or part 2) and the UL-SCH may be mapped (sequentially), starting from RE(s) in the first non-DMRS symbol of the HP PUSCH (the HP CSI may first be mapped, and then the UL-SCH may be mapped). In this case, the UL-SCH and HP CSI part 1 (and/or HP CSI part 2) may be mapped to the reserved HP HARQ-ACK RE(s), not to the LP HARQ-ACK RE(s).

3. Then, when an actual HP HARQ-ACK (0 bits) does not exist, an additional UCI RE mapping operation may not be performed. On the contrary, when the actual HP HARQ-ACK (2 or fewer bits) exists, the HP HARQ-ACK may be mapped to the reserved HP HARQ-ACK RE(s) (by puncturing the UL-SCH (and/or HP CSI part 2) or the UL-SCH and HP CSI part 1 (and/or HP CSI part 2) already mapped to reserved HP HARQ-ACK RE(s)).

4. When the LP UCI (e.g., HARQ-ACK) is piggybacked to the HP PUSCH, the following operation may be performed.

P3_Opt e1) The transmission of HP CSI part 2 may always be dropped. Or

P3_Opt e2) In the absence of the HP HARQ-ACK, HP CSI part 2 may be included and piggybacked. In the presence of the HP HARQ-ACK, the transmission of HP CSI part 2 may be dropped. Or P3_Opt e3) When the size of the HP HARQ-ACK or the size of the LP HARQ-ACK is equal to or less than 2 bits, HP CSI part 2 may be included and piggybacked. When the sizes of both the HP HARQ-ACK and the LP HARQ-ACK are greater than 2 bits, the transmission of HP CSI part 2 may be dropped.

P3_Opt e1/e2/e3 may be applied to both a PUSCH including a UL-SCH transmission and a PUSCH without a UL-SCH (including only a UCI transmission), or P3_Opt e1/e2/e3 may be applied only to the PUSCH including a UL-SCH transmission, and HP CSI part 2 may always be included in and piggybacked to the PUSCH without a UL-SCH.

iii. P3_Case a3: When the size of the LP HARQ-ACK is equal to or less than 2 bits and the size of the HP HARQ-ACK is greater than 2 bits, the UE may operate as follows.

1. First, the HP HARQ-ACK may be mapped (sequentially) to RE(s) in the earliest non-DMRS symbol after the first DMRS symbol of the HP PUSCH.

2. Subsequently, HP CSI part 1 (and/or part 2) and the UL-SCH may be mapped (sequentially), starting from RE(s) in the first non-DMRS symbol of the HP PUSCH (the HP CSI may first be mapped, and then the UL-SCH may be mapped). In this case, none of HP CSI part 1 (and/or part 2) and the UL-SCH may be mapped to the RE(s) already mapped to the HP HARQ-ACK (i.e., all of HP CSI part 1 (and/or part 2) and the UL-SCH may be mapped except for the HP HARQ-ACK REs).

3. For the LP HARQ-ACK, the UE may operate as follows.

P3_Opt f1) The UE may map the LP HARQ-ACK by (sequentially) puncturing the remaining REs (already mapped to the UL-SCH (and/or HP CSI part 2)) except for the HP HARQ-ACK RE(s) in the last OFDM symbol including the HP HARQ-ACK RE(s), and REs (already mapped to the UL-SCH (and/or HP CSI part 2)) in the earliest symbol after the last symbol. In this case, the LP HARQ-ACK may not be mapped to RE(s) mapped to HP CSI part 1 (without puncturing the RE(s)). (i.e., the LP HARQ-ACK may be mapped except for the HP CSI part 1 RE(s)).

ⓐ In another method, The UE may map the LP HARQ-ACK by (sequentially) puncturing the remaining REs (already mapped to the UL-SCH and HP CSI part 1 (and/or HP CSI part 2)) except for the HP HARQ-ACK RE(s) in the last OFDM symbol including the HP HARQ-ACK RE(s), and REs (already mapped to the UL-SCH and HP CSI part 1 (and/or HP CSI part 2)) in the earliest symbol after the last symbol.

P3_Opt f2) The UE may map the LP HARQ-ACK by (sequentially) puncturing REs (already mapped to the UL-SCH (and/or HP CSI part 2) among RE(s) in the earliest symbol including the first non-DMRS symbol on the HP PUSCH. In this case, the LP HARQ-ACK may not be mapped to the HP HARQ-ACK RE(s) and RE(s) mapped to HP CSI part 1 (without puncturing the RE(s)). (i.e., the LP HARQ-ACK may be mapped except for the HP HARQ-ACK RE(s) and the HP CSI part 1 RE(s)).

ⓐ In another method, the UE may map the LP HARQ-ACK by (sequentially) puncturing the REs (already mapped to the UL-SCH and HP CSI part 1 (and/or HP CSI part 2) among the RE(s) in the earliest OFDM symbol including the first non-DMRS symbols on the HP PUSCH. In this case, the LP HARQ-ACK may not be mapped to the HP HARQ-ACK RE(s) (without puncturing the RE(s)). (i.e., the LP HARQ-ACK may be mapped except for the HP HARQ-ACK RE(s)).

4. When the LP UCI (e.g., HARQ-ACK) is piggybacked to the HP PUSCH, the following operation may be performed.

P3_Opt g1) The transmission of HP CSI part 2 may always be dropped. Or

P3_Opt g2) In the absence of the HP HARQ-ACK, HP CSI part 2 may be included and piggybacked. In the presence of the HP HARQ-ACK, the transmission of HP CSI part 2 may be dropped. Or P3_Opt g3) When the size of the HP HARQ-ACK or the size of the LP HARQ-ACK is equal to or less than 2 bits, HP CSI part 2 may be included and piggybacked. When the sizes of both the HP HARQ-ACK and the LP HARQ-ACK are greater than 2 bits, the transmission of HP CSI part 2 may be dropped.

P3_Opt g1/g2/g3 may be applied to both a PUSCH including a UL-SCH transmission and a PUSCH without a UL-SCH (including only a UCI transmission), or P3_Opt g1/g2/g3 may be applied only to the PUSCH including a UL-SCH transmission, and HP CSI part 2 may always be included in and piggybacked to the PUSCH without a UL-SCH.

iv. P3_Case a4: When the size of the LP HARQ-ACK is greater than 2 bits, and the size of the HP HARQ-ACK is greater than 2 bits, the UE may operate as follows.

1. First, the HP HARQ-ACK may be mapped (sequentially) to RE(s) in the earliest non-DMRS symbol after the first DMRS symbol of the HP PUSCH.

2. For the LP HARQ-ACK, the UE may operate as follows.

P3_Opt h1) The LP HARQ-ACK, HP CSI part 1 (and/or part 2), and the $U_L$-SCH may be mapped (sequentially), starting from RE(s) in the first non-DMRS symbol of the HP PUSCH. (In this case, the LP HARQ-ACK may first be mapped, followed by mapping of the HP CSI and then the UL-SCH). In this case, none of the LP HARQ-ACK, HP CSI part 1(and/or part 2), and the UL-SCH may be mapped to the RE(s) already mapped to the HP HARQ-ACK (i.e., all of the UCI/UL-SCH may be mapped to REs except for the HP HARQ-ACK REs).

P3_Opt h2) The UE may map the LP HARQ-ACK (sequentially) to the remaining REs except for the HP HARQ-ACK RE(s) in the last symbol including the HP HARQ-ACK RE(s) and RE(s) in the earliest OFDM symbol after the last symbol. Then, HP CSI part 1 (and/or part 2) and the UL_SCH may be mapped (sequentially), starting from RE(s) in the first non-DMRS symbol of the HP PUSCH (the HP CSI may first be mapped, and then the UL-SCH may be mapped). In this case, none of HP CSI part 1 (and/or part 2) and the $U_L$-SCH may be mapped to the HP HARQ-ACK RE(s) and the LP HARQ-ACK RE(s) (i.e., all of the UCI/UL-SCH may be mapped to REs except for the HP HARQ-ACK RE(s) REs and the LP HARQ-ACK RE(s)).

3. When the LP UCI (e.g., HARQ-ACK) is piggybacked to the HP PUSCH, the following operation may be performed.

P3_Opt i1) The transmission of HP CSI part 2 may always be dropped. Or

P3_Opt i2) In the absence of the HP HARQ-ACK, HP CSI part 2 may be included and piggybacked. In the presence of the HP HARQ-ACK, the transmission of HP CSI part 2 may be dropped. Or P3_Opt i3) When the size of the HP HARQ-ACK or the size of the LP HARQ-ACK is equal to or less than 2 bits, HP CSI part 2 may be included and piggybacked. When the sizes of both the HP HARQ-ACK and the LP HARQ-ACK are greater than 2 bits, the transmission of HP CSI part 2 may be dropped.

P3_Opt i1/i2/i3 may be applied to both a PUSCH including a UL-SCH transmission and a PUSCH without a UL-SCH (including only a UCI transmission), or P3_Opt i1/i2/i3 may be applied only to the PUSCH including a UL-SCH transmission, and HP CSI part 2 may be always included in and piggybacked to the PUSCH without a UL-SCH.

v. In the above example, HP CSI part 1/2 may be replaced with LP CSI part 1/2. Even in this case, the methods applied to HP CSI part 1/2 may be applied in the same/similar manner to LP CSI part 1/2.

vi. The methods of multiplexing UCI on a PUSCH in NR Rel-15/16 (for convenience, referred to as "Rel-15/16 UCI on PUSCH") are summarized in Table 7 below.

2. P3_Case b1: When a combination of UCIs requiring multiplexed transmission on the HP PUSCH is {HP HARQ-ACK, LP HARQ-ACK, HP CSI}, the UE may operate as follows.

ⓐ P3_Case b1-1: When the HP CSI is two-part CSI, the UE may multiplex and transmit HP CSI part 1 and HP CSI part 2 on a PUSCH, while dropping the LP HARQ-ACK transmission.

(i) In this case, the UE may apply the RE number allocation and RE mapping methods corresponding to UCI type 1, UCI type 2, and UCI type 3 in "Rel-15/16 UCI on PUSCH" of Table 7 to the HP HARQ-ACK, HP CSI part 1, and HP CSI part 2, respectively.

(ii) Alternatively, the UE may multiplex and transmit the HP HARQ-ACK, the LP HARQ-ACK, and HP CSI part 1 on the PUSCH, while dropping HP CSI part 2 (P3_Case b1-0).

① P3_Case b1-0, Alt 1) In this case, the UE may apply the RE number allocation and RE mapping methods corresponding to UCI type 1, UCI type 2, and UCI type 3 in

TABLE 7

1. There may be three UCI types, UCI type 1 (e.g., HARQ-ACK), UCI type 2 (e.g., CSI part 1), and UCI type 3 (e.g., CSI part 2), and the UCI may have a higher priority in the order of UCI type 1 > UCI type 2 > UCI type 3.
2. Allocation of the number of REs for each UCI type will be described. Let the total number of REs available for UCI mapping in PUSCH resources be denoted by N.
 ⓐ First for UCI type 1, the number $N_1$ of REs to be mapped to UCI type 1 is calculated based on a UCI payload size and a beta offset '$\beta_{offset}$' (configured/indicated for UCI type 1).
 ⓑ (With N − $N_1$ REs remained) for UCI type 2, the number $N_2$ of REs to be mapped to UCI type 2 is calculated based on a UCI payload size and a beta offset '$\beta_{offset}$' (configured/indicated for UCI type 2).
 ⓒ (With N − $N_1$ − $N_2$ REs remained) for UCI type 3, the number $N_2$ of REs to be mapped to UCI type 3 is calculated based on a UCI payload size and a beta offset '$\beta_{offset}$' (configured/indicated for UCI type 3).
3. Next, an RE mapping method for each UCI type may be different according to the payload size of UCI type 1.
 ⓐ When the payload size of UCI type 1 is equal to or less than 2 bits, the following RE mapping method may be applied.
  (i) The UE (sequentially) reserves RE(s) in the earliest non-DMRS symbol after the first DMRS symbol in PUSCH resources, as a reserved RE set corresponding to 2-bit UCI type 1.
  (ii) Subsequently, UCI type 2 and UCI type 3 (and/or a UL-SCH) may be mapped (sequentially), starting from RE(s) in the first non-DMRS symbol of the PUSCH (UCI type 2 may first be mapped, followed by mapping of UCI type 3 and then the UL-SCH). In this case, UCI type 2 may not be mapped to the (pre-scheduled) reserved RE(s) for UCI type 1 (i.e., UCI type 2 may be mapped except for the reserved RE(s)), and UCI type 3 (and/or the UL-SCH) may also be mapped to the reserved RE(s) for UCI type 1.
  (iii) Thereafter, in the absence of actual UCI type 1 (i.e., when UCI type 1 is 0 bits), an additional UCI RE mapping operation may not be performed. On the contrary, in the presence of actual UCI type 1 (i.e., when UCI type 1 is 1 or 2 bits), UCI type 1 may be mapped to the reserved RE(s) for UCI type 1 (by puncturing UCI type 3 and/or the UL-SCH already mapped) (to all or some of the reserved RE(s)).
 ⓑ When the payload size of UCI type 1 is greater than 2 bits, the following RE mapping method may be applied.
  (i) First, the UE may map UCI type 1 (sequentially) to RE(s) in the earliest non-DMRS symbol after the first DMRS symbol in the PUSCH resources.
  (ii) Next, UCI type 2 and UCI type 3 (and/or the UL-SCH) may be mapped (sequentially), starting from RE(s) in the first non-DMRS symbol of the PUSCH (UCI type 2 may first be mapped, followed by mapping of UCI type 3 and then mapping of the UL-SCH). In this case, none of UCI type 2 and UCI type 3 (and/or the UL-SCH) may be mapped to the RE(s) already mapped to UCI type 1 (i.e., all of UCI type 2 and UCI type 3 (and/or the UL-SCH) may be mapped to the remaining REs except for the RE(s) mapped to UCI type 1).

vii. Note

1. For convenience, a CSI report (e.g., wideband CSI feedback) including only one part having a fixed payload size based on legacy Rel-15/16 (to which single encoding is applied) is referred to as single-part CSI, and a CSI report (e.g., sub-band CSI feedback) including part 1 having a fixed payload size and part 2 having a variable payload size (to which separate encoding is applied on a part basis) is referred to as two-part CSI.

"Rel-15/16 UCI on PUSCH" of Table 7 to the HP HARQ-ACK, the LP HARQ-ACK, and HP CSI part 1, respectively.

② P3_Case b1-0, Alt 2) Alternatively, the UE may apply the RE number allocation and RE mapping methods corresponding to UCI type 1, UCI type 2, and UCI type 3 in "Rel-15/16 UCI on PUSCH" of Table 7 to the HP HARQ-ACK, HP CSI part 1, and the LP HARQ-ACK, and, respectively.

ⓑ P3_Case b1-2: When the HP CSI is single-part CSI, the UE may multiplex and transmit all of the HP HARQ- ACK, the LP HARQ-ACK, and the HP CSI on the PUSCH without dropping any specific UCI transmission.

(i) In this case, Alt 1) the UE may apply the RE number allocation and RE mapping methods corresponding to UCI type 1, UCI type 2, and UCI type 3 in "Rel-15/16 UCI on PUSCH" of Table 7 to the HP HARQ-ACK, the LP HARQ-ACK, and the HP CSI, respectively, or Alt 2) the UE may apply the RE number allocation and RE mapping methods corresponding to UCI type 1, UCI type 2, and UCI type 3 in "Rel-15/16 UCI on PUSCH" of Table 7 to the HP HARQ-ACK, the HP CSI, and the LP HARQ-ACK, respectively.

(ii) Or Alt 3) the UE may multiplex and transmit the HP HARQ-ACK and the HP CSI on the PUSCH, while dropping the LP HARQ-ACK transmission.

① In this case, the UE may apply the RE number allocation and RE mapping methods corresponding to UCI type 1 and UCI type 2 in "Rel-15/16 UCI on PUSCH" of Table 7 to the HP HARQ-ACK and the HP CSI, respectively.

ⓒ The operations of (P3_Case b1-1 and P3_Case b1-2) may be applied, regardless of whether the HP PUSCH is a PUSCH including a UL-SCH transmission or a PUSCH without a UL-SCH transmission.

ⓓ In another method, the UE may apply the operations of (P3_Case b1-1 and P3_Case b1-2) in the case of the HP PUSCH including a UL-SCH transmission, whereas the UE may multiplex and transmit all of the HP HARQ-ACK, the LP HARQ-ACK, and the HP CSI without dropping any specific UCI transmission (regardless of whether the HP CSI is two-part CSI or single-part CSI) (P3_Case b1-3).

(i) When the HP PUSCH does not include a UL-SCH transmission, and the HP CSI is two-part CSI in the above example of P3_Case b1-3, the UE may apply Alt 1) the RE number allocation and RE mapping methods corresponding to UCI type 1, UCI type 2, and UCI type 3 in "Rel-15/16 UCI on PUSCH" of Table 7 and the UL-SCH to the HP HARQ-ACK, the LP HARQ-ACK, HP CSI part 1, and HP CSI part 2, respectively, or (ii) Alt 2) the RE number allocation and RE mapping methods corresponding to UCI type 1, UCI type 2, and UCI type 3 in "Rel-15/16 UCI on PUSCH" of Table 7, and the UL-SCH to the HP HARQ-ACK, HP CSI part 1, HP CSI part 2, and the LP HARQ-ACK, respectively.

① When it is said that the RE number allocation and RE mapping method corresponding to the UL-SCH is applied to HP CSI part 2 in Alt 1 or the LP HARQ-ACK in Alt 2 (for convenience, it is defined as "UCI type 4"), this may imply that the numbers of REs $N_1$, $N_2$, and $N_3$ are first allocated to UCI type 1, UCI type 2, and UCI type 3, the remaining $N-N_1-N_2-N_3$ REs are allocated to UCI type 4, and RE(s) corresponding to UCI type 4 is allocated after REs corresponding to UCI type 1, UCI type 2, and UCI type 3 are first mapped.

(ii) When the HP PUSCH does not include a UL-SCH transmission, and the HP CSI is single-part CSI in the above example, the UE may apply Alt 1s) the RE number allocation and RE mapping methods corresponding to UCI type 1, UCI type 2, and UCI type 3 in "Rel-15/16 UCI on PUSCH" of Table 7 to the HP HARQ-ACK, the LP HARQ-ACK, and the HP CSI, respectively, or Alt 2s) the RE number allocation and RE mapping methods corresponding to UCI type 1, UCI type 2, and UCI type 3 in "Rel-15/16 UCI on PUSCH" of Table 7 to the HP HARQ-ACK, the HP CSI, and the LP HARQ-ACK, respectively.

ⓔ When a combination of UCIs requiring multiplexed transmission on the HP PUSCH is {HP HARQ-ACK, LP HARQ-ACK}, the UE may multiplex/transmit the UCI combination on the HP PUSCH by applying the remaining operations except for the HP CSI-related operation in the ⓐ/ⓑ/ⓒ/ⓓ.

3. P3_Case b2: When a combination of UCIs requiring multiplexed transmission on the HP PUSCH is {HP HARQ-ACK, HP CSI}, the UE may operate as follows.

ⓐ The UE may multiplex and transmit both the LP HARQ-ACK and the HP CSI on the PUSCH, regardless of whether the HP CSI is two-part CSI or single-part CSI.

(i) When the HP CSI is two-part CSI in the above example, Alt 1) the UE may apply the RE number allocation and RE mapping methods corresponding to UCI type 1, UCI type 2, and UCI type 3 in "Rel-15/16 UCI on PUSCH" of Table 7 to the LP HARQ-ACK, HP CSI part 1, and HP CSI part 2, respectively, or Alt 2) the UE may apply the RE number allocation and RE mapping methods corresponding to UCI type 1, UCI type 2, and UCI type 3 in "Rel-15/16 UCI on PUSCH" of Table 7 to HP CSI part 1, HP CSI part 2, and the LP HARQ-ACK, respectively, Alternatively in this case, the UE may (sequentially) reserve RE(s) in the earliest non-DMRS symbol after the first DMRS symbol in HP PUSCH resources as a reserved RE set corresponding to a 2-bit HP HARQ-ACK, in spite of the absence of an HP HARQ-ACK to be actually transmitted (in this case, the number of the reserved REs is determined based on a beta offset '$\beta_{offset}$' configured for an HP HARQ-ACK transmission on the HP PUSCH). In this state, Alt 1) the UE may apply the RE number allocation and RE mapping methods corresponding to UCI type 2 and UCI type 3 in "Rel-15/16 UCI on PUSCH" of Table 7 and the afore-described RE number allocation and RE mapping method corresponding to UCI type 4 to the LP HARQ-ACK, HP CSI part 1, and HP CSI part 2, respectively, or Alt 2) the UE may apply the RE number allocation and RE mapping methods corresponding to UCI type 2 and UCI type 3 in "Rel-15/16 UCI on PUSCH" of Table 7 and the afore-described RE number allocation and RE mapping method corresponding to UCI type 4 to HP CSI part 1, HP CSI part 2, and the LP HARQ-ACK, respectively.

(ii) When the HP CSI is single-part CSI in the above example, Alt 1s) the UE may apply the RE number allocation and RE mapping methods corresponding to UCI type 1 and UCI type 2 in "Rel-15/16 UCI on PUSCH" of Table 7 to the LP HARQ-ACK and the HP CSI, respectively, or Alt 2s) the UE may apply the RE number allocation and RE mapping methods corresponding to UCI type 1 and UCI type 2 in "Rel-15/16 UCI on PUSCH" of Table 7 to the HP CSI and the LP HARQ-ACK, respectively.

Alternatively, even in this case, the UE may (sequentially) reserve RE(s) in the earliest non-DMRS symbol after the first DMRS symbol in HP PUSCH resources as a reserved RE set corresponding to a 2-bit HP HARQ-ACK, in spite of the absence of an HP HARQ-ACK to be actually transmitted (in this case, the number of the reserved REs is determined based on a beta offset '$\beta_{offset}$' configured for an HP HARQ-ACK transmission on an HP PUSCH). In this state, Alt 1) the UE may apply the RE number allocation and RE mapping methods corresponding to UCI type 2 and UCI type 3 in "Rel-15/16 UCI on PUSCH" of Table 7 to the LP HARQ-ACK and the HP CSI, respectively, or Alt 2) the UE may apply the RE number allocation and RE mapping methods corresponding to UCI type 2 and UCI type 3 in "Rel-15/16 UCI on PUSCH" of Table to the HP CSI and the LP HARQ-ACK, respectively.

ⓑ When UCI requiring multiplexed transmission on the HP PUSCH is only {LP HARQ-ACK}, the UE may multiplex/transmit the UCI on the HP PUSCH by applying the remaining operations except for the HP CSI-related operation in ⓐ.

4. In a situation in which four UCIs are separately encoded and multiplexed on the HP PUSCH (not including a UL-SCH transmission), when the same encoding scheme (e.g., an RM code or a polar code) is to be used for all of the four UCIs, the UE may drop encoding/transmission of a specific UCI with the lowest protection priority (e.g., HP CSI part 2 or the LP HARQ-ACK in the above description) among the four UCIs in order to reduce operation/implementation complexity. Or equivalently, in a situation in which the four UCIs are separately encoded and multiplexed on the HP PUSCH (not including a UL-SCH transmission), when the payload sizes of all of the four UCIs are in the same range (e.g., all (equal to or larger than 3 bits and) equal to or less than 11 bits or equal to or larger than 12 bits), the UE may drop encoding/transmission of a specific UCI with the lowest protection priority (e.g., HP CSI part 2 or the LP HARQ-ACK in the above description) among the four UCIs in order to reduce operation/implementation complexity.

Table 8 summarizes at least some of examples related to P3_Case b.

C. The UE may separately encode the HP UCI (e.g., HARQ-ACK), or the HP UCI and LP UCI (e.g., HARQ-ACK and/or CSI) and map/transmit the encoded UCI on the same single LP PUSCH.

i. P3_Case c1: When the size of the HP HARQ-ACK is equal to or less than a specific size (2 bits) and the size of the LP HARQ-ACK is 0 bits (or equal to or less than the specific size (e.g., 2 bits)), the UE may operate as follows.

1. First, RE(s) in the earliest non-DMRS symbol after the first DMRS symbol on the LP PUSCH may be (sequentially) reserved as a reserved RE set corresponding to an LP HARQ-ACK of a specific size (e.g., 2 bits). The reason for reserving the reserved RE set in spite of an actual LP HARQ-ACK being 0 bit from the perspective of the UE is to prevent HARQ-ACK payload mismatch between the UE and the BS, in case where the BS transmits DL DCI indicating LP and the UE fails in detecting the DCI.

2. Subsequently, LP CSI part 1 (and/or part 2) and a UL-SCH may be mapped (sequentially), starting from RE(s) in the first non-DMRS symbol of the LP PUSCH (the LP CSI may first be mapped, and then the UL-SCH may be mapped). In this case, LP CSI part 1 may not be mapped to the (pre-scheduled) reserved LP HARQ-ACK RE(s) (i.e.,

TABLE 8

|  |  | HP UCI |  | LP UCI |  |
| --- | --- | --- | --- | --- | --- |
| Note | PUSCH | Contents | UCI type (Priority) | Contents | UCI type (Priority) |
| P3_Case b1-1 | HP PUSCH with/without UL-SCH | HARQ-ACK CSI Part 1 CSI Part 2 | 1 2 3 | HARQ-ACK | (drop) |
| P3_Case b1-0 Alt 1) | HP PUSCH with/without UL-SCH | HARQ-ACK CSI Part 1 CSI Part 2 | 1 3 (drop) | HARQ-ACK | 2 |
| P3_Case b1-0 Alt 2 | HP PUSCH with/without UL-SCH | HARQ-ACK CSI Part 1 CSI Part 2 | 1 2 (drop) | HARQ-ACK | 3 |
| P3_Case b1-2 Alt 1) | HP PUSCH with/without UL-SCH | HARQ-ACK Single Part CSI | 1 3 | HARQ-ACK | 2 |
| P3_Case b1-2 Alt 2) | HP PUSCH with/without UL-SCH | HARQ-ACK Single Part CSI | 1 2 | HARQ-ACK | 3 |
| P3_Case b1-2 Alt 2) | HP PUSCH with/without UL-SCH | HARQ-ACK Single Part CSI | 1 2 | HARQ-ACK | (drop) |
| P3_Case b1-3 Alt 1) | HP PUSCH without UL-SCH | HARQ-ACK CSI Part 1 CSI Part 2 | 1 3 4 | HARQ-ACK | 2 |
| P3_Case b1-3 Alt 2) | HP PUSCH without UL-SCH | HARQ-ACK CSI Part 1 CSI Part 2 | 1 2 3 | HARQ-ACK | 4 |
| P3_Case b1-3 Alt 1s) | HP PUSCH without UL-SCH | HARQ-ACK Single Part CSI | 1 3 | HARQ-ACK | 2 |
| P3_Case b1-3 Alt 2s) | HP PUSCH without UL-SCH | HARQ-ACK Single Part CSI | 1 2 | HARQ-ACK | 3 |
| P3_Case b2 Alt 1) | HP PUSCH with/without UL-SCH | CSI Part 1 CSI Part 2 | 2 3 | HARQ-ACK | 1 |
| P3_Case b2 Alt 2) | HP PUSCH with/without UL-SCH | CSI Part 1 CSI Part 2 | 1 2 | HARQ-ACK | 3 |
| P3_Case b2 Alt 1s) | HP PUSCH with/without UL-SCH | Single Part CSI | 2 | HARQ-ACK | 1 |
| P3_Case b2 Alt 2s) | HP PUSCH with/without UL-SCH | Single Part CSI | 1 | HARQ-ACK | 2 | mapped except for the reserved REs), whereas the UL-SCH (and/or LP CSI part 2) may also be mapped to the reserved LP HARQ-ACK RE(s).

(a) In another method, LP CSI part 1 (and/or part 2) and the UL-SCH may be mapped (sequentially), starting from RE(s) in the first non-DMRS symbol of the LP PUSCH (the LP CSI may be mapped first, and then the UL-SCH may be mapped). In this case, the UL-SCH and LP CSI part 1 (and/or LP CSI part 2) may also be mapped to the reserved LP HARQ-ACK RE(s).

3. For the HP HARQ-ACK, the UE may operate as follows.

P3_Opt j1) The UE may map the HP HARQ-ACK by (sequentially) puncturing the remaining REs (already mapped to the UL-SCH (and/or LP CSI part 2)) except for the reserved REs in the last symbol including the reserved LP HARQ-ACK RE(s), and RE(s) (already mapped to the UL-SCH (and/or LP CSI part2)) in the earliest symbol after the last symbol. In this case, the HP HARQ-ACK may not be mapped to RE(s) mapped to LP CSI part 1 (without puncturing the RE(s)). (i.e., the HP HARQ-ACK may be mapped except for the LP CSI part 1 RE(s)).

(a) In another method, the UE may map the HP HARQ-ACK by (sequentially) puncturing the remaining REs (already mapped to the UL-SCH (and/or LP CSI part 2)) except for the reserved REs in the last symbol including the reserved LP HARQ-ACK RE(s) and RE(s) (already mapped to the UL-SCH and LP CSI part (and/or LP CSI part2)) in the earliest symbol after the last symbol.

P3_Opt j2) The UE may map the HP HARQ-ACK by (sequentially) puncturing RE(s) already mapped to the UL-SCH (and/or LP CSI part2) among RE(s) in the earliest symbol including the first non-DMRS symbol of the LP PUSCH. In this case, the HP HARQ-ACK may not be mapped to the reserved LP HARQ-ACK RE(s) and RE(s) mapped to LP CSI part 1 (without puncturing the RE(s)). (i.e., the HP HARQ-ACK may be mapped except for the reserved LP HARQ-ACK RE(s) and the LP CSI part 1 RE(s)).

(a) In another method, the UE may map the HP HARQ-ACK by (sequentially) puncturing RE(s) already mapped to the UL-SCH and LP CSI part 1 (and/or LP CSI part 2) among RE(s) in the earliest symbol including the first non-DMRS symbol of the LP PUSCH. In this case, the HP HARQ-ACK may not be mapped to the reserved LP HARQ-ACK RE(s) (without puncturing the RE(s)). (i.e., the HP HARQ-ACK may be mapped except for the reserved RE(s)).

4. Then, when an actual LP HARQ-ACK (0 bits) does not exist, an additional UCI RE mapping operation may not be performed. On the contrary, when the actual LP HARQ-ACK (2 or fewer bits) exists, the LP HARQ-ACK may be mapped to the reserved LP HARQ-ACK RE(s) (by puncturing the UL-SCH (and/or LP CSI part 2) or the UL-SCH and LP CSI part 1 (and/or LP CSI part 2) already mapped to reserved LP HARQ-ACK RE(s)).

5. When the HP UCI (e.g., HARQ-ACK) is piggybacked to the LP PUSCH, the following operation may be performed.

P3_Opt k1) The transmission of LP CSI part 2 may always be dropped. Or

P3_Opt k2) In the absence of the LP HARQ-ACK, LP CSI part 2 may be included and piggybacked. In the presence of the LP HARQ-ACK, the transmission of LP CSI part 2 may be dropped. Or P3_Opt k3) When the size of the LP HARQ-ACK or the size of the HP HARQ-ACK is equal to less than a specific size (e.g., 2 bits), LP CSI part 2 may be included and piggybacked. When the sizes of both the LP HARQ-ACK and the HP HARQ-ACK are greater than the specific size (e.g., 2 bits), the transmission of LP CSI part 2 may be dropped.

P3_Opt k1/k2/k3 may be applied to both a PUSCH including a UL-SCH transmission and a PUSCH without a UL-SCH (including only a UCI transmission), or P3_Opt k1/k2/k3 may be applied only to the PUSCH including a UL-SCH transmission, and LP CSI part 2 may be always included in and piggybacked to the PUSCH without a UL-SCH.

i. P3_Case c2: When the HP HARQ-ACK is greater than the specific size (e.g., 2 bits), and the LP HARQ-ACK is 0 bits (or 2 bits or less), the UE may operate as follows.

1. First, RE(s) in the earliest non-DMRS symbol after the first DMRS symbol of the LP PUSCH may be (sequentially) reserved as a reserved RE set corresponding to an LP HARQ-ACK of a specific size (e.g., 2 bits). The reason for reserving the reserved RE set in spite of an actual LP HARQ-ACK being 0 bits from the perspective of the UE is to prevent HARQ-ACK payload mismatch between the UE and the BS, in case where the BS transmits DL DCI indicating LP and the UE fails in detecting the DCI.

2. For the HP HARQ-ACK, the UE may operate as follows.

P3_Opt m1) The HP HARQ-ACK, LP CSI part 1 (and/or part 2), and the $U_L$-SCH may be mapped (sequentially), starting from RE(s) in the first non-DMRS symbol of the LP PUSCH. (In this case, the HP HARQ-ACK may first be mapped, followed by mapping of the LP CSI and then mapping of the UL-SCH). In this case, the HP HARQ-ACK and LP CSI part 1 may not be mapped to the (pre-scheduled) reserved LP HARQ-ACK RE(s) (i.e., mapped except for the reserved REs), while the UL-SCH (and/or LP CSI part 2) may also be mapped to the reserved LP HARQ-ACK RE(s).

(a) In another method, the HP HARQ-ACK, LP CSI part 1 (and/or part 2), and the UL-SCH may be mapped (sequentially), starting from RE(s) in the first non-DMRS symbol of the LP PUSCH. (In this case, the HP HARQ-ACK may first be mapped, followed by mapping of the LP CSI and then mapping of the UL-SCH). In this case, the HP HARQ-ACK may not be mapped to the (pre-scheduled) reserved LP HARQ-ACK RE(s) (i.e., mapped except for the reserved REs), whereas the UL-SCH and LP CSI part 1 (and/or LP CSI part 2) may also be mapped to the reserved LP HARQ-ACK RE(s).

P3_Opt m2) The UE may map the HP HARQ-ACK (sequentially) to the remaining REs except for the reserved REs in the last symbol including the reserved LP HARQ-ACK RE(s) and RE(s) in the earliest symbol after the last symbol. Then, LP CSI part 1 (and/or part 2) and the UL-SCH may be mapped (sequentially), starting from RE(s) in the first non-DMRS symbol of the LP PUSCH (e.g., the LP CSI may first be mapped, and then the UL-SCH may be mapped). In this case, LP CSI part 1 may not be mapped to the reserved LP HARQ-ACK RE(s) and the RE(s) to which the HP HARQ-ACK is mapped (i.e., mapped except for the reserved REs and the HP HARQ-ACK RE(s)), whereas the UL-SCH (and/or LP CSI part 2) may be mapped to the reserved LP HARQ-ACK RE(s), not to the HP HARQ-ACK RE(s).

(a) In another method, the UE may map the HP HARQ-ACK (sequentially) to the remaining REs except for the reserved REs in the last symbol including the reserved LP HARQ-ACK RE(s) and RE(s) in the earliest OFDM symbol after the last symbol. Then, LP CSI part 1 (and/or part 2) and the UL-SCH may be mapped (sequentially), starting from RE(s) in the first non-DMRS symbol of the LP PUSCH (the LP CSI may first be mapped, and then the UL-SCH may be mapped). In this case, the UL-SCH and LP CSI part 1 (and/or LP CSI part 2) may be mapped to the reserved LP HARQ-ACK RE(s), not to the HP HARQ-ACK RE(s).

3. Then, when an actual LP HARQ-ACK (0 bits) does not exist, an additional UCI RE mapping operation may not be performed. On the contrary, when the actual LP HARQ-ACK (equal to or less than a specific size (e.g., 2 bits)) exists, the LP HARQ-ACK may be mapped to the reserved LP HARQ-ACK RE(s) (by puncturing the UL-SCH (and/or LP CSI part 2) or LP CSI part 1 (and/or LP CSI part 2) already mapped to the reserved LP HARQ-ACK RE(s)).

4. When the HP UCI (e.g., HARQ-ACK) is piggybacked to the LP PUSCH, the following operation may be performed.

P3_Opt n1) The transmission of LP CSI part 2 may always be dropped. Or

P3_Opt n2) In the absence of the LP HARQ-ACK, LP CSI part 2 may be included and piggybacked. In the presence of the LP HARQ-ACK, the transmission of LP CSI part 2 may be dropped. Or P3_Opt n3) When the LP HARQ-ACK or the HP HARQ-ACK is equal to less than a specific size (e.g., 2 bits), LP CSI part 2 may be included and piggybacked. When both the LP HARQ-ACK and the HP HARQ-ACK are greater than the specific size (e.g., 2 bits), the transmission of LP CSI part 2 may be dropped.

P3_Opt n1/n2/n3 may be applied to both a PUSCH including a UL-SCH transmission and a PUSCH without a UL-SCH (including only a UCI transmission), or P3_Opt n1/n2/n3 may be applied only to the PUSCH including a UL-SCH transmission, and LP CSI part 2 may be always included in and piggybacked to the PUSCH without a UL-SCH.

iii. P3_Case c3: When the LP HARQ-ACK is equal to or less than a specific size (e.g., 2 bits), and the HP HARQ-ACK is greater than a specific size (e.g., 2 bits), the UE may operate as follows.

1. First, the LP HARQ-ACK may be mapped (sequentially) to RE(s) in the earliest non-DMRS symbol after the first DMRS symbol of the LP PUSCH.

2. Subsequently, LP CSI part 1 (and/or part 2) and the UL-SCH may be mapped (sequentially), starting from RE(s) in the first non-DMRS symbol of the LP PUSCH (the LP CSI may first be mapped, and then the UL-SCH may be mapped). In this case, none of LP CSI part 1 (and/or part 2) and the UL-SCH may be mapped to the RE(s) already mapped to the LP HARQ-ACK (i.e., all of LP CSI part 1 (and/or part 2) and the UL-SCH may be mapped except for the LP HARQ-ACK REs).

3. For the HP HARQ-ACK, the UE may operate as follows.

P3_Opt g1) The UE may map the HP HARQ-ACK by (sequentially) puncturing the remaining REs (already mapped to the UL-SCH (and/or LP CSI part 2)) except for the LP HARQ-ACK RE(s) in the last OFDM symbol including the LP HARQ-ACK RE(s), and RE(s) (already mapped to the UL-SCH (and/or LP CSI part 2)) in the earliest symbol after the last symbol. In this case, the HP HARQ-ACK may not be mapped to RE(s) mapped to LP CSI part 1 (without puncturing the RE(s)). (i.e., the HP HARQ-ACK may be mapped except for the LP CSI part 1 RE(s)).

â In another method, the UE may map the HP HARQ-ACK by (sequentially) puncturing the remaining REs (already mapped to the UL-SCH and LP CSI part 1 (and/or LP CSI part 2)) except for the LP HARQ-ACK RE(s) in the last OFDM symbol including the LP HARQ-ACK RE(s), and RE(s) (already mapped to the UL-SCH and LP CSI part 1 (and/or LP CSI part 2)) in the earliest symbol after the last symbol.

b̂ In another method, the HP HARQ-ACK may be mapped by (sequentially) puncturing RE(s) (already mapped to the UL-SCH, the LP HARQ-ACK, and LP CSI part 1 (and/or LP CSI part 2)) in the earliest symbol, including the first symbol including the LP HARQ-ACK RE(s).

P3_Opt q2) The UE may map the HP HARQ-ACK by (sequentially) puncturing REs (already mapped to the UL-SCH (and/or LP CSI part 2) among RE(s) in the earliest symbol, including the first non-DMRS symbol of the LP PUSCH. In this case, the HP HARQ-ACK may not be mapped to the LP HARQ-ACK RE(s) and RE(s) mapped to LP CSI part 1 (without puncturing the RE(s)) (i.e., the HP HARQ-ACK may be mapped except for the LP HARQ-ACK RE(s) and the LP CSI part 1 RE(s)).

â In another method, the UE may map the HP HARQ-ACK by (sequentially) puncturing REs (already mapped to the UL-SCH and LP CSI part (and/or LP CSI part 2) among RE(s) in the earliest symbol, including the first non-DMRS symbol of the LP PUSCH. In this case, the HP HARQ-ACK may not be mapped to the LP HARQ-ACK RE(s) (without puncturing the RE(s)) (i.e., the HP HARQ-ACK may be mapped except for the LP HARQ-ACK RE(s)).

b̂ In another method, the HP HARQ-ACK may be mapped by (sequentially) puncturing RE(s) (already mapped to the UL-SCH, the LP HARQ-ACK, and LP CSI part 1 (and/or LP CSI part 2)) in the earliest symbol, including the first non-DMRS of the LP PUSCH.

4. When the HP UCI (e.g., HARQ-ACK) is piggybacked to the LP PUSCH, the following operation may be performed.

P3_Opt r1) The transmission of LP CSI part 2 may always be dropped. Or

P3_Opt r2) In the absence of the LP HARQ-ACK, LP CSI part 2 may be included and piggybacked. In the presence of the LP HARQ-ACK, the transmission of LP CSI part 2 may be dropped. Or P3_Opt r3) When the LP HARQ-ACK or the HP HARQ-ACK is equal to less than a specific size (e.g., 2 bits), LP CSI part 2 may be included and piggybacked. When both the LP HARQ-ACK and the HP HARQ-ACK are greater than the specific size (e.g., 2 bits), the transmission of LP CSI part 2 may be dropped.

P3_Opt r1/r2/r3 may be applied to both a PUSCH including a UL-SCH transmission and a PUSCH without a UL-SCH (including only a UCI transmission), or P3_Opt r1/r2/r3 may be applied only to the PUSCH including a UL-SCH transmission, and LP CSI part 2 may be always included in and piggybacked to the PUSCH without a UL-SCH.

iv. P3_Case c4: When the HP HARQ-ACK is greater than the specific size (e.g., 2 bits) and the LP HARQ-ACK is greater than the specific size (e.g., 2 bits), the UE may operate as follows.

1. First, the LP HARQ-ACK may be mapped (sequentially) to RE(s) in the earliest non-DMRS symbol after the first DMRS symbol of the LP PUSCH.

2. For the HP HARQ-ACK, the UE may operate as follows.
- P3_Opt s1) The HP HARQ-ACK, LP CSI part 1 (and/or part 2), the UL-SCH may be mapped (sequentially), starting from RE(s) in the first non-DMRS symbol of the LP PUSCH (the HP HARQ-ACK may first be mapped, followed by mapping of the LP CSI and then mapping of the UL-SCH). In this case, none of the HP HARQ-ACK, LP CSI part 1(and/or part 2), and the UL-SCH may be mapped to the RE(s) already mapped to the LP HARQ-ACK (i.e., all of the UCI/UL-SCH may be mapped to REs except for the LP HARQ-ACK REs).
- P3_Opt s2) The UE may map the HP HARQ-ACK (sequentially) to the remaining REs except for the LP HARQ-ACK RE(s) in the last symbol including the LP HARQ-ACK RE(s) and RE(s) in the earliest symbol after the last symbol. Then, LP CSI part 1 (and/or part 2) and the UL-SCH may be mapped (sequentially), starting from RE(s) in the first non-DMRS symbol of the LP PUSCH (e.g., the LP CSI may first be mapped, and then the UL-SCH may be mapped). In this case, none of LP CSI part 1 (and/or part 2) and the $U_L$-SCH may be mapped to the LP HARQ-ACK RE(s) and the HP HARQ-ACK RE(s) (i.e., all of the UCI/UL-SCH may be mapped to REs except for the LP HARQ-ACK RE(s) REs and the HP HARQ-ACK RE(s)).

3. In another method, the UE may exchange the mapping positions and mapping orders between the HARQ-ACK and the HP HARQ-ACK.
- â For example, the UE may map the HP HARQ-ACK (sequentially) to RE(s) in the earliest non-DMRS symbol after the first DMRS symbol of the LP PUSCH.
- b̂ For example, for the LP HARQ-ACK, the UE may operate as follows.
  - P3_Opt t1) The LP HARQ-ACK, LP CSI part 1 (and/or part 2), and the UL-SCH may be mapped (sequentially), starting from RE(s) in the first non-DMRS symbol of the LP PUSCH. (The LP HARQ-ACK may first be mapped, followed by mapping of the LP CSI and then mapping of the UL-SCH).
  - P3_Opt t2) The UE may map the LP HARQ-ACK (sequentially) to the remaining REs except for the HP HARQ-ACK RE(s) in the last symbol including the HP HARQ-ACK RE(s), and RE(s) in the earliest symbol after the last symbol. Then, LP CSI part 1 (and/or part 2) and the UL-SCH may be mapped (sequentially), starting from RE(s) in the first non-DMRS symbol of the LP PUSCH (the LP CSI may first be mapped, and then the UL-SCH may be mapped).

4. When the HP UCI (e.g., HARQ-ACK) is piggybacked to the LP PUSCH, the following operation may be performed.
- P3_Opt x1) The transmission of LP CSI part 2 may always be dropped. Or
- P3_Opt x2) In the absence of the LP HARQ-ACK, LP CSI part 2 may be included and piggybacked. In the presence of the LP HARQ-ACK, the transmission of LP CSI part 2 may be dropped. Or
- P3_Opt x3) When the LP HARQ-ACK or the HP HARQ-ACK is equal to less than a specific size (e.g., 2 bits), LP CSI part 2 may be included and piggybacked. When both the LP HARQ-ACK and the HP HARQ-ACK are greater than the specific size (e.g., 2 bits), the transmission of LP CSI part 2 may be dropped.

P3_Opt x1/x2/x3 may be applied to both a PUSCH including a UL-SCH transmission and a PUSCH without a UL-SCH (including only a UCI transmission), or P3_Opt x1/x2/x3 may be applied only to the PUSCH including a UL-SCH transmission, and LP CSI part 2 may be always included in and piggybacked to the PUSCH without a UL-SCH.

v. In the above example, LP CSI part 1/2 may be replaced with HP CSI part 1/2. Even in this case, the methods applied to LP CSI part 1/2 may be applied in the same/similar manner to HP CSI part 1/2.

vi. Note
1. For convenience, a CSI report (e.g., a wideband CSI feedback) (to which single encoding is applied) including only one part of a fixed payload size in legacy Rel-15/16 is referred to as single-part CSI, and a CSI report (e.g., a sub-band CSI feedback) including part 1 of a fixed payload size and part 2 of a variable payload size (the parts are separately encoded) is referred to as two-part CSI.

2. P3_Case d1: When a combination of UCIs requiring multiplexed transmission on the LP PUSCH is {HP HARQ-ACK, LP HARQ-ACK, LP CSI}, the UE may operate as follows.
- â P3_Case d1-1: When the LP CSI is two-part CSI, the UE may multiplex and transmit the HP HARQ-ACK, the LP HARQ-ACK, and LP CSI part 1 on the PUSCH, while dropping the LP CSI part 2 transmission.
  - (i) In this case, the UE may apply the RE number allocation and RE mapping methods corresponding to UCI type 1, UCI type 2, and UCI type 3 in "Rel-15/16 UCI on PUSCH" of Table 7 to the HP HARQ-ACK, the LP HARQ-ACK, and LP CSI part 1, respectively.
- b̂ P3_Case d1-2: When the LP CSI is single-part CSI, the UE may multiplex and transmit all of the HP HARQ-ACK, the LP HARQ-ACK, and the LP CSI on the PUSCH without dropping any specific UCI transmission.
  - (i) In this case, the UE may apply the RE number allocation and RE mapping methods corresponding to UCI type 1, UCI type 2, and UCI type 3 in "Rel-15/16 UCI on PUSCH" of Table 7 to the HP HARQ-ACK, the LP HARQ-ACK, and the LP CSI, respectively.
- ⓒ The operations of (P3_Case d1-1 and P3_Case d1-2) may be applied regardless of whether the LP PUSCH is a PUSCH including a UL-SCH transmission or a PUSCH without a UL-SCH transmission.
- d̂ In another method, the UE may apply the operations of (P3_Case d1-1 and P3_Case d1-2) in the case of an LP PUSCH including a UL-SCH transmission, whereas the UE may multiplex and transmit all of the HP HARQ-ACK, the LP HARQ-ACK, and the LP CSI without dropping any specific UCI transmission (regardless of whether the LP CSI is two-part CSI or single-part CSI), in the case of an LP PUSCH without a UL-SCH transmission.
  - (i) When the LP PUSCH does not include a UL-SCH transmission, and the LP CSI is two-part CSI in the above example, the UE may apply the RE number allocation and RE mapping methods corresponding to UCI type 1, UCI type 2, UCI type 3 in "Rel-15/16 UCI on PUSCH" of Table 7 and the UL-SCH to the HP HARQ-ACK, the LP HARQ-ACK, LP CSI part 1, and LP CSI part 2, respectively (P3_Case d1-1t).
    - ① When it is said that the RE number allocation and RE mapping method corresponding to the UL-SCH is applied to LP CSI part 2 in the above example, this may imply that the numbers of REs $N_1$, $N_2$, and $N_3$ are first allocated to UCI type 1, UCI type 2, and UCI type 3, the remaining $N-N_1-N_2-N_3$ REs are allocated to UCI type 4, and RE(s) corresponding to UCI type 4 is allocated after REs corresponding to UCI type 1, UCI type 2, and UCI type 3 are first mapped.

(ii) When the LP PUSCH does not include a UL-SCH transmission, and the LP CSI is single-part CSI in the above example, the UE may apply the RE number allocation and RE mapping methods corresponding to UCI type 1, UCI type 2, and UCI type 3 in "Rel-15/16 UCI on PUSCH" of Table 7 to the HP HARQ-ACK, the LP HARQ-ACK, and the LP CSI, respectively, ê When a combination of UCIs requiring multiplexed transmission on the LP PUSCH is {HP HARQ-ACK, LP HARQ-ACK}, the UE may multiplex/transmit the UCI combination on the LP PUSCH by applying the remaining operations except for the HP CSI-related operation in the ⓐ/ⓑ/ⓒ/ⓓ. 3. P3_Case d2: When a combination of UCIs requiring multiplexed transmission on the LP PUSCH is {HP HARQ-ACK, HP CSI}, the UE may operate as follows.

â The UE may multiplex and transmit both the LP HARQ-ACK and the LP CSI on the PUSCH, regardless of whether the LP CSI is two-part CSI or single-part CSI.

(i) When the LP CSI is two-part CSI in the above example, the UE may apply the RE number allocation and RE mapping methods corresponding to UCI type 1, UCI type 2, and UCI type 3 in "Rel-15/16 UCI on PUSCH" of Table 7 to the HP HARQ-ACK, LP CSI part 1, and LP CSI part 2, respectively, (ii) When the LP CSI is single-part CSI in the above example, the UE may apply the RE number allocation and RE mapping methods corresponding to UCI type 1 and UCI type 2 in "Rel-15/16 UCI on PUSCH" of Table 7 to the HP HARQ-ACK and the LP CSI, respectively (P3_Case d2-1s).

ḃ When UCI requiring multiplexed transmission on the LP PUSCH is only {HP

HARQ-ACK}, the UE may multiplex/transmit the UCI on the LP PUSCH by applying the remaining operations except for the LP CSI-related operation in ⓐ.

4. P3_Case d3: When a combination of UCIs requiring multiplexed transmission on an LP PUSCH is {LP HARQ-ACK, LP CSI}, the UE may operate as follows.

â The UE may multiplex and transmit both the LP HARQ-ACK and the LP CSI on the PUSCH, regardless of whether the LP CSI is two-part CSI or single-part CSI.

(i) When the LP CSI is two-part CSI in the above example, the UE may apply the RE number allocation and RE mapping methods corresponding to UCI type 1, UCI type 2, and UCI type 3 in "Rel-15/16 UCI on PUSCH" of Table 7 to the LP HARQ-ACK, LP CSI part 1, and LP CSI part 2, respectively, Alternatively in this case, (when an operation of multiplexing and transmitting HP UCI and LP UCI on the same one (LP) PUSCH is configured) the UE may (sequentially) reserve RE(s) in the earliest non-DMRS symbol after the first DMRS symbol in LP PUSCH resources as a reserved RE set corresponding to a 2-bit HP HARQ-ACK, in spite of the absence of an HP HARQ-ACK to be actually transmitted (in this case, the number of the reserved REs is determined based on a beta offset '$\beta_{offset}$' configured for an HP HARQ-ACK transmission on the LP PUSCH). In this state, the UE may apply the RE number allocation and RE mapping methods corresponding to UCI type 2 and UCI type 3 in "Rel-15/16 UCI on PUSCH" of Table 7 and the aforedescribed RE number allocation and RE mapping method corresponding to UCI type 4 to the LP HARQ-ACK, LP CSI part 1, and LP CSI part 2, respectively.

(ii) When the LP CSI is single-part CSI in the above example, the UE may apply the RE number allocation and RE mapping methods corresponding to UCI type 1 and UCI type 2 in "Rel-15/16 UCI on PUSCH" of Table 7 to the HP HARQ-ACK and the LP CSI, respectively (P3_Case d2-1s).

Alternatively in this case, (when an operation of multiplexing and transmitting HP UCI and LP UCI on the same one (LP) PUSCH is configured) the UE may (sequentially) reserve RE(s) in the earliest non-DMRS symbol after the first DMRS symbol in LP PUSCH resources as a reserved RE set corresponding to a 2-bit HP HARQ-ACK, in spite of the absence of an HP HARQ-ACK to be actually transmitted (in this case, the number of the reserved REs is determined based on a beta offset '$\beta_{offset}$' configured for an HP HARQ-ACK transmission on the LP PUSCH). In this state, the UE may apply the RE number allocation and RE mapping methods corresponding to UCI type 2 and UCI type 3 in "Rel-15/16 UCI on PUSCH" of Table 7 to the LP HARQ-ACK and the LP CSI, respectively.

ḃ When UCI requiring multiplexed transmission on the LP PUSCH is only {LP HARQ-ACK}, the UE may multiplex/transmit the UCI on the LP PUSCH by applying the remaining operations except for the LP CSI-related operation in ⓐ. Further, when UCI requiring multiplexed transmission on the HP PUSCH is only {LP CSI}, the UE may multiplex/transmit the UCI on the LP PUSCH by applying the remaining operations except for the LP HARQ-ACK-related operation in ⓐ.

5. In a situation in which four UCIs are separately encoded and multiplexed on the LP PUSCH (not including a UL-SCH transmission), when the same encoding scheme (e.g., an RM code or a polar code) is to be used for all of the four UCIs, the UE may drop encoding/transmission of a specific UCI with the lowest protection priority (e.g., LP CSI part 2 in the above description) among the four UCIs in order to reduce operation/implementation complexity. Or equivalently, in a situation in which the four UCIs are separately encoded and multiplexed on the LP PUSCH (not including a UL-SCH transmission), when the payload sizes of all of the four UCIs are in the same range (e.g., all (equal to or larger than 3 bits and) equal to or less than 11 bits or equal to or larger than 12 bits), the UE may drop encoding/transmission of a specific UCI with the lowest protection priority (e.g., LP CSI part 2 in the above description) among the four UCIs in order to reduce operation/implementation complexity.

Table 9 summarizes at least some of examples related to P3_Case d.

TABLE 9

| | | HP UCI | | LP UCI | |
|---|---|---|---|---|---|
| Note | PUSCH | Contents | UCI type (Priority) | Contents | UCI type (Priority) |
| P3_Case d1-1 | LP PUSCH with/without UL-SCH | HARQ-ACK | 1 | HARQ-ACK CSI Part 1 CSI Part 2 | 2 3 (drop) |

TABLE 9-continued

| Note | PUSCH | HP UCI Contents | HP UCI type (Priority) | LP UCI Contents | LP UCI type (Priority) |
|---|---|---|---|---|---|
| P3_Case d1-2 | LP PUSCH with/without UL-SCH | HARQ-ACK | 1 | HARQ-ACK Single Part CSI | 2 3 |
| P3_Case d1-1t | LP PUSCH without UL-SCH | HARQ-ACK | 1 | HARQ-ACK CSI Part 1 CSI Part 2 | 2 3 4 |
| P3_Case d2-1 | LP PUSCH with/without UL-SCH | HARQ-ACK | 1 | CSI Part 1 CSI Part 2 | 2 3 |
| P3_Case d2-1s | LP PUSCH with/without UL-SCH | HARQ-ACK | 1 | Single Part CSI | 2 |
| P3_Case d3-1 | LP PUSCH with/without UL-SCH | — | — | HARQ-ACK CSI Part 1 CSI Part 2 | 1 2 3 |

2) P3_Opt 2

A. The UE may jointly encode LP UCI and HP UCI, and map/transmit the encoded UCI in the same single PUSCH resource.

i. It is assumed that the payload sizes of the LP UCI and the HP UCI are $U_L$ and $U_H$, respectively, and the total number of REs (available for UCI mapping) in a PUSCH resource is N.

1. For example, the types of both the LP UCI and the HP UCI may be HARQ-ACK. In another example, the type of the LP UCI may be (aperiodic or periodic) CSI, whereas the type of the HP UCI may be HARQ-ACK.

ii. In this case, the UE may determine the number $N_J$ of REs required for mapping jointly-encoded bits of total (joint) UCI based on the total payload size of the HP UCI and the LP UCI and a beta offset '$\beta_{offset}$' configured for the HP. When $N_J < N$, the UE may map/transmit the joint UCI in specific $N_J$ REs among N RE(s).

1. When $N_J \geq N$, the UE may map/transmit the joint UCI to/in the N REs.

iii. When $N_J > N$, and $\{N_J - N\}$ is greater than a specific value, the UE may map/transmit only the HP UCI by separately encoding the HP UCI, while dropping the LP UCI and thus not mapping/transmitting the LP UCI.

iv. Joint encoding may be applied only when both the LP UCI and the HP UCI are of the same UCI type or HARQ-ACK (e.g., LP HARQ-ACK and HP HARQ-ACK). When the LP UCI and the HP UCI are of different UCI types or both of the LP UCI and the HP UCI are CSI, a second encoding scheme (e.g., separate encoding) may be applied.

v. Regarding UCI RE mapping positions/order on a PUSCH, the following operation may be performed.

1. A structure may be used (configured/assumed/defined/indicated) between the BS and the UE, in which (jointly) encoded bits including the HP UCI are first mapped shortly after the first DMRS symbol of the PUSCH (in the same manner as the conventional HARQ-ACK mapping), and (jointly) encoded bits including only the LP UCI are mapped, starting from the first symbol of the PUSCH (in the same manner as the conventional CSI mapping).

3) Additional Proposed Operation

A. When the LP UCI and/or the HP UCI are piggybacked and transmitted on a specific PUSCH, the UE/BS may apply the following rules to determine the specific PUSCH to carry the UCI.

B. Alt 1: When a PUCCH resource corresponding to the LP UCI and/or the HP UCI (or a PUCCH resource in which the UCI combination is multiplexed) overlaps with both an LP PUSCH resource and an HP PUSCH resource on the time axis, the UE may select the LP PUSCH, and piggyback and transmit the UCI combination (on the LP PUSCH).

i. This may be intended to prevent/minimize the degradation of the transmission reliability performance of an HP UL-SCH caused by the UCI piggyback to the HP PUSCH.

ii. In another method, the UE may select the HP PUSCH with priority, and piggyback and transmit the UCI combination (on the single HP PUSCH). This may be intended to prevent/minimize the degradation of the transmission reliability performance of an LP UL-SCH caused by the HP UCI piggyback to the LP PUSCH.

iii. When the PUCCH resource corresponding to the LP UCI and/or the HP UCI (or the PUCCH resource in which the UCI combination is multiplexed) overlaps with an XP PUSCH resource without overlapping with an YP PUSCH resource on the time axis (where XP and YP may be LP and HP, respectively, or HP and LP, respectively). The UE may select the XP PUSCH and transmit the UCI combination (on the single XP PUSCH).

C. Alt 2: When the PUCCH resource corresponding to the LP UCI and/or the HP UCI (or the PUCCH resource in which the UCI combination is multiplexed) overlaps with both an LP PUSCH resource and an HP PUSCH resource on the time axis, the UE may piggyback and transmit the LP UCI on the LP PUSCH, and piggyback and transmit the HP UCI on the HP PUSCH.

i. For example, when only the LP UCI exists without the HP UCI, the UE may piggyback and transmit the LP UCI on the LP PUSCH. When only the HP UCI exists without the LP UCI, the UE may piggyback and transmit the HP UCI on the HP PUSCH. When there are both the LP UCI and the HP UCI, the UE may split the UCI combination, and piggyback and transmit the LP UCI on the LP PUSCH and the HP UCI on the HP PUSCH.

ii. This may be intended to prevent/minimize the degradation of the transmission reliability performance of the LP UL-SCH caused by the HP UCI piggyback to the LP PUSCH and the degradation of the transmission reliability performance of the LP UCI caused by the LP UCI piggyback to the HP PUSCH.

iii. When the PUCCH resource corresponding to the LP UCI and/or the HP UCI (or the PUCCH resource in which the UCI combination is multiplexed) overlaps with an XP PUSCH resource without overlapping with an YP PUSCH resource on the time axis (where XP and YP may be LP and HP, respectively, or HP and LP, respectively). The UE may select the XP PUSCH and transmit the UCI combination (on the single XP PUSCH).

Figure 14:
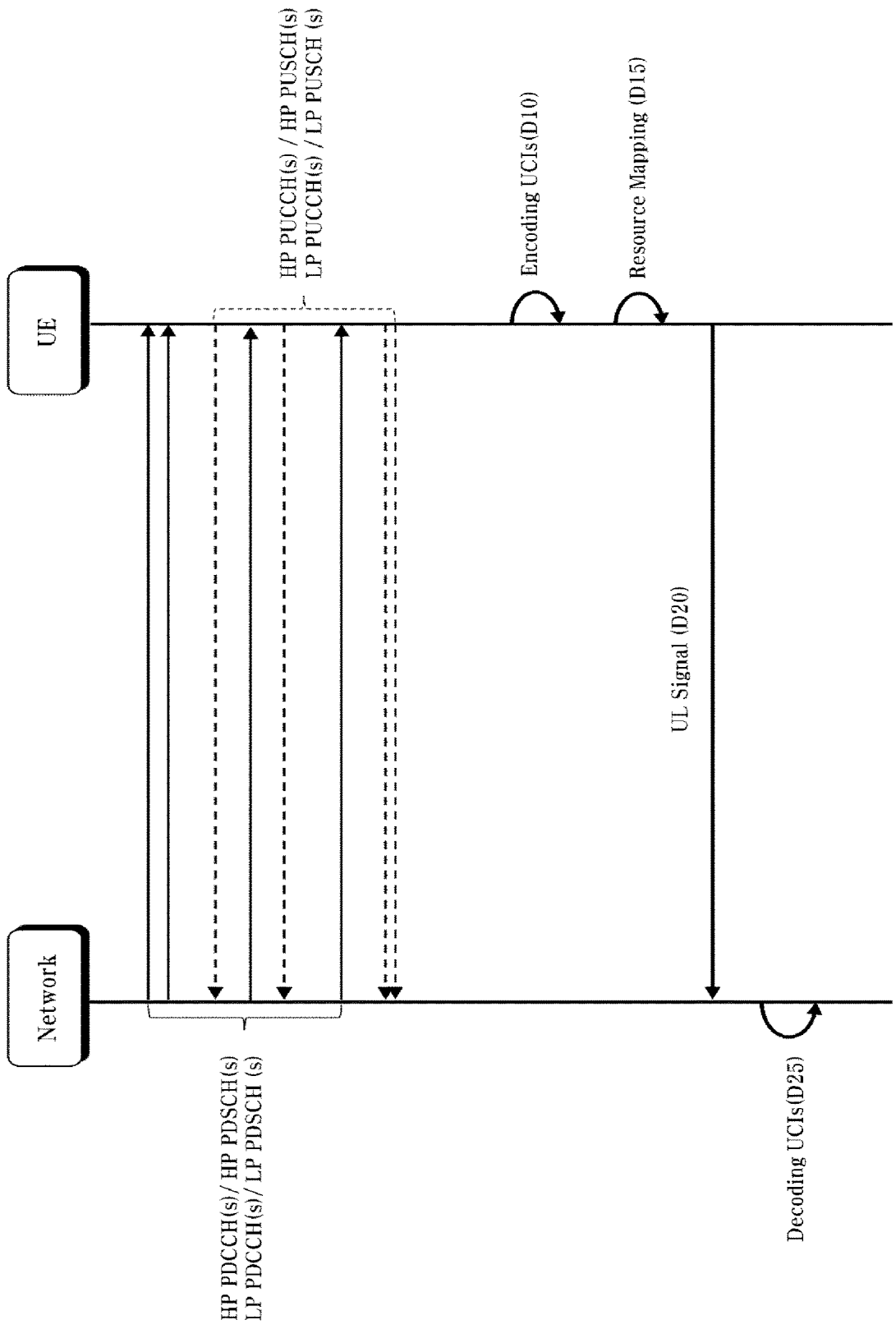
FIG. 14 is a diagram illustrating a signal transmission and reception method according to an embodiment of the present disclosure.

FIG. 14 illustrates an implementation example of a signal transmission and reception method according to at least some of the afore-described Proposal 1 to Proposal 3. FIG. 14 is presented to help the understanding of the proposals, which should not be construed as limiting the scope of the present disclosure. A description redundant to the foregoing description may be avoided, and the foregoing description may be referred to, when needed.

Referring to FIG. 14, a network (e.g., one BS or two or more BSs) transmit and receive HP UL/DL signals and LP UL/DL signals to and from a UE.

In the case where HP-LP multiplexing is not configured, when the transmission timing of an HP $U_L$ signal overlaps with the transmission timing of an LP $U_L$ signal, the LP $U_L$ signal may be dropped. On the contrary, in the case where HP-LP multiplexing is configured, when the transmission timing of an HP $U_L$ signal overlaps with the transmission timing of an LP $U_L$ signal, the UE may operate as in the following example.

The UE may encode a plurality of UCIs including a first UCI (e.g., HP UCI) and a second UCI (e.g., LP UCI) (D10).

The UE may perform resource mapping for encoded bits of the plurality of UCIs on one physical uplink channel (D15).

The UE may perform a UL transmission based on the resource mapping (D20). The BS may receive multiplexed encoded bits of the plurality of UCIs on the one physical link channel from the UE.

The BS may obtain the first UCI and the second UCI by decoding the encoded bits of the plurality of UCIs (D25).

Based on that the UE is configured to multiplex the first UCI and the second UCI on the single physical uplink channel even in a case where the first UCI and the second UCI have different priorities, the UE may separately encode the first UCI and the second UCI, and perform resource mapping of the second UCI having a lower priority based on resource mapping of the first UCI having a higher priority.

Based on the UE being configured to multiplex the first UCI and the second UCI on the single physical uplink channel even in a case where the first UCI and the second UCI have different priorities, the BS may separately decode the first UCI and the second UCI, and determine resource mapping of the second UCI having a lower priority based on resource mapping of the first UCI having a higher priority.

The single physical uplink channel may be a PUCCH.

To separately encode the first UCI and the second UCI, the UE may perform a plurality of encoding processes for PUCCH format 2, even though the PUCCH is configured with PUCCH format 2.

The UE may perform the plurality of encoding processes for PUSCH format 2 for which only a single encoding process would be allowed if multiplexing of the first UCI and the second UCI having the different priorities were not configured.

The UE may use a second mapping scheme to perform the resource mapping for the single physical uplink channel for which a first mapping scheme would be used if multiplexing of the first UCI and the second UCI having the different priorities were not configured. For example, the second mapping scheme may be a distributed/interleaved mapping scheme.

The single physical uplink channel may be a PUCCH, and the UE may multiplex the first UCI and the second UCI in a first PUCCH resource related to the higher priority among a plurality of PUCCH resources related to the different priorities.

The UE may determine a coding rate of the second UCI or whether to drop at least part of the second UCI, based on the amount of UCI resources available on the single physical uplink channel and the amount of resources required for the resource mapping of the first UCI.

The performing of resource mapping for encoded bits of the plurality of UCIs may include determining '$N_H$' resource elements (REs) for the resource mapping of the first UCI by selecting one RE every 'd' REs among 'N' available REs of the single physical uplink channel, and determining REs for the resource mapping of the second UCI among remaining '$N-N_H$' REs. The UE may determine a value of 'd' to space the '$N_H$' REs apart from each other by a maximum distance.

In a state in which the single physical uplink channel is a PUSCH carrying piggyback-UCI, and a UCI type 'n' has a higher priority than a UCI type 'n+1' among a plurality of UCI types related to the piggyback-UCI, the UE determines UCI types of the first UCI and the second UCI as illustrated in Table 8 or Table 9 in Best Mode.

Figure 15:
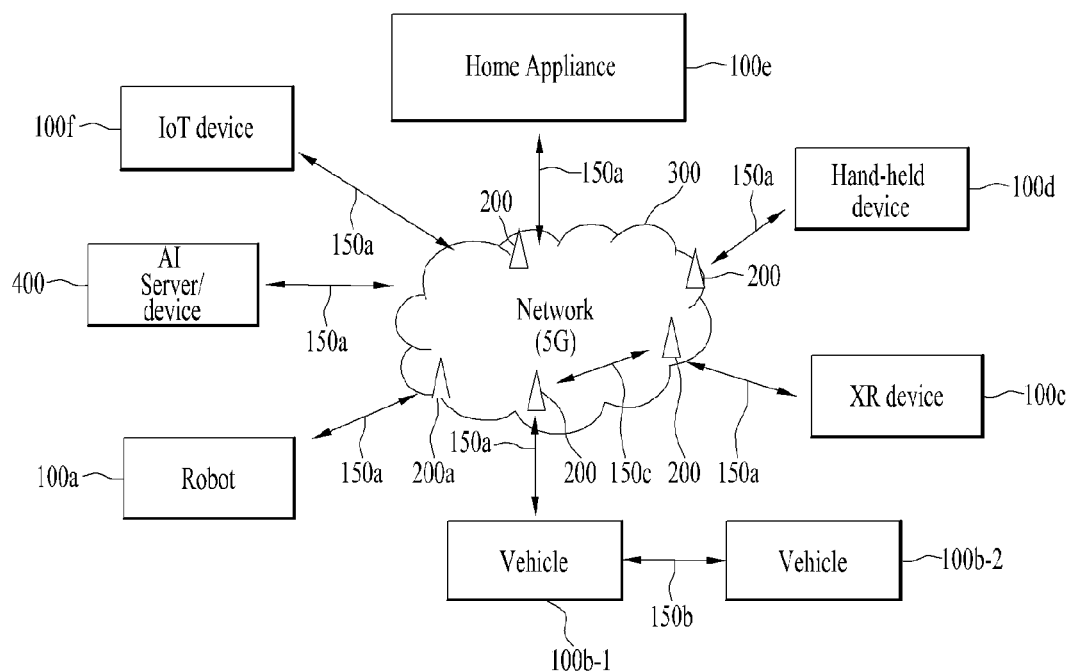
FIGS. 15 to 18 are diagrams illustrating an example of a communication system 1 and wireless devices applied to the present disclosure.

FIG. 15 illustrates a communication system 1 applied to the present disclosure.

Referring to FIG. 15, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
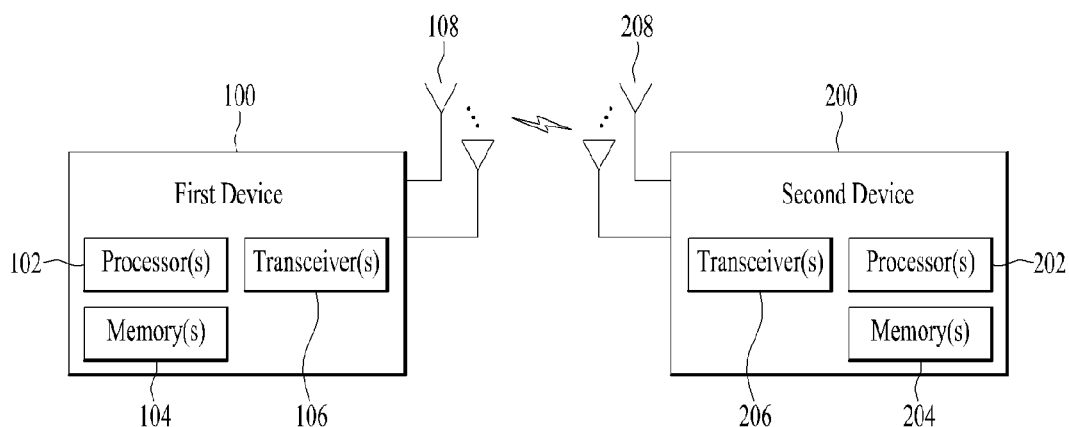

FIG. 16 illustrates wireless devices applicable to the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
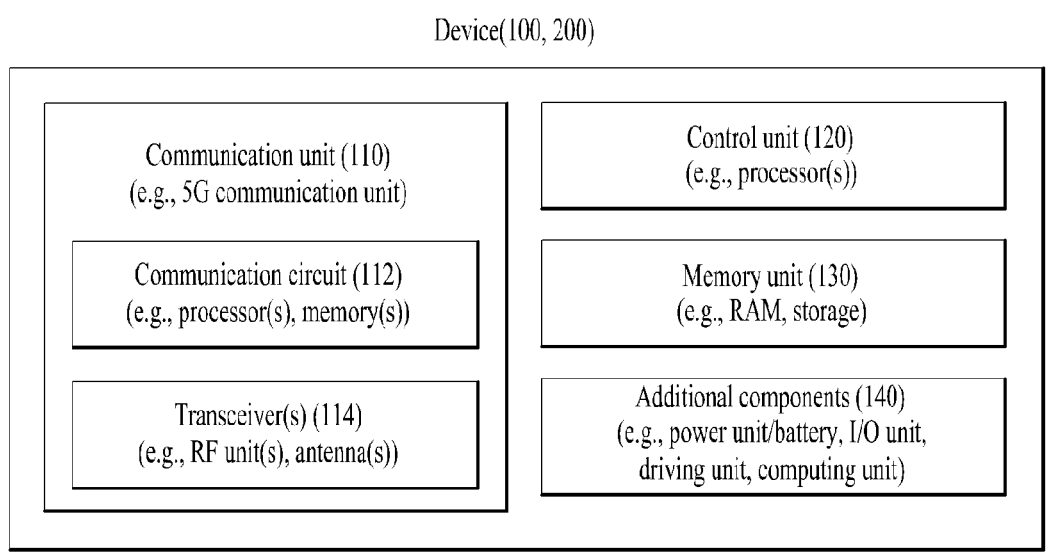

FIG. 17 illustrates another example of a wireless device applied to the present disclosure. The wireless device may be implemented in various forms according to a use-case/service (refer to FIG. 15).

Referring to FIG. 17, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 18:
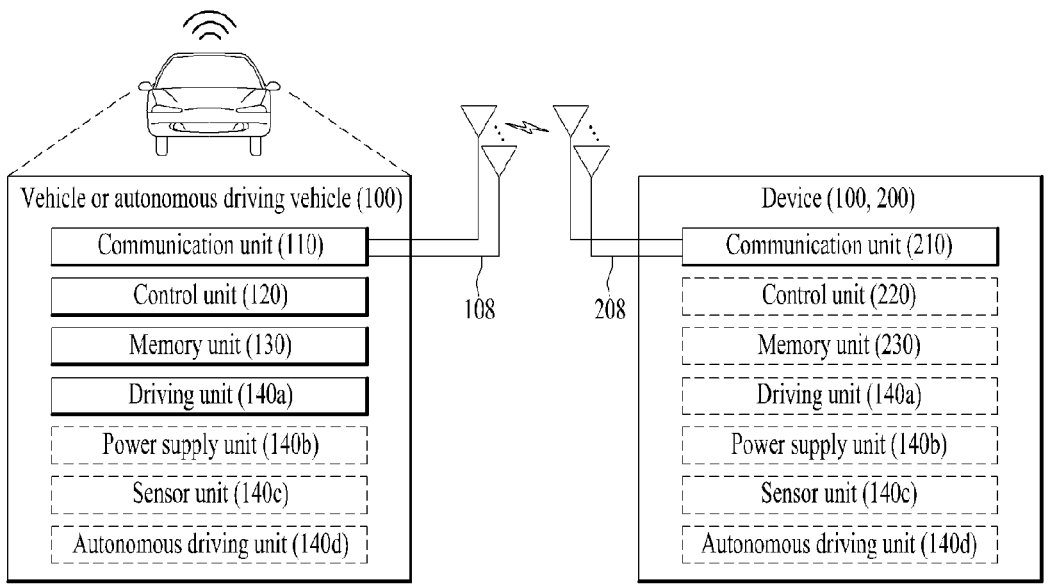

FIG. 18 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 18, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 17, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 19:
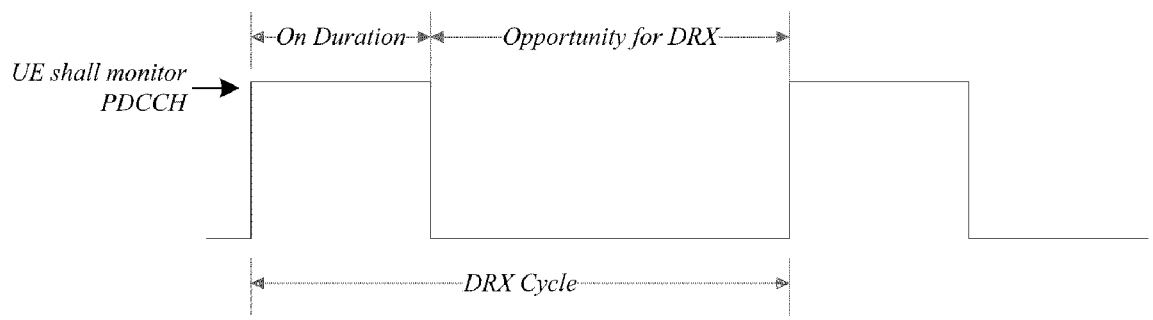
FIG. 19 is a diagram illustrating an exemplary discontinuous reception (DRX) operation applicable to the present disclosure.

FIG. 19 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 19, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 10 describes a DRX operation of a UE (in the RRC_CONNECTED state). Referring to Table 10, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 10

| | Type of signals | UE procedure |
|---|---|---|
| $1^{st}$ step | RRC signalling (MAC-CellGroupConfig) | Receive DRX configuration information |
| $2^{nd}$ Step | MAC CE ((Long) DRX command MAC CE) | Receive DRX command |
| $3^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

What is claimed is:

1. A method of transmitting a signal by a user equipment (UE) in a wireless communication system, the method comprising:

receiving downlink control information (DCI) for scheduling a physical uplink shared channel (PUSCH); and transmitting the PUSCH including uplink control channel (UCI) based on UCI resources in the PUSCH, wherein the UE performs, based on the UCI resources in the PUSCH, i) a first determination for determining a number of resources for a hybrid automatic repeat request-acknowledgement (HARQ-ACK), and ii) a second determination for determining a number of resources for first channel state information (CSI) after the first determination, and wherein, based on that the UE is configured to multiplex UCIs with different priorities in the PUSCH, and the UCIs with the different priorities include first HARQ-ACK information with a first priority and second HARQ-ACK information with a second priority lower than the first priority:

the UE determines a number of resources for the first HARQ-ACK information based on i) the first determination, after determining resources for a demodulation reference signal (DMRS), and the UE determines a number of resources for the second HARQ-ACK information based on ii) the second determination by taking the second HARQ-ACK information with the second priority as the first CSI.

2. The method of claim 1, wherein the UE determines the number of resources for the second HARQ-ACK information based on ii) the second determination, after determining the number of resources for the first HARQ-ACK information based on i) the first determination.

3. The method of claim 1, wherein CSI with the first priority is not included in the PUSCH.

4. The method of claim 1, wherein the first priority has a priority index 1 and the second priority has a priority index 0.

5. The method of claim 1, further comprising:

receiving, through higher layer signaling, configuration information for the UE to multiplex the UCIs with the different priorities.

6. A non-transitory computer-readable medium storing instruction for performing the method of claim 1.

7. A device for wireless communication, the device comprising:

a memory configured to store instructions; and a processor configured to perform operations by executing the instructions, the operations comprising:

receiving downlink control information (DCI) for scheduling a physical uplink shared channel (PUSCH); and transmitting the PUSCH including uplink control channel (UCI) based on UCI resources in the PUSCH, wherein the processor performs, based on the UCI resources in the PUSCH, i) a first determination for determining a number of resources for a hybrid automatic repeat request-acknowledgement (HARQ-ACK), and ii) a second determination for determining a number of resources for first channel state information (CSI) after the first determination, and wherein, based on that the device is configured to multiplex UCIs with different priorities in the PUSCH, and the UCIs with the different priorities include first HARQ-ACK information with a first priority and second HARQ-ACK information with a second priority lower than the first priority:

the processor determines a number of resources for the first HARQ-ACK information based on i) the first determination, after determining resources for a demodulation reference signal (DMRS), and the processor determines a number of resources for the second HARQ-ACK information based on ii) the second determination by taking the second HARQ-ACK information with the second priority as the first CSI.

8. The device of claim 7, further comprising:
a transceiver configured to transmit or receive a wireless signal under control of the processor,
wherein the device is a user equipment (UE) configured to operate in a wireless communication system.

9. The device of claim 7, wherein the device is an application specific integrated circuit (ASIC) or a digital signal processing device configured control a user equipment (UE) to operate in a wireless communication system.

10. A method of receiving a signal by a base station (BS) in a wireless communication system, the method comprising:
transmitting, to a user equipment (UE), downlink control information (DCI) for scheduling a physical uplink shared channel (PUSCH); and
receiving, from the UE, the PUSCH including uplink control channel (UCI) based on UCI resources in the PUSCH,
wherein the BS performs, based on the UCI resources in the PUSCH, i) a first determination for determining a number of resources for a hybrid automatic repeat request-acknowledgement (HARQ-ACK), and ii) a second determination for determining a number of resources for first channel state information (CSI) after the first determination, and
wherein, based on that the BS has configured the UE to multiplex UCIs with different priorities in the PUSCH, and the UCIs with the different priorities include first HARQ-ACK information with a first priority and second HARQ-ACK information with a second priority lower than the first priority:
the BS determines a number of resources for the first HARQ-ACK information based on i) the first determination, after determining resources for a demodulation reference signal (DMRS), and
the BS determines a number of resources for the second HARQ-ACK information based on ii) the second determination by taking the second HARQ-ACK information with the second priority as the first CSI.

11. The method of claim 10, the BS determines the number of resources for the second HARQ-ACK information based on ii) the second determination, after determining the number of resources for the first HARQ-ACK information based on i) the first determination.

12. The method of claim 10, wherein CSI with the first priority is not included in the PUSCH.

13. The method of claim 10, wherein the first priority has a priority index 1 and the second priority has a priority index 0.

14. The method of claim 10, further comprising:
transmitting, through higher layer signaling, configuration information for the UE to multiplex the UCIs with the different priorities.

15. A base station (BS), the BS comprising:
a transceiver; and
a processor configured to control the transceiver to:
transmit, to a user equipment (UE), downlink control information (DCI) for scheduling a physical uplink shared channel (PUSCH); and
receive, from the UE, the PUSCH including uplink control channel (UCI) based on UCI resources in the PUSCH,
wherein the processor performs, based on the UCI resources in the PUSCH, i) a first determination for determining a number of resources for a hybrid automatic repeat request-acknowledgement (HARQ-ACK), and ii) a second determination for determining a number of resources for first channel state information (CSI) after the first determination, and
wherein, based on that the processor has configured the UE to multiplex UCIs with different priorities in the PUSCH, and the UCIs with the different priorities include first HARQ-ACK information with a first priority and second HARQ-ACK information with a second priority lower than the first priority:
the processor determines a number of resources for the first HARQ-ACK information based on i) the first determination, after determining resources for a demodulation reference signal (DMRS), and
the processor determines a number of resources for the second HARQ-ACK information based on ii) the second determination by taking the second HARQ-ACK information with the second priority as the first CSI.

* * * * *